United States Patent
Kayama et al.

(10) Patent No.: US 7,367,915 B2
(45) Date of Patent: May 6, 2008

(54) AUTOMATIC SPEED CHANGER

(75) Inventors: Kazumichi Kayama, Anjo (JP); Nobutada Sugiura, Anjo (JP); Shundo Yamaguchi, Anjo (JP); Kazuhisa Ozaki, Anjo (JP); Tomochika Inagaki, Anjo (JP)

(73) Assignee: Aisin Aw Co., Ltd. (JP)

( * ) Notice: Subject to any disclaimer, the term of this patent is extended or adjusted under 35 U.S.C. 154(b) by 318 days.

(21) Appl. No.: 10/522,591

(22) PCT Filed: Dec. 26, 2003

(86) PCT No.: PCT/JP03/17069

§ 371 (c)(1),
(2), (4) Date: Dec. 23, 2005

(87) PCT Pub. No.: WO2004/061332

PCT Pub. Date: Jul. 22, 2004

(65) Prior Publication Data

US 2006/0094559 A1  May 4, 2006

(30) Foreign Application Priority Data

Dec. 27, 2002 (JP) .............................. 2002-382531

(51) Int. Cl.
*F16H 3/62* (2006.01)
(52) U.S. Cl. .................. 475/313; 475/319; 475/325; 475/330
(58) Field of Classification Search ............... 475/330, 475/313, 319, 325, 269, 296

See application file for complete search history.

(56) References Cited

U.S. PATENT DOCUMENTS

| 142,880 | A | | 9/1873 | Welbourn | |
|---|---|---|---|---|---|
| 5,133,697 | A | * | 7/1992 | Hattori | 475/276 |
| 5,525,117 | A | | 6/1996 | Morisawa et al. | 475/281 |
| 6,110,069 | A | * | 8/2000 | Taniguchi et al. | 475/330 |
| 6,176,802 | B1 | | 1/2001 | Kasuya et al. | 475/269 |
| 6,558,287 | B2 | * | 5/2003 | Hayabuchi et al. | 472/271 |
| 7,282,007 | B2 | * | 10/2007 | Ishimaru | 475/275 |
| 7,294,087 | B2 | * | 11/2007 | Hayabuchi et al. | 475/276 |

(Continued)

FOREIGN PATENT DOCUMENTS

DE        102 13 820 A1    3/2002

(Continued)

*Primary Examiner*—Sherry Estremsky
(74) *Attorney, Agent, or Firm*—Bacon & Thomas, PLLC

(57) ABSTRACT

A planetary gear unit PR and a clutch C3 for outputting reduced speed rotation and a clutch C1 for connecting and disconnecting input of rotation of an input shaft to a sun gear S2 are located on one axial side of a planetary gear unit PU, and a clutch C2 for connecting and disconnecting input of rotation of the input shaft to the carrier CR2 is located on the axially opposite of the planetary gear unit PU. By doing so, as compared to a case wherein, for example, a clutch C1 and clutch C2 are both located between a pair of planetary gear units PR and PU, the planetary gear units PR and PU can be located more closely together, and the member that transmits the reduced speed rotation from planetary gear unit PR to planetary gear unit PU can be made shorter. Further, compared to the case wherein, for example, the clutches C1, C2, C3 are located on one axial side of the planetary gear units, the construction of the oil lines is simplified.

39 Claims, 43 Drawing Sheets

U.S. PATENT DOCUMENTS

| | | | |
|---|---|---|---|
| 2002/0091032 A1 | 7/2002 | Hayabuchi et al. | 475/278 |
| 2002/0142880 A1 | 10/2002 | Hayabuchi et al. | 475/275 |
| 2007/0129201 A1* | 6/2007 | Rihn et al. | 475/269 |

FOREIGN PATENT DOCUMENTS

| | | | |
|---|---|---|---|
| DE | 102 00 379 A1 | | 8/2002 |
| EP | 0 997 663 A2 | | 10/1999 |
| JP | 02-118240 | * | 5/1990 |
| JP | 04-125345 | | 4/1992 |
| JP | 07-133850 | | 5/1995 |
| JP | 2000-046129 | | 2/2000 |
| JP | 2000-199549 | | 7/2000 |
| JP | 2000-274498 | | 10/2000 |
| JP | 2002-227940 | | 8/2002 |
| JP | 2002-242956 | | 8/2002 |
| JP | 2002-295608 | | 10/2002 |
| JP | 2002-323098 | | 11/2002 |

* cited by examiner

ENGAGEMENT TABLE

|   |   | C1 | C2 | C3 | B1 | B2 | F1 |
|---|---|----|----|----|----|----|----|
|   | P |    |    |    |    |    |    |
|   | R |    |    | ○  |    | ○  |    |
|   | N |    |    |    |    |    |    |
| D | FIRST SPEED | ○ |    |    |    | (○) | ○ |
|   | SECOND SPEED | ○ |    |    | ○ |    |    |
|   | THIRD SPEED | ○ |    | ○ |    |    |    |
|   | FOURTH SPEED | ○ | ○ |    |    |    |    |
|   | FIFTH SPEED |    | ○ | ○ |    |    |    |
|   | SIXTH SPEED |    | ○ |    | ○ |    |    |

FIG.2

ENGAGEMENT TABLE

|  |  | C1 | C2 | C3 | B1 | B2 | F1 |
|---|---|---|---|---|---|---|---|
|  | P |  |  |  |  |  |  |
|  | R |  |  | ○ |  | ○ |  |
|  | N |  |  |  |  |  |  |
| D | FIRST SPEED | ○ |  |  |  | (○) | ○ |
| D | SECOND SPEED | ○ |  |  | ○ |  |  |
| D | THIRD SPEED | ○ |  | ○ |  |  |  |
| D | FOURTH SPEED | ○ | ○ |  |  |  |  |
| D | FIFTH SPEED |  | ○ | ○ |  |  |  |
| D | SIXTH SPEED |  | ○ |  | ○ |  |  |

FIG.6

ENGAGEMENT TABLE

|  | C1 | C2 | B1 | B2 | B3 | F1 |
|---|---|---|---|---|---|---|
| P |  |  |  |  |  |  |
| R |  |  |  | ○ | ○ |  |
| N |  |  |  |  |  |  |
| D FIRST SPEED | ○ |  |  | (○) |  | ○ |
| D SECOND SPEED | ○ |  | ○ |  |  |  |
| D THIRD SPEED | ○ |  |  |  | ○ |  |
| D FOURTH SPEED | ○ | ○ |  |  |  |  |
| D FIFTH SPEED |  | ○ |  |  | ○ |  |
| D SIXTH SPEED |  | ○ | ○ |  |  |  |

FIG.9

ENGAGEMENT TABLE

|   |   | C1 | C2 | C3 | B1 | B2 | F1 |
|---|---|----|----|----|----|----|----|
|   | P |    |    |    |    |    |    |
|   | R |    |    | ○  |    | ○  |    |
|   | N |    |    |    |    |    |    |
| D | FIRST SPEED | ○ |    |    |    | (○) | ○ |
| D | SECOND SPEED | ○ |    |    | ○ |    |    |
| D | THIRD SPEED | ○ |    | ○ |    |    |    |
| D | FOURTH SPEED | ○ | ○ |    |    |    |    |
| D | FIFTH SPEED |    | ○ | ○ |    |    |    |
| D | SIXTH SPEED |    | ○ |    | ○ |    |    |

FIG.22

ENGAGEMENT TABLE

|   |   | C1 | C2 | C3 | B1 | B2 | F1 |
|---|---|---|---|---|---|---|---|
|   | P |   |   |   |   |   |   |
|   | R |   |   | ○ |   | ○ |   |
|   | N |   |   |   |   |   |   |
| D | FIRST SPEED | ○ |   |   |   | (○) | ○ |
|   | SECOND SPEED | ○ |   |   | ○ |   |   |
|   | THIRD SPEED | ○ |   | ○ |   |   |   |
|   | FOURTH SPEED | ○ | ○ |   |   |   |   |
|   | FIFTH SPEED |   | ○ | ○ |   |   |   |
|   | SIXTH SPEED |   | ○ |   | ○ |   |   |

FIG.25

ENGAGEMENT TABLE

| | | C1 | C2 | C3 | B1 | B2 | F1 |
|---|---|---|---|---|---|---|---|
| P | | | | | | | |
| R | | | | ○ | | ○ | |
| N | | | | | | | |
| D | FIRST SPEED | ○ | | | | (○) | ○ |
| | SECOND SPEED | ○ | | | ○ | | |
| | THIRD SPEED | ○ | | ○ | | | |
| | FOURTH SPEED | ○ | ○ | | | | |
| | FIFTH SPEED | | ○ | ○ | | | |
| | SIXTH SPEED | | ○ | | ○ | | |

FIG.28

ENGAGEMENT TABLE

|  |  | C1 | C2 | C3 | B1 | B2 | F1 |
|---|---|---|---|---|---|---|---|
| P |  |  |  |  |  |  |  |
| R |  |  | ○ |  | ○ |  |  |
| N |  |  |  |  |  |  |  |
| D | FIRST SPEED | ○ |  |  | (○) |  | ○ |
| D | SECOND SPEED | ○ |  |  |  | ○ |  |
| D | THIRD SPEED | ○ | ○ |  |  |  |  |
| D | FOURTH SPEED | ○ |  | ○ |  |  |  |
| D | FIFTH SPEED |  | ○ | ○ |  |  |  |
| D | SIXTH SPEED |  |  | ○ |  | ○ |  |

FIG.31

ENGAGEMENT TABLE

|   |   | C1 | C2 | C3 | B1 | B2 | F1 |
|---|---|----|----|----|----|----|----|
|   | P |    |    |    |    |    |    |
|   | R |    | ○  |    | ○  |    |    |
|   | N |    |    |    |    |    |    |
| D | FIRST SPEED  | ○ |   |   | (○) |   | ○ |
| D | SECOND SPEED | ○ |   |   |   | ○ |   |
| D | THIRD SPEED  | ○ | ○ |   |   |   |   |
| D | FOURTH SPEED | ○ |   | ○ |   |   |   |
| D | FIFTH SPEED  |   | ○ | ○ |   |   |   |
| D | SIXTH SPEED  |   |   | ○ |   | ○ |   |

FIG.34

ENGAGEMENT TABLE

|  |  | C2 | C3 | B1 | B2 | B3 | F1 |
|---|---|---|---|---|---|---|---|
| P |  |  |  |  |  |  |  |
| R |  | ○ |  | ○ |  |  |  |
| N |  |  |  |  |  |  |  |
| D | FIRST SPEED |  |  | (○) |  | ○ | ○ |
| D | SECOND SPEED |  |  |  | ○ | ○ |  |
| D | THIRD SPEED | ○ |  |  |  | ○ |  |
| D | FOURTH SPEED |  | ○ |  |  | ○ |  |
| D | FIFTH SPEED | ○ | ○ |  |  |  |  |
| D | SIXTH SPEED |  | ○ |  | ○ |  |  |

FIG.37

AUTOMATIC SPEED CHANGER

CROSS-REFERENCE TO RELATED APPLICATIONS

This application is a National Phase Application (35 USC 371) of PCT/JP2003/017069 and claims priority of Japanese Application No. 2002-382531, filed Dec. 27, 2002, the teachings of which are incorporated by reference herein in its entirety, inclusive of the specification, claims, abstract and drawings.

1. Technical Field

The present invention relates to an automatic transmission for a vehicle, and more specifically, to an automatic transmission that can shift between multiple speeds, with the capability of input of reduced speed rotation to a selected one of the rotary components of a planetary gear unit.

2. Background Art

One type of conventional automatic transmission comprises a planetary gear unit with two rows of linked planetary gears, and planetary gearing that outputs rotation at a speed reduced from that of the input shaft. See, for example, Japanese Unexamined Patent application Publication No. 4-125345 and Japanese Unexamined Patent application Publication No. 2000-274498. These publications disclose automatic transmissions providing, for example, six forward speeds and one reverse speed, with input of rotation at a speed reduced by planetary gearing, via a clutch, to one of four rotary components of a planetary gear unit.

In recent years, multi-staging of automatic transmissions has been desired from the perspective of improved fuel efficiency, due to environmental problems and so forth. However, in general, multi-staging results in a larger automatic transmission due to the increased number of components, while from the perspective of ease of mounting on a vehicle, a compact automatic transmission is desired.

The above-mentioned conventional automatic transmission comprises two clutches for inputting the rotation of the input shaft into a rotary component of the planetary gear unit, and planetary gearing for reducing the speed of rotation of the input shaft for input into the rotary component of the planetary gear unit. However, where the two clutches or a hydraulic servo that controls the engagement of the clutches is located between the planetary gear unit and the planetary gearing, the unit for transmitting the reduced speed rotation output by the planetary gearing to a rotary component of the planetary gear unit must be axially elongated.

The elongated member transmits the reduced speed rotation and a large torque, and provision of an elongated member that can withstand such large torque requires fabrication from a relatively thick material, which prevents compactness of the automatic transmission. Further, the weight of such a unit is increased, the inertia (inertial force) is increased, the controllability of the automatic transmission is decreased and speed change shocks occur more easily.

Further, for example, in order to engage or disengage transfer of the reduced speed rotation to the planetary gear unit from the planetary gearing, a clutch or brake must be provided. In the case that a clutch is provided, this clutch together with the above-mentioned two clutches, total three clutches in all. In general, a clutch has a clutch drum that transmits the rotation input to the friction plates, and therefore, with a problem such as relative rotation, supply of oil pressure to the oil chamber of the hydraulic servo of the clutch must be from the mid-section of the automatic transmission.

However, if the above-described three clutches are located on one axial side of the planetary gear unit for example, oil lines for supplying oil pressure to the three respective hydraulic servos must be provided in triplicate in the mid-section of the automatic transmission for example, and the configuration of the oil lines becomes complicated.

SUMMARY OF THE INVENTION

Accordingly, an object of the present invention is to provide an automatic transmission that achieves multi-staging, and yet is reduced in size. Another object of the present invention is to provide an automatic transmission wherein reduced speed rotation output means and a first clutch are located on one axial side of the planetary gear unit, and a second clutch is located on the other axial side of the planetary gear unit, so as to provide solution of the above-mentioned problems.

Accordingly, the present invention provides an automatic transmission comprising: an input shaft that rotates with the rotation output from a drive source; a planetary gear unit comprised of first, second, third, and fourth rotary components; reduced speed rotation output means for reducing the speed of the input rotation from the input shaft and for outputting rotation at the reduced speed to the first rotary component; a first clutch that selectively connects the input shaft and the second rotary component; a second clutch that selectively connects the input shaft with the third rotary component; and an output unit that outputs the rotation of the fourth rotary component to a drive wheel transmission mechanism. The reduced speed rotation output means and the first clutch are located on one axial side of the planetary gear unit and the second clutch is located on the other axial side of the planetary gear unit.

Accordingly, the reduced speed rotation output means and planetary gear unit can be disposed closer to each other in comparison with a case wherein the first clutch and second clutch, for example, are located between the reduced speed rotation output means and the planetary gear unit, while providing at least five forward speeds forward and one reverse speed. Further, the transmitting member which transmits the reduced speed rotation can be made relatively shorter, thereby enabling the automatic transmission to be made more compact.

Further, because the transmitting member for transmitting the reduced speed rotation can be made relatively shorter, it can be more lightweight, and further, because the inertia (inertial force) is reduced, the controllability of the automatic transmission can be improved, and the occurrence of speed change shock can be reduced.

Further, in the case that the reduced speed rotation output means has a clutch, three clutches in all are required, but compared to the case wherein the three clutches are located on one side of the planetary gear unit, the construction of the oil lines supplying the hydraulic servos of those clutches is easier, the manufacturing process is simplified and the cost is reduced.

The automatic transmission of the present invention may further include a transmitting member for linking the reduced speed rotation output means and the planetary gear unit, wherein the first clutch is located radially inward of the transmitting member.

The reduced speed rotation output means may include an input rotary element for receiving input of rotation of the input shaft in a continuous manner, a fixed element, a reduced speed rotary element, and a third clutch for controlling connection, through the transmitting member, between the reduced speed rotary element and the first rotary component, wherein the reduced speed rotation is transmitted to the first rotary component by engagement of the third clutch.

The automatic transmission of the present invention may have the first clutch located radially inward of the third clutch.

Accordingly, the third clutch, which must transmit a relatively large torque at the reduced speed, can be located on the outer circumferential side, and this third clutch and its hydraulic servo can have a larger diameter. More specifically, the pressure-receiving area of the oil chamber of the hydraulic servo can be increased, and the capacity for torque transmission of this third clutch is thereby increased. However, by locating the first clutch, which can have a smaller capacity for torque transmission compared to the third clutch, on the inner circumferential side, the automatic transmission can be formed more compact.

The third clutch includes friction members, a drum unit and a hub unit that links through the friction members with the reduced speed rotary component. The drum unit forms a hydraulic servo with a piston sealed in an oil-tight manner, and links with the first rotary component. The first clutch is located radially inward of the drum unit. The friction members of the third clutch are preferably located radially outward of the speed reducing planetary gearing, with the hydraulic servo of the third clutch disposed adjoining the speed reducing planetary gearing on the opposite axial side of the planetary gear unit.

The hydraulic servo of a first brake, for braking the first rotary component of the planetary gear unit to which reduced speed rotation is input, is located radially outward of the hydraulic servo of the third clutch.

The intermediate element of the speed reducing planetary gearing may be fixed to a first boss extending from one side wall of a case with the hydraulic servo of the third clutch mounted on the first boss. Likewise, the hydraulic servo of the second clutch is located on the outside of the second boss that extends from another side wall of the case. The first clutch is located adjoining the planetary gearing and includes friction members, a hydraulic servo for engaging the friction members, and a drum unit and hub unit integral with the hydraulic servo, wherein the drum unit is linked with the input shaft.

In one embodiment, the reduced speed rotation output means includes an input rotary element for receiving input of rotation of the input shaft, a fixable element for being fixed against rotation, a reduced speed rotary element that is linked to the first rotary component at all times and rotates at the reduced speed, a third clutch for selectively connecting, through the transmitting member, the input shaft and the input rotary element, and a third brake for fixing the fixable element against rotation, wherein the reduced speed rotation is transmitted to the first rotary component by engagement of the third clutch and the third brake. In this embodiment the third clutch may be disposed radially inward of the transmitting member.

The first clutch and the third clutch may be located axially adjacent and radially inward of the transmitting member.

The third clutch includes friction members and a hydraulic servo for engaging the friction members, wherein the hydraulic servo is located on the side of the speed reducing (second) planetary gear unit axially opposite the first planetary gear unit; and wherein a drum unit that forms the cylinder of the hydraulic servo is linked with the input shaft.

The hydraulic servo of the third clutch may be located adjoining the hydraulic servo of the first clutch, between the hydraulic servo of the first clutch and the friction plates of the third clutch.

The third brake may be located on the side of the second planetary gear unit PR axially opposite the first planetary gear unit PU.

The hydraulic servo of the third brake may be formed in the case.

In yet another embodiment, the reduced speed rotation output means includes an input rotary element for receiving input of rotation from the input shaft, a fixable element for being fixed against rotation, a reduced speed rotary element which rotates at the reduced speed and which is connected to the first rotary component at all times, and a third brake for fixing the fixable element against rotation, wherein the reduced speed rotation is transmitted to the first rotary component by engagement of the third brake.

The automatic transmission of the foregoing embodiment achieves six forward speeds and one reverse speed, and in fourth speed forward the first and second clutches are both engaged, that is to say the automatic transmission is directly coupled in fourth speed forward. Therefore, in fifth speed forward and sixth speed forward, the gear ratio can be a high ratio, so that when the vehicle is running at high speed, the engine speed can be relatively lower, thereby allowing the vehicle to run more quietly at high speed.

The first planetary gear unit is preferably a multiple planetary gear unit, comprising a first sun gear, a long pinion which meshes with the first sun gear, a short pinion which meshes with the long pinion, a carrier for rotatably supporting the long pinion and the short pinion, a second sun gear meshing with the short pinion, and a ring gear meshing with the long pinion. In such an embodiment the first rotary component is the first sun gear which receives input of the reduced speed rotation from the reduced speed rotation output means, and which can be fixed against rotation by engagement of the first brake, the second rotary component is the second sun gear which receives input of the rotation of the input shaft upon engagement of the first clutch, the third rotary component is the carrier which receives input of the rotation of the input shaft upon engagement of the second clutch, and which is fixed against rotation by engagement of the second brake, and the fourth rotary component is the ring gear linked to the output member.

The automatic transmission according to another embodiment includes a pair of the planetary gear units each comprising a first sun gear, a second sun gear linked to the first sun gear, a first carrier meshing with the first sun gear, a second carrier meshing with the second sun gear, a first ring gear linked to the second carrier, and a second ring gear meshing with the second carrier. In this embodiment the first rotary component is the second ring gear which receives input of the reduced speed rotation from the reduced speed rotation output means, and which is capable of being fixed against rotation by engagement of the first brake and the second rotary component is the first sun gear and the second sun gear which receive input of the rotation of the input shaft upon engagement of the first clutch. The third rotary component is the second carrier and the first ring gear which receive input of the rotation of the input shaft upon engaging of the second clutch, and which are fixed by engagement of the second brake. The fourth rotary component is a first carrier linked to the output member.

In the foregoing embodiment, in first speed forward, the first clutch and the second brake are engaged; in second speed forward, the first clutch and the first brake are engaged; in third speed forward reduced speed rotation is input to the first rotary component from the reduced speed rotation output means, and the first clutch is engaged; in fourth speed forward the first clutch and the second clutch are both engaged; in fifth speed forward reduced speed rotation is input to the first rotary component from the reduced speed rotation output means, and the second clutch is engaged; in the sixth speed forward the second clutch and the first brake are engaged; and in the first speed reverse, reduced speed rotation is input to the first rotary component from the reduced speed rotation output means, and the second brake is engaged. In this embodiment six forward speeds and one reverse speed are provided. In fifth speed forward both the first clutch and the second clutch may be engaged to provide a directly coupled state. Therefore, between first speed forward and fourth speed forward, the ranges of the gear ratios can be relatively narrower, and therefore when the vehicle is running at a low to moderate speed, the engine speed can be better optimized, and fuel consumption can be reduced.

Alternatively, in embodiments wherein the planetary gear unit is a multiple planetary gear unit, the first rotary component is the second sun gear which receives input of the reduced speed rotation of the reduced speed rotation output means; the fixable rotary element is a carrier which receives input of the rotation of the input shaft by engagement of the first clutch, and which is fixed against rotation by engagement of the first brake; the third rotary component is the first sun gear which receives input of the rotation of the input shaft upon engagement of the second clutch, and which is fixed against rotation by engagement of the second brake; and the fourth rotary component is the ring gear.

In the foregoing alternative embodiment, in first speed forward reduced speed rotation is input to the first rotary component from the reduced speed rotation output means, and the first brake is engaged; in second speed forward, reduced speed rotation is input to the first rotary component from the reduced speed rotation output means, and the second brake is engaged; in third speed forward, reduced speed rotation is input to the first rotary component from the reduced speed rotation output means, and the second clutch is engaged; in fourth speed forward, reduced speed rotation is input to the first rotary component from the reduced speed rotation output means, and the first clutch is engaged; in fifth speed forward, the first clutch and the second clutch are both engaged; in sixth speed forward, the first clutch and the second brake are both engaged; and in first speed reverse, the second clutch and the first brake are engaged. Thus, this embodiment also provides six forward speeds and one reverse speed.

In the embodiment mentioned above the "fixed element" may be a carrier fixed to the case, optionally, a boss on the interior of the case, and carrying pinions meshed with the input rotary element and the reduced speed rotary element. Likewise, the "fixable element" may be a carrier which can be fixed against rotation by engagement of a brake and which carries pinions meshed with the input rotary element and the reduced speed rotary element.

The first clutch may be located on the side of the first planetary gear unit axially opposite the speed reducing second planetary gear unit.

Thus, the first clutch engages at relatively low to medium speeds. Accordingly, when this second clutch is disengaged at relatively high speeds or in reverse, the unit linking this second clutch and the third rotary component rotates at a relatively high speed or in the opposite direction. On the other hand, a case may occur wherein the transmitting member, that transmits the reduced speed rotation from the reduced speed rotation output means, will rotate at a reduced speed or is engaged, and the difference in speeds may be great. However, because this second clutch is located on the side of the first planetary gear unit opposite the reduced speed rotation output means, the unit rotating at a relatively high speed or in reverse rotation and the unit rotating at the reduced speed of the reduced speed rotation output means (particularly the transmitting member) can be separated. For example, compared to the case wherein those units are arranged in a multiple axis configuration and are in contact, a decrease in efficiency of the automatic transmission due to relative rotation between these units can be prevented.

In the foregoing embodiment, the second clutch is engaged in reverse. Accordingly, when the second clutch is engaged in reverse, the reduced speed rotation unit (particularly the transmitting member) of the reduced speed rotation output means rotates in reverse. In a case wherein the unit linking this second clutch and the third rotary component is rotating at the speed of rotation of the input shaft due to the second clutch being engaged, the difference in rotational speeds may be great. However, because the second clutch is located on the side of the first planetary gear unit opposite the reduced speed rotation output means, the unit with reverse rotation (particularly the transmitting member) and the unit that rotates with the rotation of the input shaft can be separated. As compared to a multiple axis construction wherein these units are in contact, decrease in efficiency of the automatic transmission due to relative rotation between these units can be avoided.

The first clutch includes friction plates having their inner peripheries splined to a member linked to the second rotation component, a first drum encompassing an hydraulic servo and which is splined on its outer circumferential surface to friction plates, a first piston member for engaging the friction plates, and a first hydraulic servo oil pressure chamber formed by liquid-tight seals between the inner circumferential surface of the first piston member and the first drum member. The second clutch comprises friction plates having their inner edges splined to a member linked to the third rotation component, a second drum encompassing a hydraulic servo and which is splined to the outer edges of friction plates and which is disposed on the inner circumferential side of a member linked to the second rotary component, a second piston member for engaging the friction plates, and a second hydraulic servo oil pressure chamber formed by sealing between the inner circumferential surface of the second piston member and the input shaft, and between the outer circumference surface and the second drum member.

The output member may be disposed axially between the first planetary gear unit and the reduced speed rotation output means.

Accordingly, the output unit can be located in approximately the axial center of the automatic transmission. Thus, when the automatic transmission is mounted on the vehicle, enlargement towards the rear (when the end receiving the input from the drive source is the "front") becomes unnecessary because the output member is mounted to mate with the drive wheel transmission device. Because of this, particularly in the case of a FF vehicle, interference with the front wheels is reduced, and the mountability on a vehicle is improved, for example, the steering angle is greatly increased.

The output member may be located axially between the planetary gear unit and the second clutch. Accordingly, the planetary gear unit and the reduced speed rotation output means can be arranged even closer together, and the transmitting member can be further shortened.

The reduced speed rotation output means may be in the form of a speed reducing second planetary gear unit, more specifically, a double pinion planetary gear unit, wherein the speed reducing second planetary gear unit, the first planetary gear unit, and the output member, are arranged coaxially with the input shaft.

A differential unit outputs rotation to the drive wheels, a counter shaft unit is engaged with the differential unit, and the output member may be a counter gear meshing with the counter shaft unit.

BRIEF DESCRIPTION OF THE DRAWINGS

FIG. 2 is a table of operations of the automatic transmission of the first embodiment;
FIG. 6 is a table of operations of the automatic transmission of the third embodiment;
FIG. 9 is a table of operations for the automatic transmission of the fourth embodiment;
FIG. 22 is a table of operations of the automatic transmission of the fifteenth embodiment,
FIG. 25 is a table of operations of the automatic transmission of the sixteenth embodiment;
FIG. 28 is a table of operations of the automatic transmission of the seventeenth embodiment;
FIG. 31 is a table of operations of the automatic transmission of the eighteenth embodiment;
FIG. 34 is a table of operations of the automatic transmission of the nineteenth embodiment;
FIG. 37 is a table of operations of the automatic transmission of the twentieth embodiment.

DESCRIPTION OF THE PREFERRED EMBODIMENTS

First Embodiment

Figure 1:
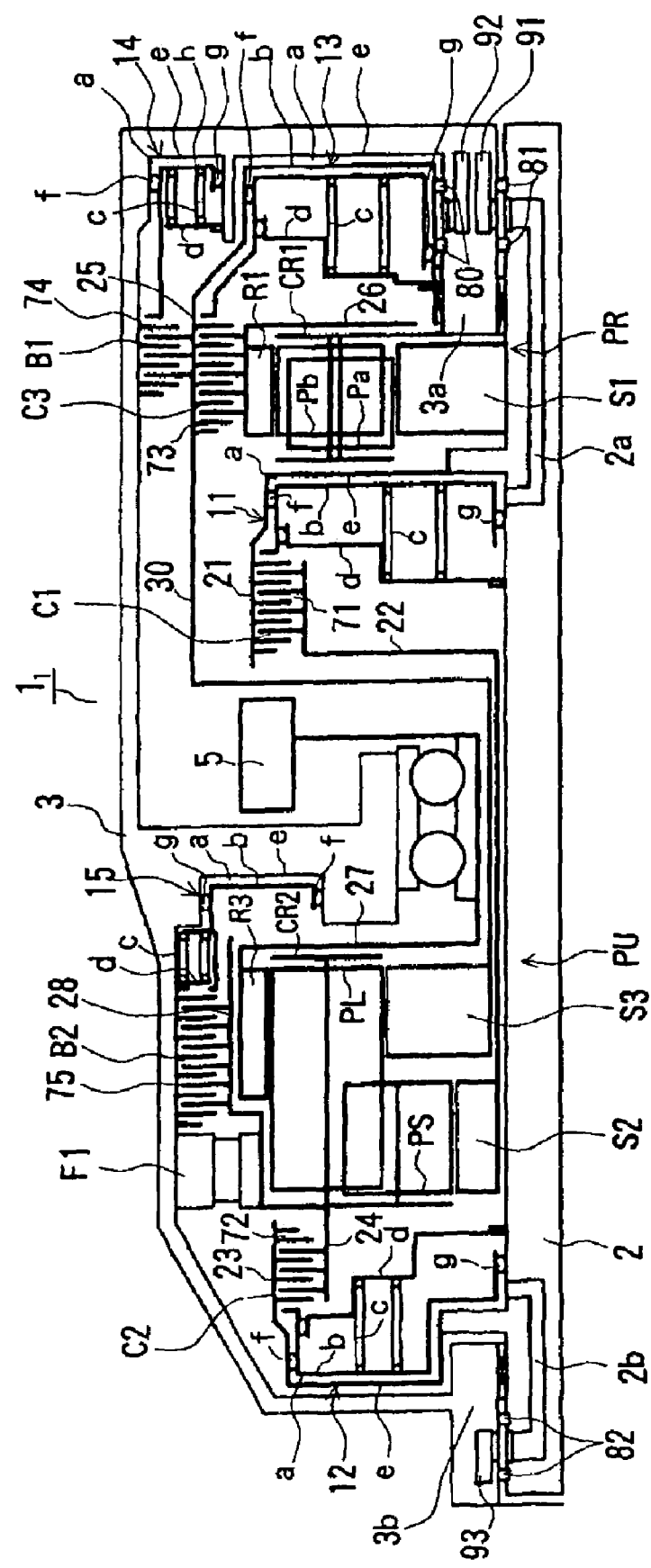
FIG. 1 is a schematic cross-sectional view of an automatic transmission according to a first embodiment.

A first embodiment of the present invention will be described with reference to FIG. 1 through FIG. 3 below. FIG. 1 shows an automatic transmission $1_1$ according to the first embodiment of the present invention that is particularly well suited for a FF (front engine, front wheel drive) vehicle. A case includes a torque converter housing (not illustrated) and a transmission case 3 which houses the automatic transmission $1_1$, a counter shaft unit (drive wheel transmission device) (not illustrated) and a differential unit (drive wheel transmission device).

The torque converter is centered on the axis of input shaft 2 of the automatic transmission $1_1$, which is on the same axis as the output shaft of the engine (not illustrated). Further, the above-mentioned counter shaft unit includes a counter shaft (not illustrated) aligned on an axis parallel to the input shaft 2, and the above-mentioned differential unit has a lateral axle aligned parallel to the counter shaft.

FIG. 1 shows, arranged along the input shaft 2, a first planetary gear unit PU and a second planetary gear unit (reduced speed rotation output means) PR. The first planetary gear unit PU is a multiple type planetary gear unit which includes a sun gear (the second rotary component) S2, a carrier (the third rotary component) CR2, a ring gear (the fourth rotary component) R3, and a sun gear (the first rotary component) S3, as the four rotary components. The carrier CR2 has a long pinion PL that meshes with the sun gear S3 and the ring gear R3, and a short pinion PS that meshes with the sun gear S2, wherein the pinions are also meshed to one another. Further, the second planetary gear unit PR is a so-called double planetary gear unit that has a carrier CR1 which rotatably supports a pinion Pb meshing with a ring gear R1 and a pinion Pa meshing with a sun gear S1, wherein the pinions also mesh one with another.

Arranged on the input shaft 2 are a multi-disc clutch (first clutch) C1, which comprises a hydraulic servo 11, friction plates 71, a clutch drum 21, and a hub unit 22 linked to sun gear S2 on the inner circumferential side; and a multi-disc clutch (third clutch) C3, which includes a hydraulic servo 13, friction plates 73, and a clutch drum 25 on the outer circumferential side. Further, located radially outward of the drum member 25 is a multi-disc brake B1 (first brake) which has a hydraulic servo 14 and friction plates 74.

Hydraulic servo 11 includes a piston unit b for engaging the friction plates 71, a drum 21 that has a cylinder unit e, an oil chamber (hereafter, simply "oil chamber") "a" formed by seal rings f and g interposed between piston unit b and cylinder unit e, a return spring c that biases piston unit b toward oil chamber "a", and a return plate d that bears the force of return spring c.

In the descriptions to follow, each hydraulic servo shall be considered as being constructed similarly, i.e., as having an oil chamber "a", a piston unit b, a return spring c, a return plate d, a cylinder unit e, and seal rings f and g, and, as such, descriptions thereof will not be repeated.

The oil chamber "a" of this hydraulic servo 11 is connected to an oil line 2a which is formed on the input shaft 2, and this oil line 2a is connected to the oil line 91 of the boss 3a which is in the form of a sleeve surrounding the input shaft 2. Further, this oil line 91 is connected to an oil pressure control unit, not illustrated. In other words, due to the above-mentioned hydraulic servo 11 being mounted on the input shaft 2, an oil supply path from the oil pressure control unit, not illustrated, to the oil chamber "a" of the hydraulic servo 11 is connected simply by providing one set of seal rings 81 between the boss 3a and the input shaft 2.

Further, the oil chamber "a" of the above-mentioned hydraulic servo 13 is directly connected to an oil line 92 of the above-mentioned boss 3a, and this oil line 92 is connected to an oil pressure control unit, not illustrated. Thus, the hydraulic servo 13 has its oil chamber "a" connected to the oil pressure control unit simply by providing one set of seal rings 80 between the boss 3a and the drum 25.

The input shaft 2 is connected to the above-mentioned drum 21, and the inner circumferential surface of this drum 21 is splined to the friction plates 71 of the clutch C1 which is operated by the hydraulic servo 11. The friction plates 71 of clutch C1 are intermeshed with friction plates splined to the hub unit 22 which is connected to the sun gear S2.

The drum 25 is rotatably supported by the boss 3a and the outer circumferential surface of a front portion of this drum 25 is splined to friction plates 74 of the brake B1 which can be engaged by the hydraulic servo 14. The inner circumferential surface of the front portion of this drum 25 is splined to the friction plates 73 of the clutch C3 which is operated by the hydraulic servo 1. The friction plates 73 are intermeshed with friction plates splined to the ring gear R1.

The carrier CR1 supports a pinion Pa and a pinion Pb, pinion Pb meshes with the above-mentioned ring gear R1, and pinion Pa meshes with the sun gear S1 which is connected to the input shaft 2. This carrier CR1 is secured to the boss 3a of via a side plate, and ring gear R1 is supported by a supporting plate 26 which, in turn, is rotatably supported by the boss 3a.

Further, the above-mentioned drum 25 receives, via a linking member (hereafter, also referred to as "transmitting member") 30, the rotation of the ring gear R1. At one end of this transmitting member 30 is connected the sun gear S3 of the first planetary gear unit PU.

On the other side of the input shaft 2 (left in diagram) is a multi-disc clutch (second clutch) C2 that has an hydraulic servo 12, friction plates 72, clutch drum 23, and a hub unit 24 linked to a carrier CR2.

Oil chamber "a" of hydraulic servo 12 is connected to an oil line 2b which is formed on the above-mentioned input shaft 2, and this oil line 2b is connected to the oil line 93 in the boss 3b which is also formed as a sleeve around the input shaft 2. This oil line 93 is connected to an oil pressure control unit, not illustrated. Thus, an oil line from the oil pressure control unit is connected to the oil chamber "a" of the hydraulic servo 12 simply by providing one set of seal rings 82 between the input shaft 2 and the drum 23.

The inner circumferential surface of a front portion of drum 23 is splined to the friction plates 72 of the clutch C2 which is operated by the hydraulic servo 12. The friction plates 72 of this clutch C2 are intermeshed with friction plates splined to the hub unit 24, and this hub unit 24 is connected to the side plate of the carrier CR2. Radially outward of the planetary gear unit PU is a multi-disc brake (second brake) B2 that has an hydraulic servo 15, friction plates 75, and a hub unit 28. The side plate of the carrier CR2 of this planetary gear unit PU is connected to a hub unit 28 to which are splined the friction plates 75 of the above-mentioned brake B2. This hub unit 28 is also connected to the inner race of a one-way clutch F1. The ring gear R3 meshes with the long pinion PL of carrier CR2, has one end connected to a linking member 27, and is linked to the counter gear 5 via this linking member 27.

As described above, the second planetary gear unit PR, the clutch C1 and the clutch C3 are located at one axial end of the first planetary gear unit PU and the clutch C2 is located on the opposite axial side. The counter gear 5 is located between the second planetary gear unit PR and the first planetary gear unit PU. Further, the clutch C1 is disposed radially inward of the clutch C3, and, particularly, inward of a section of the transmitting member 30 that transmits the output thereof. Further, the brake B1 is located radially outward of the second planetary gear unit PR, and the brake B2 is located radially outward of the first planetary gear unit PU.

Operations of automatic transmission $1_1$ will now be described, with reference to FIG. 1, FIG. 2, and FIG. 3 below. The vertical axes of the speed line diagram illustrated in FIG. 3 indicate the rotational speeds of each rotary component, and the horizontal axis indicates the corresponding gear ratio for these rotary components. In the planetary gear unit PU section of this speed line diagram, the vertical axis to the farthest right side of FIG. 3 corresponds to sun gear S3, and moving to the left within the diagram, the vertical axes correspond to the carrier CR2, the ring gear R3, and the sun gear S2. Further, in the second planetary gear unit PR section of this speed line diagram, the vertical axis to the farthest right side of FIG. 3 corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. The dotted horizontal line within the diagram represents the rotation transmitted by the transmitting member 30.

As illustrated in FIG. 1, the rotation of input shaft 2 is input to the sun gear S2, by engaging the clutch C1. The rotation of input shaft 2 is input to the above-mentioned carrier CR2, by engaging the clutch C2, and this carrier CR2 can be fixed against rotation by engagement of brake B2. Further, the rotation is limited to one direction by the one-way clutch F1. The sun gear S3 can be fixed against rotation by engagement of the brake B1.

The above-mentioned sun gear S1 is connected to the input shaft 2 so as to receive as input the rotation thereof. The carrier CR1 is fixed to the case 3 and, therefore the ring gear R1 rotates at a reduced speed. Further, by engaging the clutch C3, the reduced speed rotation of this ring gear R1 is input to the sun gear S3.

Also, the rotation of the ring gear R3 is output to the counter gear 5, and is output to the drive wheels via this counter gear 5, a counter shaft unit not illustrated, and a differential unit.

In first speed forward within D (drive) range, as illustrated in FIG. 2, the clutch C1 and the one-way clutch F1 are engaged. Then, as illustrated in FIG. 3, the rotation of input shaft 2 is input to the sun gear S2 via the clutch C1, and the rotation of the carrier CR2 is limited to one direction (the forward rotation direction). Further, the rotation of input shaft 2 that is input to the sun gear S2 is output to the ring gear R3 via the fixed carrier CR2, and the forward rotation for first speed forward is output from the counter gear 5. When downshifting (coasting), the brake B2 is engaged and carrier CR2 is thereby fixed, and the above-described state of first speed forward is maintained while preventing the forward rotation of carrier CR2. In this first speed forward, because the one-way clutch F1 allows only forward rotation of the carrier CR2, switching from a non-driving range to a driving range and achieving the first speed forward can be accomplished more smoothly by the automatic engaging of the one-way clutch.

In second speed forward within the D (drive) range, as illustrated in FIG. 2, the clutch C1 and the brake B1 are engaged. Then, as illustrated in FIG. 3, the rotation of input shaft 2 is input to the sun gear S2 via the clutch C1, and the sun gear S3 is fixed by engagement of the brake B1. By doing so, the carrier CR2 rotates at a slightly reduced speed, and the rotation of input shaft 2 that was input in the sun gear S2 is output to the ring gear R3 via the carrier CR2 at this reduced speed, and the forward rotation for second speed forward is output from the counter gear 5.

In third speed forward within the D (drive) range, as illustrated in FIG. 2, the clutch C1 and the clutch C3 are engaged. Then, as illustrated in FIG. 3, the rotation of input shaft 2 is input to the sun gear S2 via the clutch C1. Further, by the input of the rotation of the input shaft 2 to the sun gear S1 and the fixed state of carrier CR1, the ring gear R1 is rotated at a reduced speed, and the reduced speed rotation of ring gear R1 is output to the sun gear S3 via the clutch C3 and the transmitting member 30. The carrier CR2 rotates at a speed slightly reduced as compared to that of sun gear S3 because of the rotation of the input shaft 2 input to the sun gear S2 and the reduced speed of the sun gear S3. Further, the rotation of input shaft 2 that is input to the sun gear S2 is output to the ring gear R3 via the carrier CR2 at this reduced speed, and the forward rotation for third speed forward is output from the counter gear 5. In this case, because the sun gear S3 and the ring gear R1 are rotating at a reduced speed, the above-mentioned transmitting member 30 transmits a relatively large torque.

In fourth speed forward within the D (drive) range, as illustrated in FIG. 2, the clutch C1 and the clutch C2 are engaged. Then, as illustrated in FIG. 3, the rotation of input shaft 2 is input to the sun gear S2 via the clutch C1, and into the carrier CR2 via the clutch C2. Therefore, by input of the rotation of the input shaft 2 to the sun gear S2 and the rotation of input shaft 2 input to the carrier CR2, a state of directly coupled rotation is established wherein the rotation of the input shaft 2 is output as is to the ring gear R3, and the forward rotation for fourth speed forward is output from the counter gear 5.

In fifth speed forward within the D (drive) range, as illustrated in FIG. 2, the clutch C2 and the clutch C3 are engaged. Then, as illustrated in FIG. 3, the rotation of input shaft 2 is input to the carrier CR2 via the clutch C2. Further, by input of the rotation of the input shaft 2 to the sun gear S1 and the fixed state of carrier CR1, the ring gear R1 rotates at a reduced speed, and the reduced speed rotation of this ring gear R1 is output to the sun gear S3 via the clutch C3 and the above-mentioned transmitting member 30. Overdrive rotation is output to the ring gear R3 from the sun gear S3 and the carrier CR2, and the forward rotation for fifth speed forward is output from the counter gear 5. In this case, similar to the above-mentioned case of third speed forward, due to rotation of the sun gear S3 and the ring gear R1 at a reduced speed, the above-mentioned transmitting member 30 transmits a relatively large torque.

In sixth speed forward within the D (drive) range, as illustrated in FIG. 2, the clutch C2 and the brake B1 are engaged. Then, as illustrated in FIG. 3, the rotation of the input shaft 2 is input to the carrier CR2 via the clutch C2, and the sun gear S3 is fixed by engagement of the brake B2. This produces overdrive rotation (greater than that of the above-mentioned fifth speed forward), from the rotation of the input shaft 2 input to the carrier CR2 and the fixed state of sun gear S3, which overdrive rotation is output to the ring gear R3, and the forward rotation for sixth speed forward is output from the counter gear 5.

In first speed reverse within an R (reverse) range, as illustrated in FIG. 2, the clutch C3 and the brake B2 are engaged. Then, as illustrated in FIG. 3, the ring gear R1 rotates at reduced speed based on the rotation of input shaft 2 input to the sun gear S1 and the fixed state of carrier CR1, and the reduced speed of this ring gear R1 is output to the sun gear S3 via the clutch C3 and the above-mentioned transmitting member 30. Further, the carrier CR2 is fixed by engaging the brake B2. Then, the reduced speed rotation of the sun gear S3, with carrier CR2 fixed, is output to the ring gear R3 as reverse rotation and is output as first speed reverse from the counter gear 5. In this case, similar to the case of the above-mentioned third speed forward or fifth speed forward, since the sun gear S3 and the ring gear R1 are rotating at a reduced speed, the above-mentioned transmitting member 30 transmits a relatively large torque.

In the P (parking) range and the N (neutral) range, clutch C1, clutch C2, and clutch C3 are released, the input shaft 2 is disconnected from the the counter gear 5, and the automatic transmission $1_1$ as a whole is in an idle state (neutral state).

As described above, in the automatic transmission $1_1$ of the present invention, due to the location of the secondary planetary gear unit PR and the clutch C1 on one axial side of the first planetary gear unit PU, and the clutch C2 being located on the other axial side of the planetary gear unit PU, the second planetary gear unit PR and the first planetary gear unit PU can be arranged more closely together, as compared to the case wherein for example two clutches C1 and C2 are located between the second planetary gear unit PR and the first planetary gear unit PU, and the transmitting member 30 for transmitting reduced speed rotation can be relatively shorter. In this manner, the automatic transmission can be made more compact and lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the first planetary gear unit PU, the oil lines (for example, 2a, 2b, 91, 92, 93), that supply the hydraulic servos 11, 12, and 13 of these clutches C1, C2, C3, are more easily constructed, the manufacturing process is simplified and the cost is reduced.

Further, due to the hydraulic servos 11 and 12 being provided on the input shaft 2, one set of seal rings 81 and 82 serves to form a connection with the oil lines 2a and 2b provided within input shaft 2, and therefore oil can be supplied to the oil chamber "a" of the hydraulic servos 11 and 12 without providing seal rings between, for example, the input shaft 2 and the hydraulic servos 11 and 12. Further, the hydraulic servo 13 can receive a supply of oil directly from the boss 3a, i.e. without passing through other units, merely by providing one set of seal rings 80. Therefore, the hydraulic servos can be connected to the oil supply simply by providing one set of seal rings 81 and 82, 80 each for each of the hydraulic servos 11, 12, and 13, sliding resistance from the seal rings can be minimized, and therefore the efficiency of the automatic transmission can be improved.

Further, since the clutch C1 is located radially inward of the clutch C3, the clutch C3, which must transmit a relatively large torque in order to transmit the reduced speed rotation, can be located at the outer side and therefore this clutch C3 and its hydraulic servo 13 operator can have an increased diameter. Thus, the pressure-receiving area of the oil chamber "a" of the hydraulic servo 13 can be enlarged, and the torque transmission capacity of this clutch C3 can be increased. By designing the clutch C1 to have a smaller torque transmission capacity as compared to the clutch C3, the automatic transmission can be made more compact.

Further, because the counter gear 5 is located axially between the first planetary gear unit PU and the second planetary gear unit PR, the counter gear 5 can be located in approximately the axial center of the automatic transmission. Thus, for example, when the automatic transmission is mounted on the vehicle, enlargement toward the rear (when the side which receives input from the drive source is the "front") is not necessary because the counter gear 5 is mounted to mate the drive wheel transmission device. Because of this, particularly in the case of a FF vehicle, interference with the front wheels is reduced, and the steering angle can be greatly increased, for example.

The automatic transmission $1_1$ of the first embodiment is directly coupled in fourth speed forward. Therefore, at fifth speed forward and sixth speed forward, the gear ratio can be a higher ratio and, when the vehicle is running at a high speed, the engine speed can be relatively lower, which allows the vehicle to run more quietly at a high speed.

Second Embodiment

A second embodiment, which is a partial modification of the first embodiment, will now be described, with reference to FIG. 4 which shows an automatic transmission $1_2$ as having its input and output sides reversed from the automatic transmission $1_1$ of the first embodiment. Further, the operations of the first through sixth forward speeds and the first reverse speed of $1_2$ of the second embodiment are similar to those of the automatic transmission $1_1$ of the first embodiment (see FIG. 2 and FIG. 3). Components of the second embodiment that are the same as those of the first embodiment are denoted by the same reference numerals, and description thereof omitted, except for those components partially modified.

As with the first embodiment, in this second embodiment, due to the second planetary gear unit PR and the clutch C1 being located on one side of the first planetary gear unit PU, and the clutch C2 being located on the other axial side of the planetary gear unit PU, the second planetary gear unit PR and the first planetary gear unit PU can be placed more closely together, as compared to the case wherein, for example, the two clutches C1 and C2 are located between the second planetary gear unit PR and the first planetary gear unit PU. Thus, the transmitting member 30 which transmits the reduced speed rotation can be relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case where three clutches C1, C2, C3 are located on one side of the first planetary gear unit PU, the oil lines (for example, 2a, 2b, 91, 92, 93) that supply the hydraulic servos 11, 12, and 13 of these clutches C1, C2, C3 can be more easily constructed, the manufacturing process can be simplified, and the costs brought down.

Further, since the hydraulic servos 11 and 12 are mounted on the input shaft 2, one set of seal rings 81 and 82 serves to seal the case 3 and to establish a connection with the oil lines 2a and 2b within input shaft 2, and therefore oil can be supplied to the oil chambers "a" of the hydraulic servos 11 and 12 without providing seal rings between, for example, the input shaft 2 and the hydraulic servos 11 and 12. Further, hydraulic servo 13 can receive a supply of oil directly from the boss unit 3a, i.e. without that supply passing through other units, for example, by provision of one set of seal rings 80. Therefore, the oil supply can be connected by provision of one set of seal rings 81 and 82, 80, respectively, for each of the hydraulic servos 11, 12, and 13, sliding resistance from the seal rings can be minimized, and accordingly, the efficiency of the automatic transmission can be improved.

As in the first embodiment, because the clutch C1 is located radially inward of the clutch C3, the clutch C3, which must transmit a relatively large torque in order to transmit the reduced speed rotation, can be arranged at the outer circumference. Therefore, this clutch C3 and its pressure servo 13 can have an increased diameter, the pressure-receiving area of its oil chamber can be enlarged, and its torque transmission capacity can be increased. Again, by designing the clutch C1 to have a smaller torque transmission capacity as compared to the clutch C3, the automatic transmission can be made more compact.

Further, because the counter gear 5 is located axially between the first planetary gear unit PU and the second planetary gear unit PR, the counter gear 5 can be located in approximately the axial center of the automatic transmission. With this second embodiment also, enlargement toward the rear (when the end which receives input from the drive source is the "front") is not necessary because the counter gear 5 is mounted to mate with the drive wheel transmission device. Because of this, particularly in the case of a FF vehicle, interference with the front wheels is reduced, mountability on a vehicle is improved, and the steering angle is greatly increased.

Further, the automatic transmission $1_2$ according to the second embodiment is directly coupled in fourth speed forward. Therefore, at fifth speed forward and sixth speed forward, the gear ratio can be a high ratio, and when the vehicle is running at a high speed, the engine speed can be relatively less, thus allowing the vehicle to run more quietly at a high speed.

Third Embodiment

A third embodiment, which is a partial modification of the first embodiment, will now be described with reference to FIG. 5 through FIG. 7. Components of the third embodiment that are the same as the first embodiment are denoted by the same reference numerals, and description thereof omitted, except for those components partially modified.

Figure 5:
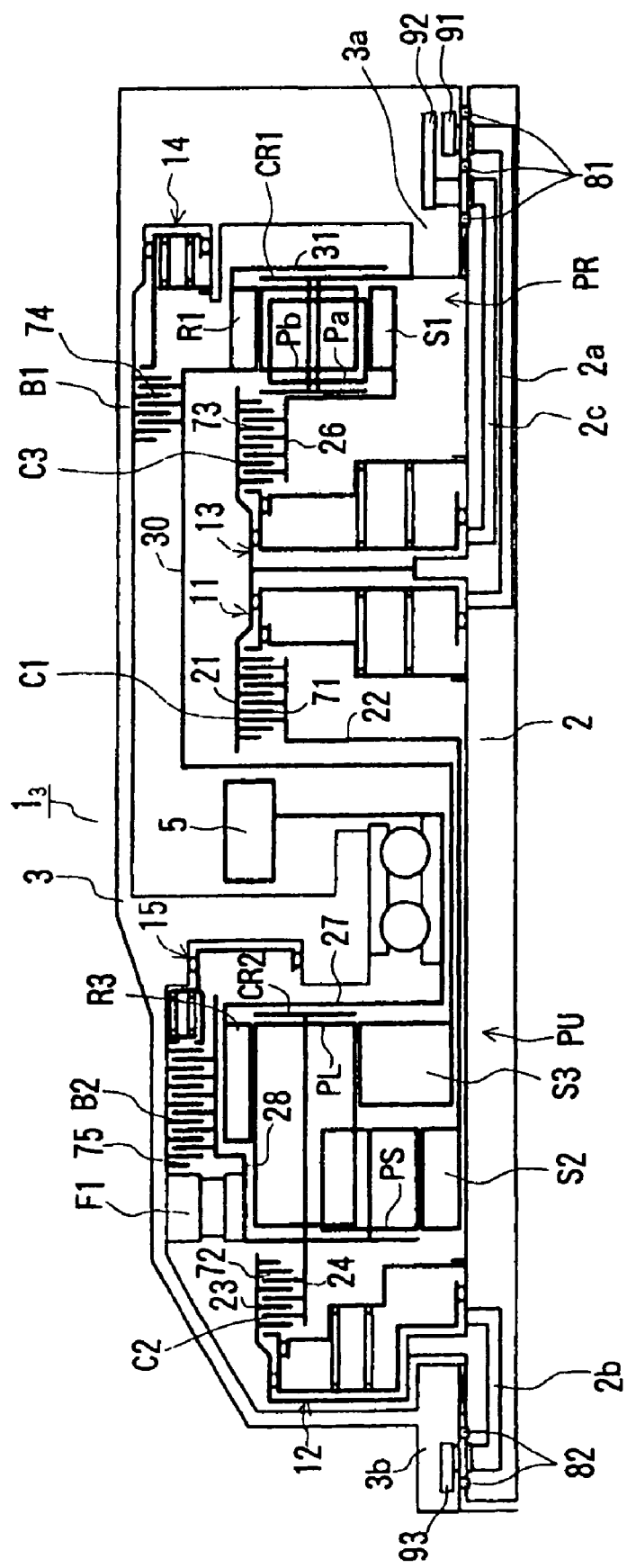
FIG. 5 is a schematic cross-sectional view of an automatic transmission according to a third embodiment.

As shown in FIG. 5, the automatic transmission $1_3$ of the third embodiment is modified with respect to the configuration of the second planetary gear unit PR and the clutch C3, as compared to the automatic transmission $1_1$ of the automatic transmission of the first embodiment (see FIG. 1).

In this automatic transmission $1_3$, the clutch C3 is located on the planetary gear unit PU side (left side of diagram) of the second planetary gear unit PR. The inner circumferential surface of a front portion of the drum 25 of clutch C3 is splined to the friction plates 73 which are intermeshed with friction plates splined to the hub unit 26. Further, the drum 25 is connected to the input shaft 2, and the hub unit 26 is connected to the sun gear S1.

The side plate of the carrier CR1 is fixed to and supported by the case 3. Also, the ring gear R1 is connected to the transmitting member 30, and the outer circumferential surface of the transmitting member 30 is splined to the friction plates 74 of the brake B1, and this transmitting member 30 is connected to the sun gear S3.

The oil chamber of hydraulic servo 13 for the clutch C3 is connected to an oil line 2c which is formed in parallel with oil line 2a on the above-mentioned input shaft 2, and this oil line 2c is connected to the oil line 92 of the boss 3a which, in turn, is connected to an oil pressure control unit, not illustrated. In other words, because the hydraulic servos 11 and 13 are mounted on input shaft 2, oil supply from the oil pressure control unit, not illustrated, to their oil chambers can be connected simply by providing seal rings 81 between the boss 3a of and the input shaft 2.

Operations of the automatic transmission $1_3$ of the third embodiment will now be described below, with reference to FIG. 5, FIG. 6, and FIG. 7. Similar to the first embodiment, the vertical axes of the speed line diagram in FIG. 7 indicate the speed of each rotary component, and the horizontal axis indicates the corresponding gear ratio of the rotary components. In the planetary gear unit PU section of this speed line diagram, the vertical axis to the farthest right side of FIG. 7 corresponds to the sun gear S3, and moving to the left within the diagram, the vertical axes correspond to the carrier CR2, the ring gear R3, and the sun gear S2. In the planetary gear unit PR section of this speed line diagram, the vertical axis to the farthest right side of FIG. 7 corresponds to the sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the horizontal dotted line in the diagram represents the rotation transmitted by the transmitting member 30.

As FIG. 5 illustrates, the rotation of input shaft 2 is input to the sun gear S1 by engaging the clutch C3. Further, the carrier CR1 is fixed to the case 3, and the ring gear R1 rotates at a reduced speed based on the rotation of input shaft 2 which is input to this sun gear S1. In other words, by engaging the clutch C3 the reduced speed rotation of the ring gear R1 is input to the sun gear S3 via the transmitting member 30.

Figure 7:
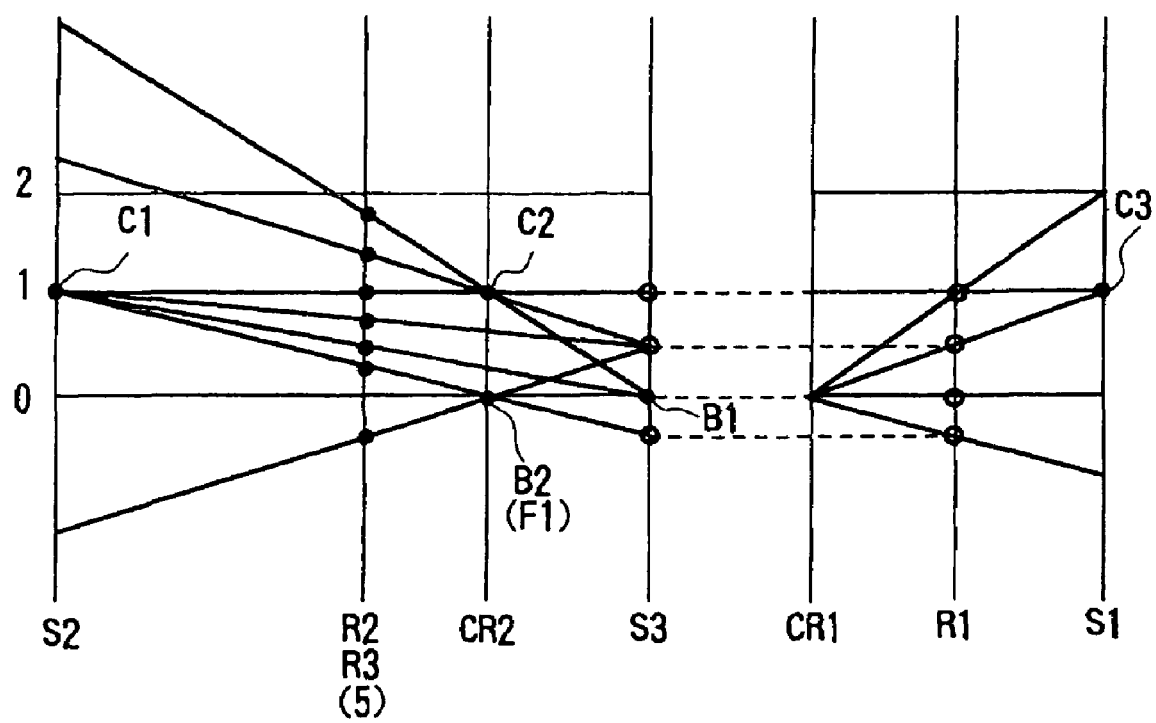
FIG. 7 is a speed line diagram for the automatic transmission of the third embodiment.

In this manner, as illustrated in FIG. 6 and FIG. 7, regarding the second planetary gear unit PR, in third speed forward, fifth speed forward, and first speed reverse, the rotation of the input shaft 2 is input to the sun gear S1 by engaging the clutch C3, and the reduced speed rotation is output to the ring gear R3 through the fixed carrier CR1, to the sun gear S3 via the transmitting member 30. In this case, because the ring gear R1 and the sun gear S3 are rotating at a reduced speed, the transmitting member 30 transmits a relatively large torque. On the other hand, in first speed forward, second speed forward, fourth speed forward, and sixth speed forward, the rotation of the sun gear S3 is input to the ring gear R1 via the transmitting member 30, and further, because the clutch C3 is released, as FIG. 7 illustrates, the sun gear S1 rotates based on the rotation of ring gear R1 and the fixed state of carrier CR1.

The operations other than described above for the second planetary gear unit PR are similar to those previously described for the first embodiment (see FIG. 2 and FIG. 3), and accordingly description thereof will be omitted here.

As described above, in the automatic transmission $1_3$ of this third embodiment, due to the second planetary gear unit PR and the clutch C1 being located on one axial side of the first planetary gear unit PU, and the clutch C2 being located on the other side of the first planetary gear unit PU, the second planetary gear unit PR and the first planetary gear unit PU can be placed more closely together, compared to the case wherein, for example, two clutches C1 and C2 are located between the second planetary gear unit PR and the first planetary gear unit PU, and therefore the transmitting member 30 can be made relatively shorter. In this manner, the automatic transmission can be made more compact and more lightweight. Further, because the inertia (inertial force) is reduced, the controllability of the automatic transmission is increased, and the occurrence of speed change shock can be reduced. Further, compared to the case wherein three clutches C1, C2, C3 are located on one side of the first planetary gear unit PU, the oil lines (for example, 2a, 2b, 91, 92, 93) that supply the hydraulic servos 11, 12, and 13 of these clutches C1, C2, C3 can be more easily constructed, the manufacturing process can be simplified, and the costs can be reduced.

Further, due to mounting the hydraulic servos 11, 12, and 13 on the input shaft 2, the seal rings 81 and 82 can seal the bosses 3a and 3b to the input shaft 2 to connect the oil lines 2a and 2b, 2c provided within input shaft 2, to the oil chambers of hydraulic servos 11, 12, and 13 without providing the seal rings between, for example, the input shaft 2 and the hydraulic servos 11, 12, and 13. Therefore, the oil supply can be connected simply by providing the seal rings 81 and 82 for each of the hydraulic servos 11, 12, and 13, sliding resistance from the seal rings can be minimized, and therefore the efficiency of the automatic transmission can be improved.

Further, because the counter gear 5 is located between the first planetary gear unit PU and the second planetary gear unit PR, the counter gear 5 can be located in approximately the axial center of the automatic transmission. For example, enlargement towards the rear (when the input side facing the drive source is the "front") is not necessary because the counter gear 5 is mounted to mate with the drive wheel transmission device. Because of this, particularly in the case of an FF vehicle, the interference with the front wheels is reduced, the mountability on a vehicle can be improved, and the steering angle can be greatly increased, for example.

In transmissions where the clutch C3 is placed between the ring gear R1 and the sun gear S3 for example, the clutch must engage and disengage the high torque, reduced speed rotation, and therefore must be relatively large. However, in the present invention, by placing clutch C3 between the input shaft 2 and the sun gear S1, the engaging and disengaging of the clutch C3 controls the transfer of rotation of the input shaft 2 to the sun gear and thereby indirectly controls output of the reduced speed rotation from the ring gear R1. Therefore, the clutch C3 can be made more compact, and therefore the automatic transmission can be made more compact.

Further, the automatic transmission $1_3$ according to this third embodiment is directly coupled in fourth speed forward. Therefore, in fifth speed forward and sixth speed forward, the gear ratio can be a high ratio, and in the event that the vehicle is running at a high speed, the engine speed can be lower, thus allowing the vehicle to run more quietly at a high speed.

Fourth Embodiment

The fourth embodiment, which is a partial modification of the first embodiment, will now be described with reference to FIG. 8 through FIG. 10. Components of the fourth embodiment which are the same as those of the first embodiment are denoted by the same reference numerals, and description thereof omitted, except for partially modified components.

Figure 8:
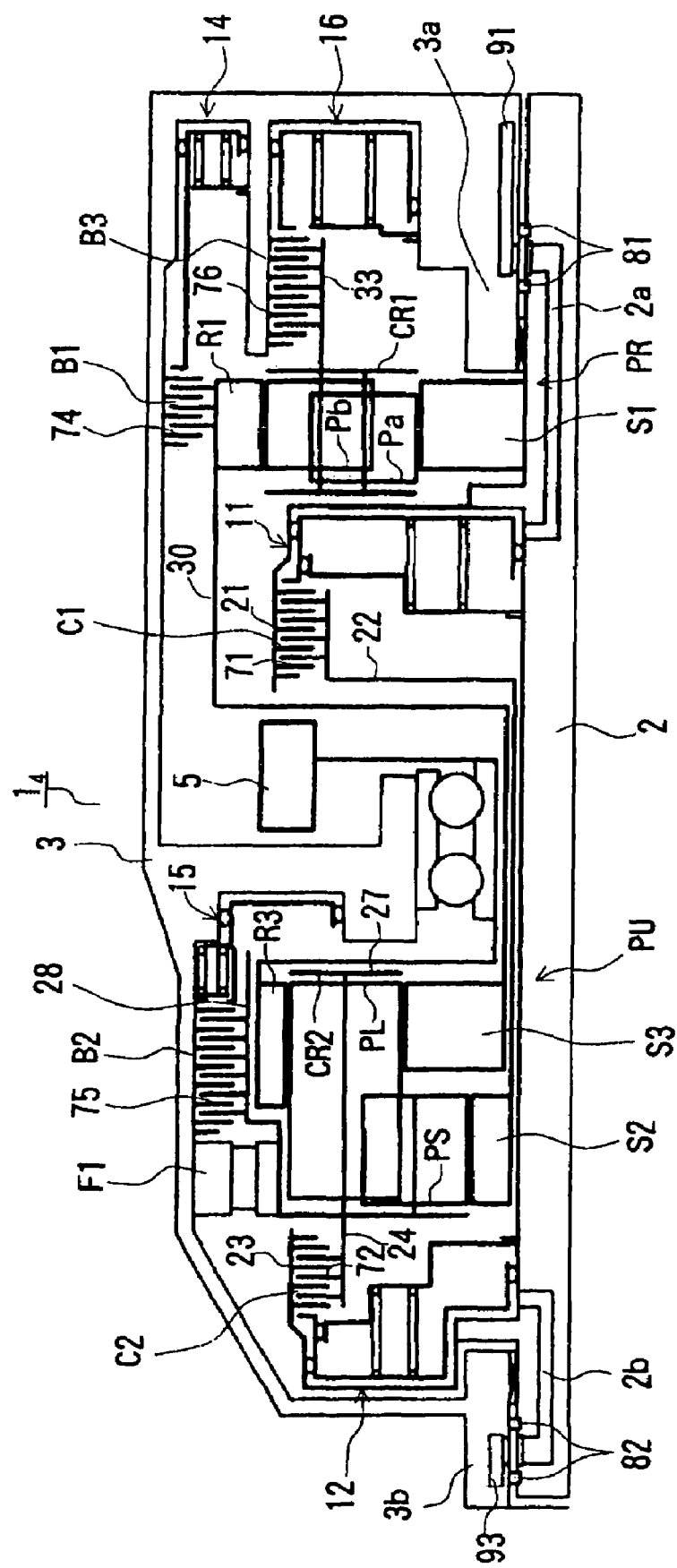
FIG. 8 is a schematic cross-sectional view of an automatic transmission according to a fourth embodiment.

As FIG. 8 illustrates, the automatic transmission $1_4$ of the fourth embodiment has a brake (third brake) B3 instead of the clutch C3, and the carrier CR1 of the second planetary gear unit PR can be fixed by the brake B3.

The brake B3 is located on the side of the second planetary gear unit PR (right side of diagram) opposite the first planetary gear unit PU. This brake B3 has a hydraulic servo 16, friction plates 76, and a hub unit 33.

The hub unit 33 of this brake B3 is connected to one side plate of the carrier CR1, and this carrier CR1 is rotatably supported by the boss 3a or the input shaft 2. The sun gear S1 is connected to the input shaft 2 and the friction plates 74 of the brake B1 are splined to the outer circumferential surface of the ring gear R1. This ring gear R1 is connected to the sun gear S3 via transmitting member 30.

Operations of the automatic transmission $1_4$ of the fourth embodiment will now be described below, with reference to FIG. 8, FIG. 9, and FIG. 10. As with the above-described first embodiment, the vertical axes of the speed line diagram illustrated in FIG. 10 indicate the speeds of the various rotary components, and the horizontal axis indicates the corresponding gear ratios of these rotary components. Regarding the first planetary gear unit PU section of this speed line diagram, the vertical axis to the farthest right side of FIG. 10 corresponds to sun gear S3, and moving to the left within the diagram, the vertical axes correspond to the carrier CR2, the ring gear R2, and the sun gear S2. Regarding the second planetary gear unit PR section of this speed line diagram, the vertical axis to the farthest right side of FIG. 10 corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the dotted horizontal line in the diagram represents the rotation transmitted by the transmitting member 30.

As FIG. 8 illustrates, the carrier CR1 is fixed to the case 3 by engagement of the brake B3, whereby the rotation of the input shaft 2 is input to the sun gear S1, and the ring gear R1 rotates a reduced speed, based on the rotation of input shaft 2 input to the sun gear S1 and the braking of the carrier CR1. By engaging the brake B3, the reduced speed rotation of the ring gear R1 is also input to the sun gear S3 via the transmitting member 30.

Figure 10:
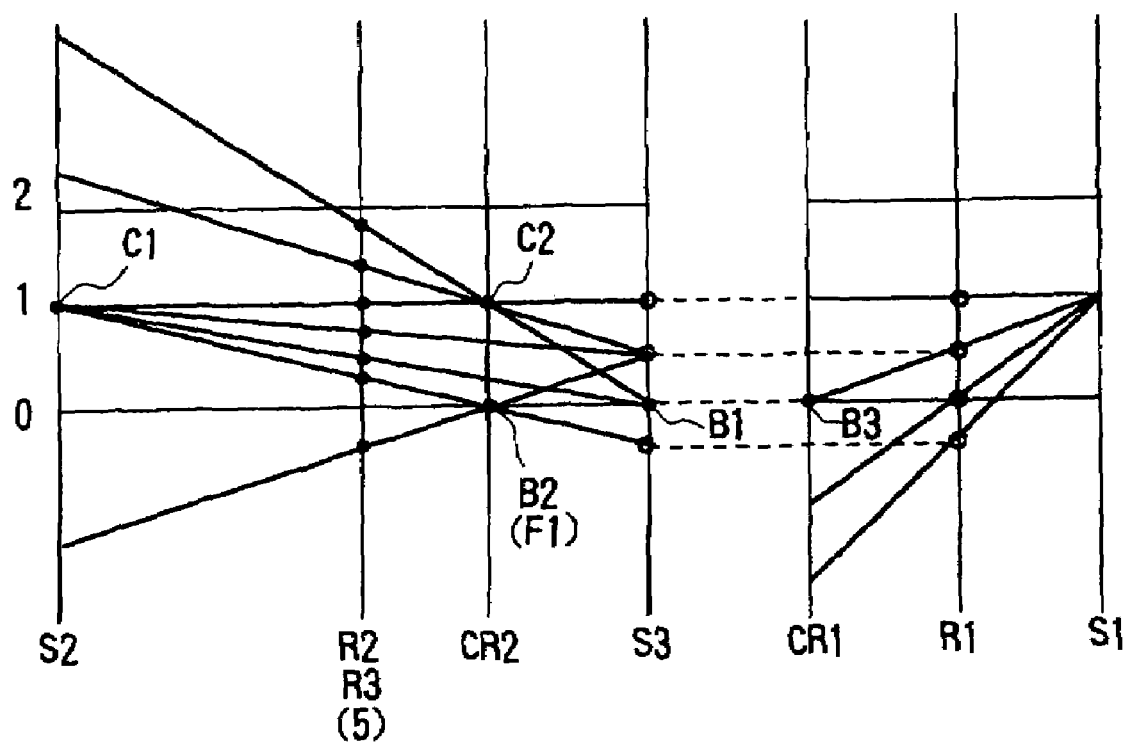
FIG. 10 is a speed line diagram for the automatic transmission of the fourth embodiment.

As FIG. 9 and FIG. 10 illustrate, in the second planetary gear unit PR in third speed forward, fifth speed forward, and first speed reverse, the rotation of the input shaft 2 is input to the sun gear S1 by engagement of the brake B3 to fix the carrier CR1, and the reduced speed rotation is output to the ring gear R3 by the input of rotation to the sun gear S1 from the input shaft 2, and this reduced speed rotation is input to the sun gear S3 via the transmitting member 30. In this case, the ring gear R1 and the sun gear S3 are rotating at reduced speed, and therefore the transmitting member 30 transmits a relatively large torque. On the other hand, in first speed forward, second speed forward, fourth speed forward, and sixth speed forward, the rotation of the sun gear S3 is input to the ring gear R1 via the transmitting member 30, and further, because the brake B3 is released, as FIG. 10 illustrates, the carrier CR1 rotates at a speed based on the speed of the ring gear R1 and of the sun gear S1.

The operations of the third embodiment, other than those of the planetary gear unit PR mentioned above, are similar to those of the above-described first embodiment (see FIG. 2 and FIG. 3), and, accordingly, description thereof will be omitted.

In the automatic transmission $1_3$ of the third embodiment, due to the second planetary gear unit PR and the clutch C1 being located on one side of the first planetary gear unit PU, and the clutch C2 being on its other side, the second planetary gear unit PR and the first planetary gear unit PU can be located more closely together as compared to the case wherein, for example, two clutches C1 and C2 are located between the second planetary gear unit PR and the first planetary gear unit PU, and the transmitting member 30 which transmits the reduced speed rotation can be made relatively shorter. By doing so, the automatic transmission can be made more compact and more lightweight. Further, because the inertia (inertial force) can be reduced, the controllability of the automatic transmission can be increased, and the occurrence of speed change shock can be reduced.

Further, since the hydraulic servos 11 and 12 are mounted on the input shaft 2, the seal rings 81 and 82 form seals between the case 3 and the oil lines 2a and 2b provided within input shaft 2, and therefore oil can be supplied to the oil chambers of hydraulic servos 11 and 12 without providing seal rings between, for example, the input shaft 2 and the hydraulic servos 11 and 12. Therefore, the oil supply can be connected simply by providing seal rings (81 and 82) for each of the hydraulic servos 11 and 12, sliding resistance from the seal rings can be minimized, and therefore the efficiency of the automatic transmission can be improved.

Further, because the counter gear 5 is located axially between the planetary gear unit PU and the planetary gear unit PR, the counter gear 5 can be located in approximately the axial center of the automatic transmission. Thus, enlargement towards the rear (when the side which receives input from the drive source is the "front") is not necessary because the counter gear 5 is mounted to mate with the drive wheel transmission device. Because of this, particularly in the case of a FF vehicle, interference with the front wheels is reduced, mountability on a vehicle is improved, and the steering angle is greatly increased, for example.

Further, because the reduced speed rotation output to the first planetary gear unit PU from the second planetary gear unit PR is controlled by selective engagement of the brake B3, the number of parts (for example, drum-shaped members and so forth) can be reduced compared to the case wherein, for example, a clutch C3 is provided. Further, the brake B3 can receive oil supply directly from the case 3, and therefore the configuration of the oil line can be simplified as compared to embodiments having a clutch C3.

The automatic transmission $1_4$ according to this fourth embodiment is directly coupled in fourth speed forward. Therefore, in fifth speed forward and sixth speed forward, the gear ratio can be a high ratio, and particularly when the vehicle is running at a high speed, the engine speed can be lower, thus allowing the vehicle to run more quietly at high speed.

Fifth Embodiment

The fifth embodiment, which is a partial modification of the first embodiment, will be described below, with reference to FIG. 11 in an abbreviated manner, using the same reference numerals for components that are the same as in the first embodiment.

Figure 11:
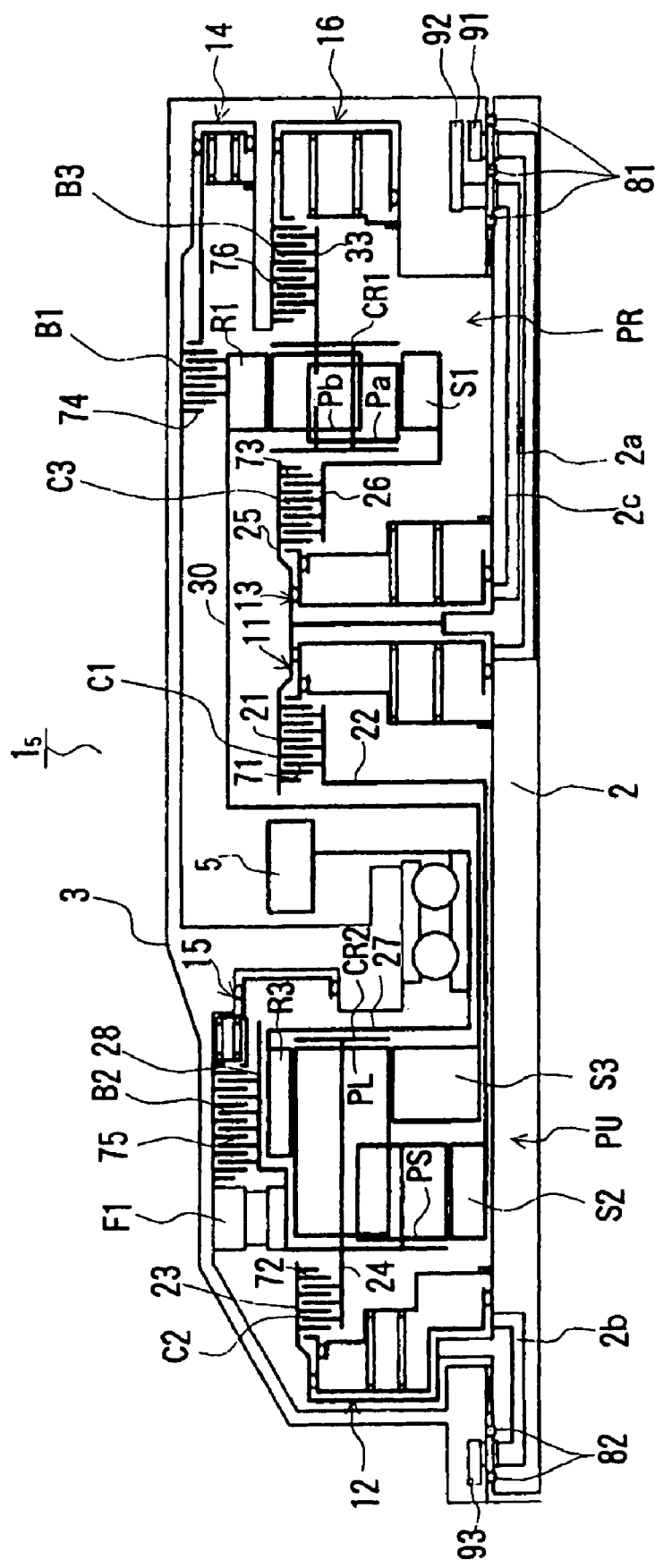
FIG. 11 is a schematic cross-sectional view of an automatic transmission according to a fifth embodiment.

As FIG. 11 illustrates, the automatic transmission $1_5$ of the fifth embodiment has the configuration of the second planetary gear unit PR and the clutch C3 modified relative to that the automatic transmission $1_1$ of the first embodiment (see FIG. 1), and further, a brake B3 is provided to fix the carrier CR1 of the second planetary gear unit PR.

In this fifth embodiment, the clutch C3 is located on the first planetary gear unit PU side (left side of diagram) of the second planetary gear unit PR, and the brake B3 is on the other side of the second planetary gear unit PR, opposite the first planetary gear unit PU. The inner circumferential surface of a front portion of the drum 25 of clutch C3 is splined to the friction plates 73, which are intermeshed with friction plates splined to the hub unit 26. Further, the drum 25 is connected to the input shaft 2, and the hub unit 26 is connected to the sun gear S1.

The brake B3 is on the side of the second planetary gear unit PR (right side of diagram) opposite the first planetary gear unit PU. This brake B3 comprises a hydraulic servo 16, friction plates 76, and a hub unit 33. The friction plates 76 are splined to the outer circumferential surface of the hub unit 33, and the hub unit 33 is connected to one side plate of the carrier CR1. Carrier CR1 is rotatably supported by the input shaft 2 or the boss 3a. The friction plates 74 of the brake B1 are splined to the outer circumferential surface of the ring gear R1, and this ring gear R1 is connected to the sun gear S3 via transmitting member 30.

The oil chamber of hydraulic servo 13 for the clutch C3 is connected to an oil line 2c which is formed in parallel with oil line 2a on the above-mentioned input shaft 2, and this oil line 2c is connected to the oil line 92 of the boss 3a of the case 3. Further, this oil line 92 is connected to an oil pressure control unit, not illustrated. In other words, because the hydraulic servos 11 and 13 are mounted on input shaft 2, an oil line from the oil pressure control unit, not illustrated, is connected to the oil chambers of the hydraulic servos 11 and 13 simply by providing seal rings 81 between the boss 3a and the input shaft 2.

Operations of the automatic transmission $1_5$ of the fifth embodiment will now be described below, with reference to FIG. 11, and, because the fifth embodiment is similar to the first embodiment, with reference to the engagement chart and the speed line diagram for the first embodiment (see FIG. 2 and FIG. 3).

As FIG. 11 illustrates, the rotation of input shaft 2 is input to the sun gear S1 by engaging the clutch C3. Further, the carrier CR1 is fixed to the case 3 by engagement of the brake B3. Therefore, upon engagement of the clutch C3 and the brake B3, the ring gear R1 will rotate at a reduced speed based on the rotation of input shaft 2 which is input to sun gear S1. In other words, by engaging the clutch C3 and the brake B3, the reduced speed rotation of the ring gear R1 is input to the sun gear S3 via the transmitting member 30.

Figure 3:
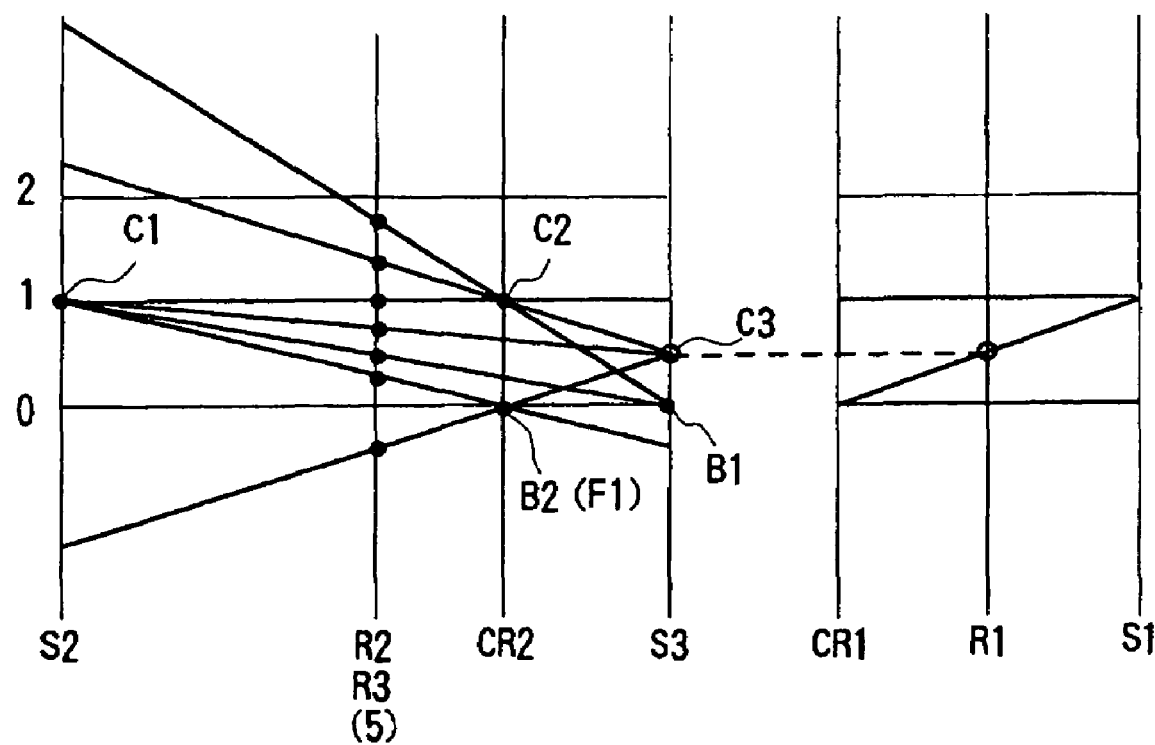
FIG. 3 is a speed line diagram for the first embodiment.
Figure 4:
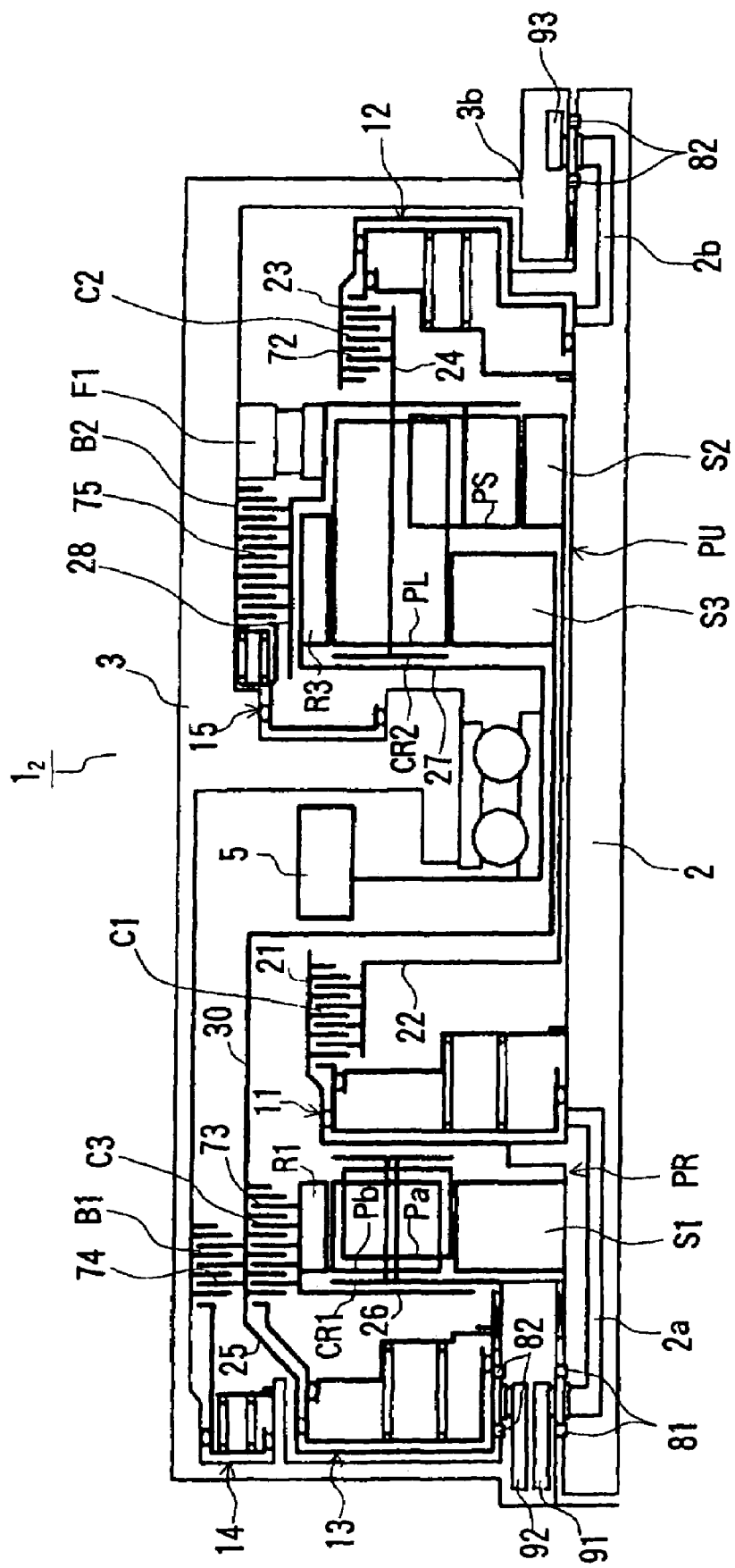
FIG. 4 is a schematic cross-sectional view of an automatic transmission according to a second embodiment.

By doing so, as FIG. 2 and FIG. 3 illustrate, regarding the second planetary gear unit PR, in third speed forward, fifth speed forward, and first speed reverse, the rotation of the input shaft 2 is input to the sun gear S1 by engaging the clutch C3, and further, the carrier CR1 is fixed by engagement of the brake B3, and therefore the reduced speed rotation is output to the ring gear R3 through the fixed carrier CR1, and from the ring gear R3 to the sun gear S3 via the transmitting member 30. Because the ring gear R1 and the sun gear S3 are rotating at a reduced speed, the transmitting member 30 transmits a relatively large torque. In first speed forward, second speed forward, fourth speed forward, and sixth speed forward, the rotation of the sun gear S3 is input to the ring gear R1 via the transmitting member 30, but because the clutch C3 and the brake B3 are released, the carrier CR1 and the sun gear S1 freely rotate.

Operations of the fifth embodiment, other than those of the second planetary gear unit PR, are similar to those of the first embodiment (see FIG. 2 and FIG. 3), and accordingly description thereof will not be repeated here.

As described above, in the automatic transmission $1_5$ of the present invention, due to location of the second planetary gear unit PR and the clutch C1 on one side of the first planetary gear unit PU, and the clutch C2 being located on the other side of the first planetary gear unit PU, the second planetary gear unit PR and the first planetary gear unit PU can be located more closely together, as compared to a transmission wherein, for example, two clutches C1 and C2 are located between the second planetary gear unit PR and the first planetary gear unit PU, and the transmitting member 30 can be made relatively shorter. Thus, the automatic transmission can be made compact and more lightweight. Further, because the inertia (inertial force) is reduced, the controllability of the automatic transmission is increased, and the occurrence of speed change shock is reduced. Further, compared a transmission wherein three clutches C1, C2, C3 are located on one side of the first planetary gear unit PU, the oil lines (for example, 2a, 2b, 91, 92, 93) that supply the hydraulic servos 11, 12, and 13 of these clutches C1, C2, C3 can be more easily constructed, the manufacturing process can be simplified and the costs can be reduced.

Further, since the hydraulic servos 11, 12, and 13 are mounted on the input shaft 2, the seal rings 81 and 82 serve to connect oil supply from the case 3 to the oil lines 2a and 2b, 2c provided within input shaft 2, and therefore oil can be supplied to the oil chambers of hydraulic servos 11, 12, and 13 without providing the seal rings between, for example, the input shaft 2 and the hydraulic servos 11, 12, and 13.

Therefore, sliding resistance from the seal rings can be minimized, and the efficiency of the automatic transmission can be improved.

Further, due to the counter gear 5 being located between the first planetary gear unit PU and the second planetary gear unit PR, the counter gear 5 can be located in approximately the axial center of the automatic transmission. For example, when the automatic transmission is mounted on a vehicle, enlargement towards the rear (when the input side facing the drive source is the "front") is not necessary because the counter gear 5 is mounted to mate with the drive wheel transmission device. Because of this, particularly in the case of a FF vehicle, interference with the front wheels is reduced, mountability on a vehicle is improved, and the steering angle is greatly increased.

Again, where the clutch C3 is placed between the ring gear R1 and the sun gear S3, it must be sufficiently large to transmit the high torque, reduced speed rotation, but by placing the clutch C3 between the input shaft 2 and the sun gear S1 it can indirectly control output of reduced speed rotation from the ring gear R1 of the second planetary gear unit PR, and therefore can be made more compact, and likewise the automatic transmission can be made more compact.

Further, the automatic transmission $1_5$ according to the fifth embodiment is directly coupled in fourth speed forward. Therefore, in fifth speed forward and sixth speed forward, the gear ratio can be a high ratio, and particularly when the vehicle is running at a high speed, the engine speed can be lower, thereby allowing the vehicle to run more quietly at a high speed.

Sixth Embodiment

A sixth embodiment, which is a partial modification of the first embodiment, will now be described with reference to FIG. 12. Components of the sixth embodiment which are the same as those of the first embodiment are denoted by the same reference numerals, and description thereof omitted, except for those components partially modified.

Figure 12:
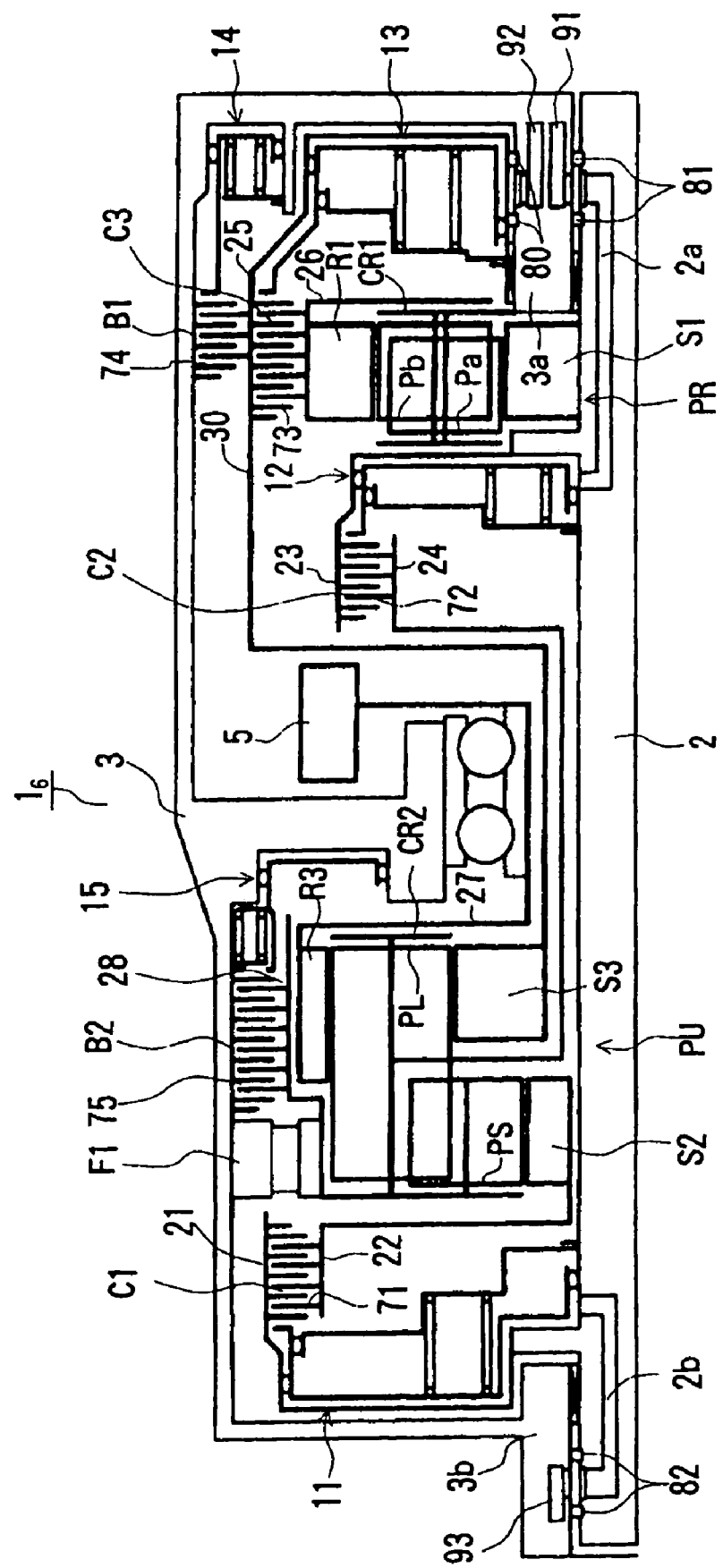
FIG. 12 is a schematic cross-sectional view of an automatic transmission of a sixth embodiment.

As FIG. 12 illustrates, the automatic transmission $1_6$ of the sixth embodiment has the clutch C2 located on the planetary gear unit PR side of the planetary gear unit PU, and the clutch C1 is located on its other side or, in other words, the sixth embodiment has the positions of the clutch C1 and the clutch C2 switched as compared to that of the automatic transmission $1_1$ of the first embodiment (see FIG. 1).

This automatic transmission $1_6$ includes a multi-disc clutch C2 comprising a hydraulic servo 12, friction plates 72, a clutch drum 23, a hub unit 24 linked to a sun gear S2 radially inward of the input shaft 2, and a multi-disc clutch C3 comprising a hydraulic servo 13, friction plates 73, a clutch drum 25, and a hub unit 24 linked to a sun gear S2 at the outer circumference. The automatic transmission further includes a multi-disc brake B1 comprising a hydraulic servo 14 and friction plates 74.

The drum 23 is connected to the input shaft 2, and the inner circumferential surface of a front portion is splined to the friction plates 72 of the clutch C2 which can be engaged by the hydraulic servo 12, and the friction plates 72 are intermeshed with friction plates splined to the hub unit 24. Further, this hub unit 24 is connected to the above-mentioned carrier CR2.

At the other end of the input shaft 2 (left side of the diagram) is a multi-disc clutch C1 comprising a hydraulic servo 11, friction plates 71, a clutch drum 21, and a hub unit 22 linked to a sun gear S2.

The inner circumferential surface of the front portion of this drum 21 is splined to the friction plates 71 of the clutch C1 that can be engaged by operation of the hydraulic servo 11. The friction plates 71 are intermeshed with friction plates splined to the hub unit 22 which is connected to the sun gear S2.

The operations of the automatic transmission $1_6$ of the sixth embodiment are similar to those of the first embodiment (see FIG. 2 and FIG. 3), and accordingly description thereof will be omitted here.

In the automatic transmission $1_6$ of this sixth embodiment, due to the second planetary gear unit PR and the clutch C2 being located on one side of the first planetary gear unit PU, and the clutch C1 being located on the other side of the first planetary gear unit PU, the second planetary gear unit PR and the first planetary gear unit PU can be located more closely together, as compared to a transmission wherein, for example, two clutches C1 and C2 are located between the second planetary gear unit PR and the first planetary gear unit PU, and the transmitting member 30 can be made relatively shorter. In this manner, the automatic transmission can be made more compact and more lightweight. Further, because the inertia (inertial force) can be reduced, the controllability of the automatic transmission can be increased, and the occurrence of speed change shock can be reduced. Further, compared to a transmission wherein three clutches C1, C2, C3 are located on one side of the first planetary gear unit PU, the oil lines (for example, 2a, 2b, 91, 92, 93) that supply the hydraulic servos 11, 12, and 13 of these clutches C1, C2, C3 can be more easily constructed, the manufacturing process can be simplified, and the cost can be reduced.

Further, since the hydraulic servos 11 and 12 are mounted on the input shaft 2, one set of seal rings (81 or 82) serve to form a oil supply connection between the oil lines 2a and 2b within input shaft 2 and the case 3, and therefore oil can be supplied to the oil chambers of hydraulic servos 11 and 12 without providing seal rings between, for example, the input shaft 2 and the hydraulic servos 11 and 12. Further, the hydraulic servo 13 can receive supply of oil directly from the boss 3a extended from the case 3, i.e., without passing through other parts, and therefore the oil supply can be connected by providing one set of seal rings 80. Therefore, sliding resistance from the seal rings can be minimized, and the efficiency of the automatic transmission can be improved.

Since the clutch C2 is located radially inward of the clutch C3, the clutch C3, which must transmit relatively large torque, low speed rotation, can be located near the outer circumference, and this clutch C3 and its hydraulic servo 13 can have an increased diameter, a larger pressure-receiving area, and a larger torque transmission capacity. Further, by giving the clutch C2 a smaller torque transmission capacity compared to the clutch C3, the automatic transmission can be made more compact.

As with the previously described embodiments, because the counter gear 5 is located axially between the first planetary gear unit PU and the second planetary gear unit PR, the counter gear 5 can be located in approximately the axial center of the automatic transmission. For example, when the automatic transmission is mounted on the vehicle, enlargement toward the rear (when the input side facing the drive source is the "front") is unnecessary because the counter gear 5 is mounted to mate with the drive wheel transmission device. Because of this, particularly in the case of a FF vehicle, interference with the front wheels is reduced, the mountability on a vehicle is improved, and the steering angle is greatly increased.

Further, the clutch C1 engages at the relatively slow to medium speeds of first speed forward, second speed forward, third speed forward, and fourth speed forward, and therefore when clutch C1 is released at the relatively high speeds of fifth speed forward, sixth speed forward, or first speed reverse, the hub unit 22 that connects this clutch C1 and the sun gear S2, in particular, rotates at a relatively high speed or in reverse (see FIG. 7). On the other hand, in fifth speed forward and first speed reverse the transmitting member 30 rotates at a reduced speed, and in sixth speed forward the transmitting member 30 may be fixed, and the difference in rotational speed between the hub unit 22 and the transmitting member 30 can be great. However, because this clutch C1 is located on the side of the first planetary gear unit PU opposite the second planetary gear unit PR, the hub unit 22 and the transmitting member 30 can be spaced apart from one another. Compared with a transmission wherein these units are in contact due to a multi-axial configuration, decreased efficiency of the automatic transmission resulting from friction and so forth from the relative rotation of those units can be prevented.

Further, the automatic transmission $1_6$ according to the sixth embodiment is directly coupled in fourth speed forward. Therefore, in fifth speed forward and sixth speed forward, the gear ratio can be a high ratio, and particularly when the vehicle is running at a high speed, the engine speed can be lowered, allowing the vehicle to run more quietly at a high speed.

The transmitting member which links the second planetary gear unit PR and the first planetary gear unit PU must be sufficiently rigid to withstand the reduced speed, high torque that it transmits. For example, a clutch that engages at a slow to medium speed or a clutch that engages and disengages for transmission of reduced speed rotation must have a large capacity, therefore a diameter appropriate for this capacity becomes necessary. Therefore, in the event that the transmitting (linking) member passes on the radially outer side of this type of clutch, an even larger diameter for those clutches becomes necessary, the diameter of the transmitting member is enlarged more than necessary, and the radial dimension of the automatic transmission as a whole becomes greater. Accordingly, it is an object of this embodiment to reduce of the diameter, and thereby provide a more compact automatic transmission.

In this sixth embodiment, all clutches can be arranged so as to avoid need for enlarging the diameter of the linking member, specifically by arranging a clutch C2 with a small capacity on the radially inward side of the transmitting member 30.

Seventh Embodiment

The seventh embodiment is a partial modification of the sixth embodiment and will be described with reference to FIG. 13. Components of the seventh embodiment which are the same as those of the sixth embodiment are denoted by the same reference numerals, and description thereof omitted here, except for those components which are partially modified.

Figure 13:
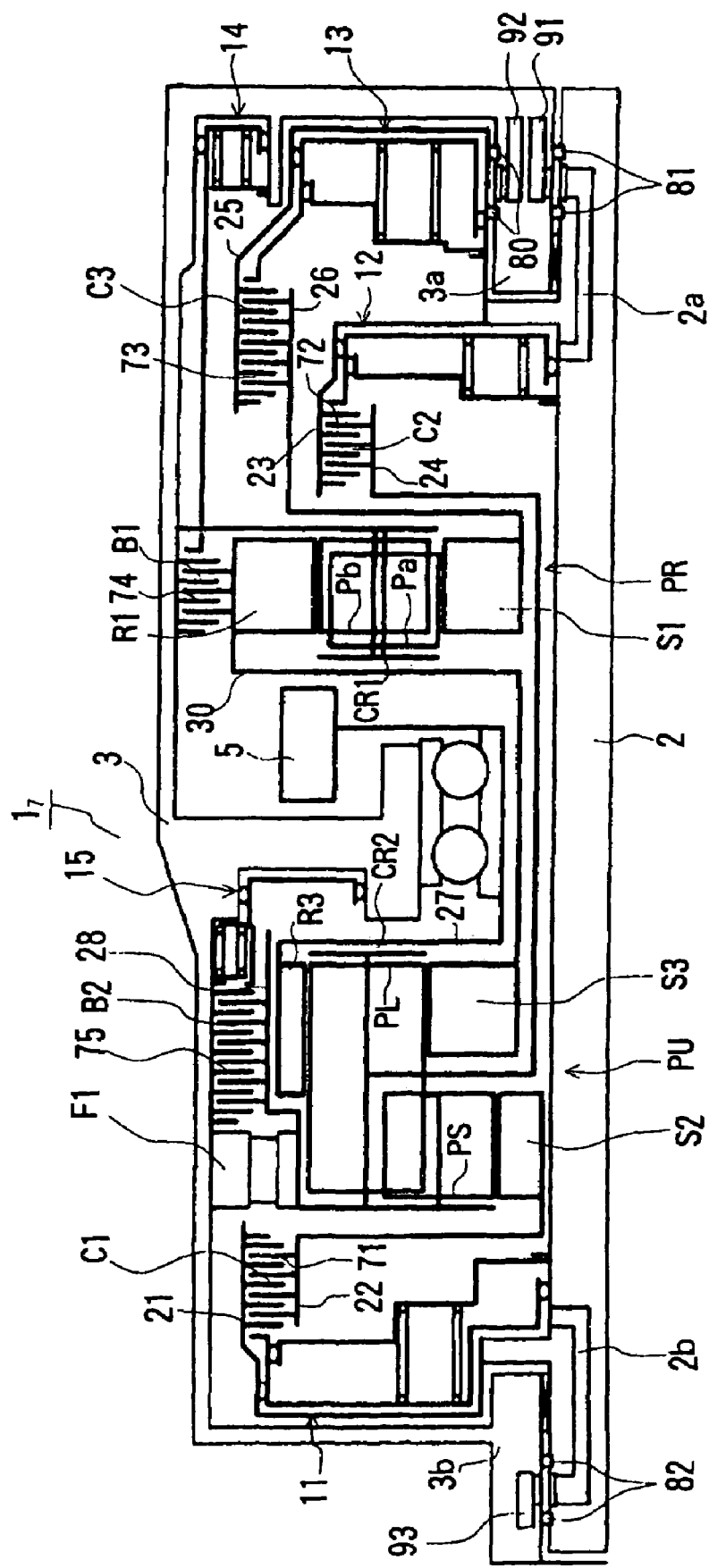
FIG. 13 is a schematic cross-sectional view of an automatic transmission of a seventh embodiment.

As FIG. 13 illustrates, the automatic transmission $1_7$ of the seventh embodiment has a modified configuration of the second planetary gear unit PR, the clutch C2 and the clutch C3, as compared to the automatic transmission $1_6$ of the sixth embodiment (see FIG. 12).

The clutch C2 and the clutch C3 are located on the side of the second planetary gear unit PR (right side of diagram) opposite the first planetary gear unit PU within the automatic transmission $1_7$. The inner circumferential surface of a front portion of the drum 25 of this clutch C3 is splined to the friction plates 73, which are intermeshed with friction plates splined to the hub unit 26. The drum 25 is connected to the input shaft 2, and the hub unit 26 is connected to the sun gear S1 of the second planetary gear unit PR. The clutch C2 comprises a hydraulic servo 12, friction plates 72, a drum 23, and a hub unit 24 and is located radially inward of the clutch C3, that is to say, clutch C2 is enclosed within the hub unit 26.

On the other hand, radially outward of the second planetary gear unit PR is a multi-disc brake B1 that comprises a hydraulic servo 14 and friction plates 74. The side plate of the carrier CR1 of this second planetary gear unit PR is fixed to and supported by the case 3. Further, the ring gear R1 is connected to the sun gear S3 by the transmitting member 30, and the friction plates 74 of the brake B1 are splined to the outer circumferential surface of this transmitting member 30.

The operations of the automatic transmission $1_7$, of this seventh embodiment are similar to those of the third embodiment (see FIG. 6 and FIG. 7), and accordingly description thereof will be omitted here.

In the automatic transmission $1_7$ of the seventh embodiment, due to the second planetary gear unit PR and the clutch C2 being located on one side of the first planetary gear unit PU, and the clutch C1 being located on the other side of the first planetary gear unit PU, the second planetary gear unit PR and the first planetary gear unit PU can be located more closely together, as compared to an embodiment wherein, for example, two clutches C1 and C2 are located between the second planetary gear unit PR and the first planetary gear unit PU, and the transmitting member 30 which transmits the reduced speed rotation can be made relatively shorter. In this manner, the automatic transmission can be made more compact and more lightweight. Further, because the inertia (inertial force) can be reduced, controllability of the automatic transmission can be increased, and the occurrence of speed change shock can be reduced. Further, compared to the case wherein three clutches C1, C2, C3 are located on one side of the first planetary gear unit PU, the oil lines (for example, 2a, 2b, 91, 92, 93) that supply the hydraulic servos 11, 12, and 13 of these clutches C1, C2, C3 can be more easily constructed, the manufacturing process can be simplified, and the cost can be reduced.

Further, since the hydraulic servos 11 and 12 are mounted on the input shaft 2, one set of seal rings 81 and 82 serve to connect and the supply of oil from the case 3 to the oil lines 2a and 2b provided within input shaft 2, and therefore oil can be supplied to the oil chambers of hydraulic servos 11 and 12 without providing seal rings between, for example, the input shaft 2 and the hydraulic servos 11 and 12. Further, the hydraulic servo 13 can be supplied with oil directly from the boss 3a extended from the case 3, i.e., without passing through other components, and therefore oil supply can be connected by providing one set of seal rings 80. Therefore, sliding resistance from the seal rings can be minimized, and efficiency of the automatic transmission can be improved.

Further, since the counter gear 5 is located axially between the first planetary gear unit PU and the second planetary gear unit PR, the counter gear 5 can be located in approximately the axial center of the automatic transmission. In this embodiment also, enlargement toward the rear (when the input side facing the drive source is the "front") is not necessary because the counter gear 5 is mounted to mate with the drive wheel transmission device. Because of this, particularly in the case of a FF vehicle, interference with the front wheels is reduced, mountability on a vehicle is improved, and the steering angle is greatly increased.

The clutch C1 engages at the relatively slow to medium speeds of first speed forward, second speed forward, third speed forward, and fourth speed forward, and therefore when this clutch C1 is released at the relatively high speeds of fifth speed forward, sixth speed forward, or first speed reverse, in particular the hub unit 22 that connects clutch C1 and the sun gear S2 rotates at a relatively high speed or in reverse (see FIG. 7). On the other hand, in fifth speed forward and first speed reverse the transmitting member 30 rotates at a reduced speed, and in sixth speed forward the transmitting member 30 can be engaged, whereby there can be a large difference in speed as between the hub unit 22 and the transmitting member 30. However, because clutch C1 is located on the side of the first planetary gear unit PU opposite the second planetary gear unit PR, the hub unit 22 and the transmitting member 30 can be spaced apart from one another. In comparison with a transmission wherein, for example, these members are in contact due to a multi-axial configuration, decreased efficiency of the automatic transmission resulting from friction and so forth from the relative rotation can be prevented.

If the clutch C3 were to be placed between the ring gear R1 and the sun gear S3, for example, it must engage and disengage the reduced speed rotation, and therefore must be relatively large. However, by placing the clutch C3 between the input shaft 2 and the sun gear S1, the engaging and disengaging of the rotation of the input shaft 2 by clutch C3 indirectly controls output of the reduced rotation from the ring gear R1 of the second planetary gear unit PR, and therefore the clutch C3 and the automatic transmission as a whole can be made more compact.

Further, the automatic transmission $1_7$ according to the seventh embodiment is directly coupled in fourth speed forward. Therefore, in fifth speed forward and sixth speed forward, the gear ratio can be a high ratio, and particularly when the vehicle is running at a high speed, the engine speed can be lowered, thereby allowing the vehicle to run more quietly at a high speed.

If a clutch were to be located between the second planetary gear unit PR and the first planetary gear unit PU, for example, the length of the linking member (transmitting member) that links the second planetary gear unit PR and the first planetary gear unit PU must be axially elongated, and because this transmitting member transmits the reduced speed rotation, the thickness of the unit must be increased so as to withstand the high torque, and therefore the weight is increased. Therefore, an object of the present invention is to provide an automatic transmission wherein the distance between the speed reducing second planetary gear unit and the first planetary gear unit is reduced, and the weight is thereby reduced.

In this seventh embodiment, in particular, the clutch C2 is located on the side of the second planetary gear unit PR axially opposite the first planetary gear unit PU, and therefore, locating a clutch between the first and second planetary gear units is not necessary, and the length of the transmitting member 30 can be made that much shorter. Therefore, the weight of the automatic transmission as a whole can be reduced.

Eighth Embodiment

The eighth embodiment, which is a partial modification of the sixth embodiment, will be described with reference to FIG. 14. Components of the eighth embodiment which are the same as those of the sixth embodiment are denoted by the same reference numerals, and description thereof is omitted here, except for those components which are modified.

Figure 14:
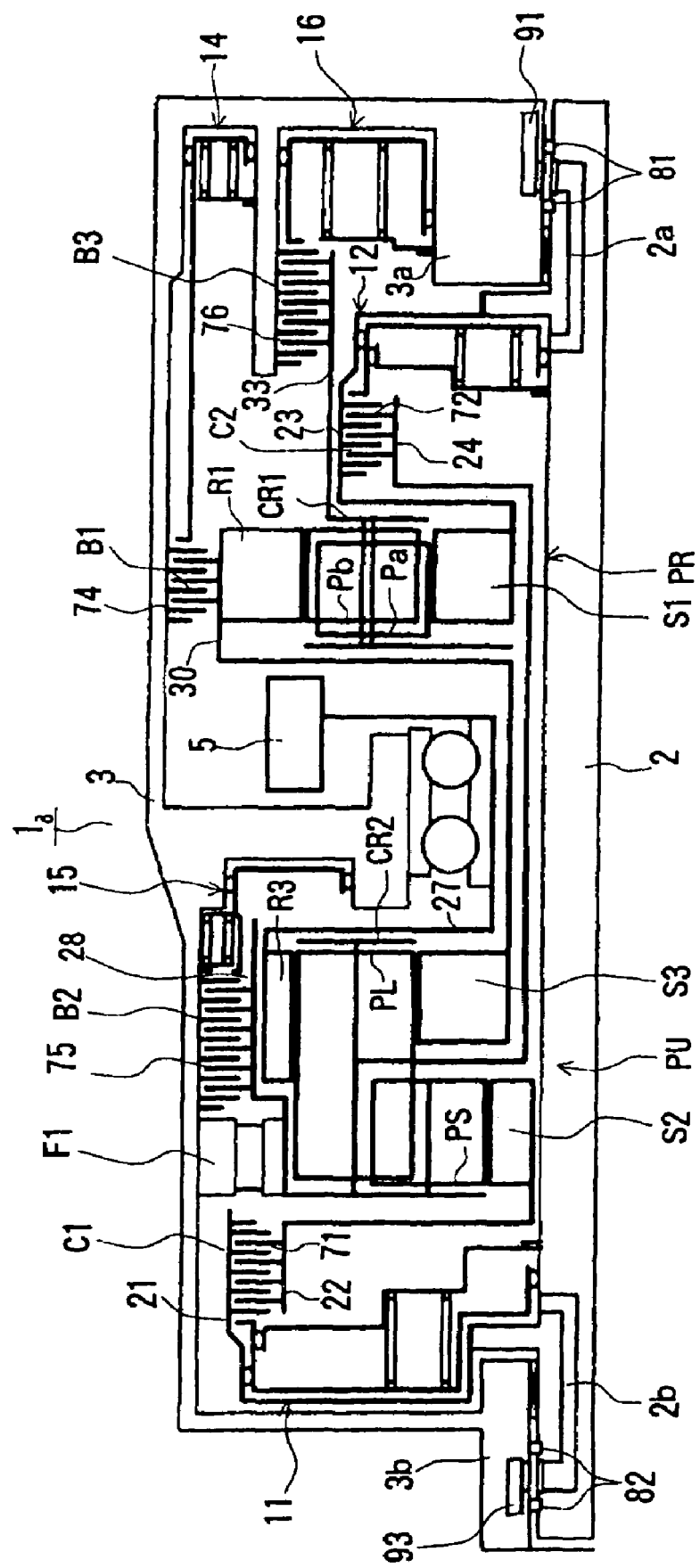
FIG. 14 is a schematic cross-sectional view of an automatic transmission according to an eighth embodiment.

As FIG. 14 illustrates, the automatic transmission $1_8$ of the eighth embodiment has the configuration of the clutch C2 modified, has a brake B3 instead of a clutch C3, and enables the carrier CR1 of second planetary gear unit PR to be fixed by the brake B3, which features differ from those of the automatic transmission $1_6$ of the first embodiment (see FIG. 12).

Within the automatic transmission $1_8$ of the eighth embodiment, the brake B3 is located on the side of the second planetary gear unit PR axially opposite (right side on the diagram) the planetary gear unit PU. Brake B3 comprises a hydraulic servo 16, friction plates 76, and a hub unit 33. The clutch C2, comprises a hydraulic servo 12, friction plates 72, a drum 23, and a hub unit 24, and is located radially inward of the brake B3, i.e., within the hub unit 33. The hub unit 33 of brake B3 is connected to one side plate of the carrier CR1, and the other (opposite) side plate of the carrier CR1 is rotatably supported by the input shaft 2. Further, the sun gear S1 is connected to the input shaft 2 via the drum 24 of the clutch C2. The friction plates 74 of the brake B1 are splined to the outer circumferential surface of the ring gear R1, and this ring gear R1 is connected by the transmitting member 30 to the sun gear S3.

The operations of the automatic transmission $1_8$ of the eighth embodiment are similar to those of the fourth embodiment (see FIG. 9 and FIG. 10), and accordingly description thereof will not be repeated here.

In the automatic transmission $1_8$ of the eighth embodiment, due to the second planetary gear unit PR and the clutch C2 being located on one side of the first planetary gear unit PU, and the clutch C1 being located on the axially opposite side of the first planetary gear unit PU, the second planetary gear unit PR and the first planetary gear unit PU can be located more closely together, as compared to the transmission wherein, for example, two clutches C1 and C2 are located between first and second planetary gear units, and the transmitting member 30 can be relatively shorter. By doing so, the automatic transmission can be made more compact and more lightweight. Further, because the inertia (inertial force) is reduced, the controllability of the automatic transmission is increased, and the occurrence of speed change shock is reduced.

Further, since the hydraulic servos 11 and 12 are mounted on the input shaft 2, the seal rings 81 and 82 serve to connect supply of oil between the oil lines $2a$ and $2b$ provided within input shaft 2 and the case 3, and therefore oil can be supplied to the oil chambers of hydraulic servos 11 and 12 without providing the seal rings between, for example, the input shaft 2 and the hydraulic servos 11 and 12. Therefore, sliding resistance from seal rings can be minimized, and the efficiency of the automatic transmission can be improved.

Further, since the counter gear 5 is located axially between two planetary gear units, the counter gear 5 is in approximately the axial center of the automatic transmission. As in the previously described embodiments, enlarging toward the rear (when the input side facing the drive source is the "front") is not necessary because the counter gear 5 is mounted to mate with the drive wheel transmission device.

Because of this, particularly in the case of a FF vehicle, interference with the front wheels is reduced, mountability on the vehicle is improved, and the steering angle is greatly increased.

Further, the clutch C1 engages at the relatively slow to medium speeds of first speed forward, second speed forward, third speed forward, and fourth speed forward, and therefore when this clutch C1 is released at the relatively high speed levels of fifth speed forward, sixth speed forward, or first speed reverse, the hub unit 22 that connects this clutch C1 and the sun gear S2 rotates at a relatively high speed or in reverse (see FIG. 10). On the other hand, in fifth speed forward or first speed reverse the transmitting member 30 rotates at reduced speed, and in sixth speed forward the transmitting member 30 may be fixed in some cases, and a difference in speed between the hub unit 22 and the transmitting member 30 can result. However, because clutch C1 is located on the side of the first planetary gear unit PU axially opposite the second planetary gear unit PR, the hub unit 22 and the transmitting member 30 can be spaced apart from one another. In comparison with a transmission wherein, for example, these members are in contact due to a multi-axial configuration, loss in efficiency of the automatic transmission resulting from friction and so forth from the relative rotation of those units can be prevented.

Further, because the reduced speed rotation output to the first planetary gear unit PU from the second planetary gear unit PR is engaged and disengaged by the brake B3, the number of parts (for example drum-shaped members and so forth) can be reduced as compared to an embodiment employing a clutch C3. Further, the brake B3 can receive oil supply directly from the case 3, and therefore the configuration of the oil line can be simplified as compared to an embodiment employing a clutch C3.

Further, the automatic transmission $1_8$ according to the eighth embodiment is directly coupled in fourth speed forward. Therefore, in fifth speed forward and sixth speed forward, the gear ratio can be a high ratio, and particularly when the vehicle is running at a high speed, the engine speed can be lowered, allowing the vehicle to run more quietly at a high speed.

If a clutch is located between the first and second planetary gear units, the length of the transmitting member that links the first and second planetary gear units must be axially elongated and since this transmitting member transmits the reduced speed rotation, its thickness must be so as to withstand a high torque, and therefore the weight is also increased. Therefore, an object of the present invention is to provide an automatic transmission in which the distance between the speed reducing second planetary gear unit and the first planetary gear unit is shortened and the weight is thereby reduced.

In this eighth embodiment, in particular, the clutch C2 is disposed on the side of the second planetary gear unit PR axially opposite the first planetary gear unit PU, and therefore, provision of a clutch between the planetary gear units is not necessary, and the length of the transmitting member 30 can be made that much shorter. Therefore, weight of the automatic transmission as a whole can be reduced.

Ninth Embodiment

The ninth embodiment, which is a partial modification of the first embodiment, will now be described with reference to FIG. 15. Components of the ninth embodiment which are the same as those of the first embodiment are denoted by the same reference numerals, and description thereof omitted, except for partial modifications.

Figure 15:
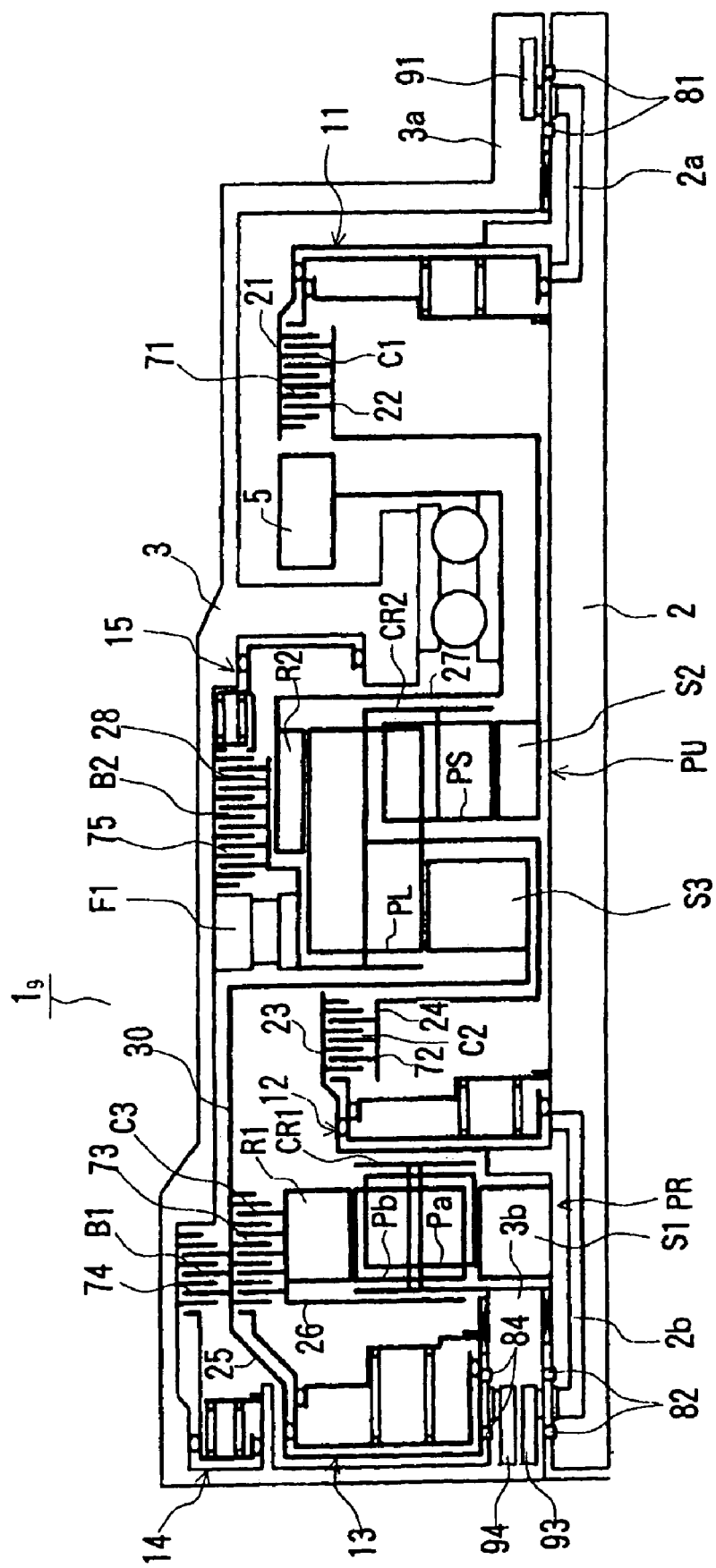
FIG. 15 is a schematic cross-sectional view of an automatic transmission according to a ninth embodiment.

As FIG. 15 illustrates, the automatic transmission $1_9$ of the automatic transmission of the ninth embodiment has clutch C2 located axially between the planetary gear units, and has the clutch C1 and the counter gear 5 on the side of the first planetary gear unit PU axially opposite the second planetary gear unit PR. Thus, the locations of the clutch C1 and the clutch C2 are reversed, and further, the positions of the second planetary gear unit PR, the clutch C3, and the brake B1 and the position of the counter gear 5 are reversed as compared to the automatic transmission $1_1$ of the first embodiment (see FIG. 1).

Within the automatic transmission $1_9$, mounted on the input shaft 2 is a multi-disc clutch C1, which comprises a hydraulic servo 11, friction plates 71, a clutch drum 21, and a hub unit 22 linked to a sun gear S2 on the radially inner side.

The oil chamber of this hydraulic servo 11 is connected to oil line 2a which, in turn, is connected to the oil line 91 of the boss 3a in the form of a sleeve surrounding one end of the input shaft 2. Oil line 91 connects to the oil pressure control unit, not illustrated. In other words, since the above-mentioned hydraulic servo 11 is mounted on input shaft 2, oil supply from the oil pressure control unit to the oil chamber of the hydraulic servo 11 is connected simply by providing one set of seal rings 81 between the boss 3a and the input shaft 2.

The input shaft 2 is connected to the drum 21 having an inner surface to which the friction plates 71 of the clutch C1 are splined. The friction plates 71 of this clutch C1 are intermeshed with friction plates splined to the hub unit 22 which, in turn, is connected to the sun gear S2.

On the other side of the input shaft 2 (left side in diagram) is a multi-disc clutch C2 that has a hydraulic servo 12, friction plates 72, a clutch drum 23, and a hub unit 24 linked to a carrier CR2. On the outer circumference side is a multi-disc clutch C3 that comprises an hydraulic servo 13, friction plates 73, and a clutch drum 25. Further, located on the outer circumferential side of the clutch drum 25 is a multi-disc brake B1 that comprises a hydraulic servo 14 and friction plates 74.

The oil chamber of hydraulic servo 12 is connected to an oil line 2b which is formed on the input shaft 2, and this oil line 2b is connected to the oil line 93 of the boss 3b which is formed as a sleeve around one end of the input shaft 2. Therefore, oil communication from the oil pressure control unit to the oil chamber of the hydraulic servo 12 is connected simply by providing one set of seal rings 82 between the boss 3a and the input shaft 2.

Further, the oil chamber of the hydraulic servo 13 is connected to an oil line 94 in the boss 3b, which oil line 94 is connected to the oil pressure control unit, by providing one set of seal rings 84 to form a seal between the boss 3b and the clutch drum 25.

The input shaft 2 is connected to the clutch drum 23 at the left side of the diagram, and the inner circumferential surface this clutch drum 23 is splined to the friction plates 72 of the clutch C2 which are intermeshed with friction plates splined to the hub unit 24 which is connected to the above-mentioned carrier CR2.

The above-mentioned clutch drum 25 is rotatably supported by the boss 3b, and a front portion of the outer circumferential surface of clutch drum 25 is splined to friction plates 74 of the brake B1 which is engaged/disengaged by operation of the hydraulic servo 14. The inner circumferential surface of the front portion of clutch drum 25 is splined to the friction plates 73 of the clutch C3 which is engaged/disengaged by operation of the hydraulic servo 13 for the clutch C3. The friction plates 73 of this clutch C3 are intermeshed with friction plates splined to the ring gear R1.

Further, carrier CR1 has a pinion Pa and a pinion Pb. Pinion Pb meshes with the ring gear R1 and pinion Pa meshes with the sun gear S1 which is connected to the input shaft 2. This carrier CR1 is secured to the boss 3b via a side plate, and this ring gear R1 is rotatably supported by a support element 26 extending to the boss 3b.

Further, the clutch drum 25 is connected by a linking member 30 that transmits rotation of the ring gear R1, when the clutch C3 is engaged, to the sun gear S3 of the above-mentioned first planetary gear unit PU.

The operations of the automatic transmission $1_9$ of this ninth embodiment are similar to those of the first embodiment (see FIG. 2 and FIG. 3), and accordingly description thereof will not be repeated here.

As described above, in the automatic transmission $1_9$ of the ninth embodiment, because the second planetary gear unit PR and the clutch C2 are located on one side of the first planetary gear unit PU, and the clutch C1 is located on the axially opposite side of the first planetary gear unit PU, the second planetary gear unit PR and the first planetary gear unit PU can be located more closely together, as compared to an automatic transmission wherein, for example, two clutches C1 and C2 are located between the planetary gear units PR and PU, and the transmitting member 30 for transmitting the reduced speed rotation can be made relatively shorter. In this manner, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2a, 2b, 91, 93, 94) that supply the hydraulic servos 11, 12, and 13 of these clutches C1, C2, C3 can be more easily constructed, the manufacturing process can be simplified and the costs can be reduced.

Further, since the hydraulic servos 11 and 12 are located on the input shaft 2, one set of seal rings 81 and 82 form an oil supply connection by providing a seal between the case 3 and oil lines 2a and 2b provided within input shaft 2. Therefore, oil can be supplied to the oil chambers of hydraulic servos 11 and 12 without providing seal rings between, for example, the input shaft 2 and the hydraulic servos 11 and 12. Further, the hydraulic servo 13 can receive oil directly from the boss 3a which extends from the case 3, i.e., without passing through other components, and therefore can be supplied oil by providing one set of seal rings 80. Therefore, the oil supply can be connected simply by providing one set of seal rings 81 and 82, 84 for each of the hydraulic servos 11, 12, and 13, sliding resistance from the seal rings can be minimized, and therefore the efficiency of the automatic transmission can be improved.

Further, because the clutch C2 is located radially inward of the clutch C3, the clutch C3, which must bear a relatively large torque in transmitting the reduced speed rotation, can be located at the outer circumference, and therefore this clutch C3 and the hydraulic servo 13 thereof can have an increased diameter. In particular the pressure-receiving area of the oil chamber of the hydraulic servo 13 can be enlarged, and the torque transmitting capacity of this clutch C3 can be increased. By designing the clutch C2 to have a smaller torque transmitting capacity than the clutch C3, the automatic transmission can be made more compact.

Further, the clutch C1 engages at the relatively slow to medium speeds of first speed forward, second speed forward, third speed forward, and fourth speed forward, and therefore when this clutch C1 is released at the relatively high speed levels of fifth speed forward, sixth speed forward, or first speed reverse, the hub unit 22 that connects clutch C1 to the sun gear S2 rotates at a relatively high speed or revolves in reverse (see FIG. 3). On the other hand, in fifth speed forward and first speed reverse the transmitting member 30 rotates at reduced speed, and in sixth speed forward the transmitting member 30 may be fixed in some cases, and therefore the speed of the hub unit 22 may differ from that of the transmitting member 30. However, because this clutch C1 is located on the side of the first planetary gear unit PU axially opposite the second planetary gear unit PR, the hub unit 22 and the transmitting member 30 can be spaced apart from one another. In comparison to a transmission wherein, for example, these members are in contact due to a multi-axial configuration, a decrease in efficiency of the automatic transmission resulting from friction and so forth from the relative rotation of those units can be prevented.

Further, the automatic transmission $1_9$ of the ninth embodiment is directly coupled in fourth speed forward. Therefore, in fifth speed forward and sixth speed forward, the gear ratio can be a high ratio, and particularly when the vehicle is running at a high speed, the engine speed can be lowered, thus allowing the vehicle to run more quietly at a high speed.

The transmitting member which connects the second planetary gear unit PR and the first planetary gear unit PU requires rigidity to withstand the reduced speed torque it transmits. For example, a clutch that engages at a slow to medium speed and a clutch that engages and disengages at a reduced speed on the inner circumference side of the linking member must have a large capacity and, therefore, must have a diameter corresponding to this capacity. Therefore, in the event that the transmitting member passes radially outward of this type of clutch, a diameter even larger than the aforementioned necessary diameter is required and the automatic transmission as a whole will have a larger diameter. Therefore an object of the present embodiment is to reduce the diameter and to provide a more compact automatic transmission.

According to the present embodiment, enlargement of the diameter of the transmitting member is avoided by mounting a clutch C2 with a small capacity on the radially inward side of the transmitting member 30.

Tenth Embodiment

A tenth embodiment which is a partial modification of the ninth embodiment will now be described with reference to FIG. 16. Components of the tenth embodiment which are the same as those of the ninth embodiment are denoted by the same reference numerals, and description thereof will be omitted here, except for the partial modifications.

Figure 16:
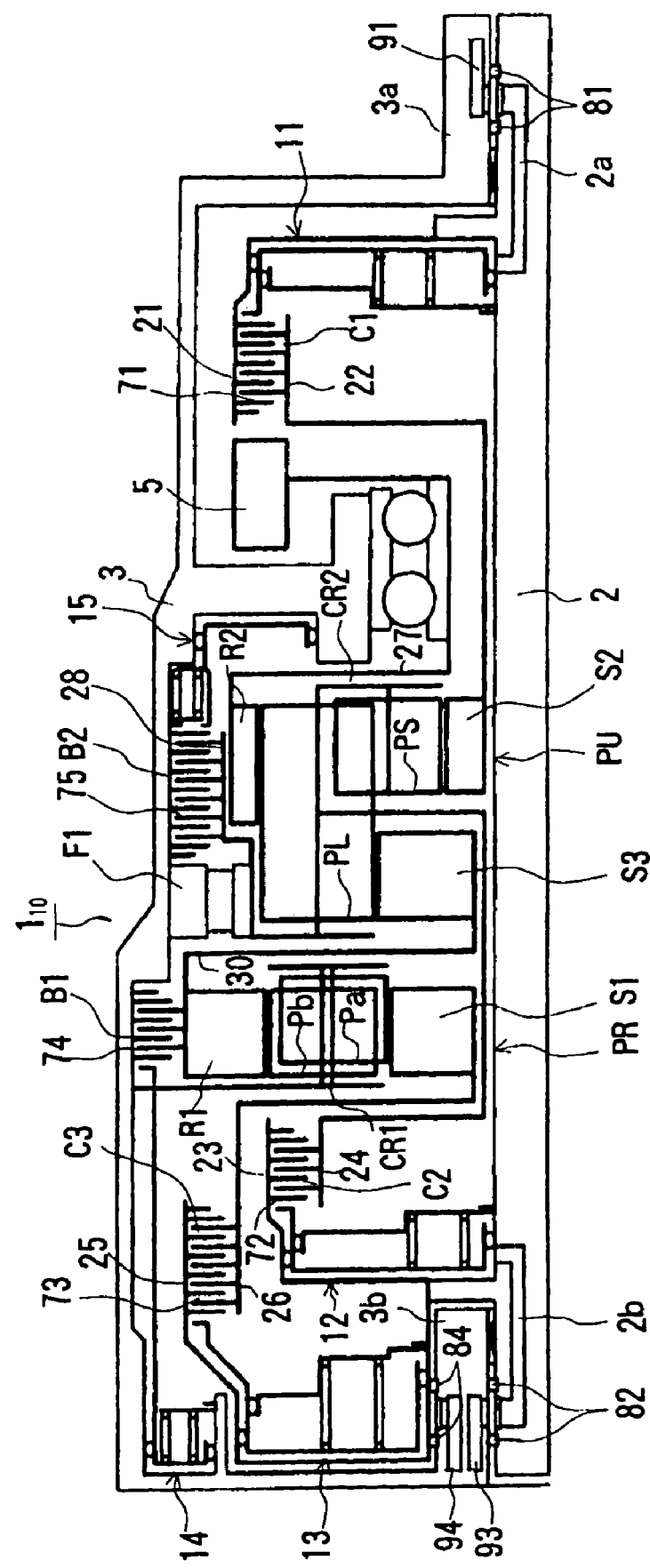
FIG. 16 is a schematic cross-sectional view of an automatic transmission according to a tenth embodiment.

As FIG. 16 illustrates, the automatic transmission $1_{10}$ of the tenth embodiment has the configuration of the second planetary gear unit PR and that of the clutch C3 modified as compared to that of the automatic transmission of the first embodiment (see FIG. 15).

The clutch C3 is located on the side of the second planetary gear unit PR (left side of diagram) opposite the first planetary gear unit PU. The inner circumferential surface of a front portion of the drum 25 of this clutch C3 is splined to the friction plates 73 which are intermeshed with friction plates splined to the hub unit 26. The drum 25 is connected to the input shaft 2, and the hub unit 26 is connected to the sun gear S1. Further, the clutch C2, comprising a hydraulic servo 12, friction plates 72, a drum 23, and a hub unit 24, is located radially inward of the clutch C3, that is to say, is located within the hub unit 26.

On the outer circumference side of the first planetary gear unit PU is located a multi-disc brake B1 that comprises a hydraulic servo 14 and friction plates 74. The side plate of the carrier CR1 of this second planetary gear unit PR is fixed to and supported by the case 3. Further, the ring gear R1 is connected to the transmitting member 30, and the friction plates 74 of the brake B1 are splined to the outer circumferential surface of this transmitting member 30 which is connected to the sun gear S3.

The operations of the automatic transmission $1_{10}$, are similar to those of the third embodiment (see FIG. 6 and FIG. 7) and, accordingly, description thereof will not be repeated here.

As described above, according to the automatic transmission $1_{10}$ of the tenth embodiment, due to the second planetary gear unit PR and the clutch C2 being located on one side of the planetary gear unit PU, and the clutch C1 being located on the axially opposite side of the first planetary gear unit PU, the planetary gear units PR and PU can be positioned more closely together, as compared to the case wherein for example two clutches C1 and C2 are located in between the second planetary gear unit PR and the first planetary gear unit PU, and the transmitting member 30 which transmits the reduced speed rotation can be made relatively shorter. In this manner, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2a, 2b, 91, 93, 94) that supply the hydraulic servos 11, 12, and 13 of these clutches C1, C2, C3 can be more easily constructed, the manufacturing process can be simplified and the costs can be reduced.

Further, since the hydraulic servos 11 and 12 are located on the input shaft 2, one set of seal rings 81 and 82 seal the case 3 and connect supply of oil to the oil lines 2a and 2b provided within input shaft 2, and therefore oil can be supplied to the oil chambers of the hydraulic servos 11 and 12 without providing seal rings between, for example, the input shaft 2 and the hydraulic servos 11 and 12. Further, the hydraulic servo 13 can receive supply of oil directly from the boss 3b which extends from the case 3, without passing through other components, and therefore the oil supply can be connected by providing one set of seal rings 84. Therefore, oil can be supplied simply by providing one set of seal rings 81 and 82, 84 each for the hydraulic servos 11, 12, and 13, sliding resistance from the seal rings can be minimized, and therefore the efficiency of the automatic transmission can be improved.

Further, the clutch C1 engages in the relatively slow to medium speeds of first speed forward, second speed forward, third speed forward, and fourth speed forward, and therefore when this clutch C1 is released at the relatively high speeds of fifth speed forward, sixth speed forward, or first speed reverse, in particular the hub unit 22 that connects this clutch C1 and the sun gear S2 rotates at a relatively high speed or in reverse (see FIG. 7). On the other hand, in fifth speed forward or first speed reverse the transmitting member 30 rotates at the reduced speed, and in sixth speed forward the transmitting member 30 may be fixed in some cases, and a difference in speed as between the hub unit 22 and the transmitting member 30 can occur. However, because this clutch C1 is located on the side of the first planetary gear unit PR axially opposite the second planetary gear unit PR, the hub unit 22 and the transmitting member 30 can be spaced apart from one another. In comparison with the case wherein, for example, these members are in contact due to a multi-axial configuration, a decrease in efficiency of the automatic transmission resulting from friction and so forth from the relative rotation of those units can be prevented.

If the clutch C3 is placed between the ring gear R1 and the sun gear S3, for example, the reduced speed rotation must be engaged and disengaged, and consequently the clutch C3 must be relatively large, but by placing clutch C3 between the input shaft 2 and the sun gear S1, the engaging and disengaging of the rotation of the input shaft 2 by this clutch C3 indirectly causes the reduced speed rotation output from the ring gear R1 of the second planetary gear unit PR to be engaged and disengaged, and the clutch C3 can be made more compact, and therefore the automatic transmission can be made more compact.

Further, the automatic transmission $1_{10}$ of this tenth embodiment is directly coupled in fourth speed forward. Therefore, in fifth speed forward and sixth speed forward, the gear ratio can be a high ratio, and particularly when the vehicle is running at a high speed, the engine speed can be lowered, thus allowing the vehicle to run more quietly at a high speed.

When a clutch is located between the second planetary gear unit PR and the first planetary gear unit PU for example, the length of the transmitting member that links the second planetary gear unit PR with the first planetary gear unit PU is axially elongated, and since it transmits the reduced speed rotation, the thickness of the member must be increased so as to withstand the torque, and therefore its weight is also increased. Therefore an object of the present invention is to provide an automatic transmission that can shorten the distance between the speed reducing second planetary gear unit and the first planetary gear unit, and thereby reduce the weight.

With the tenth embodiment, in particular, the clutch C2 is disposed on the side of the second planetary gear unit PR axially opposite the first planetary gear unit PU, and, therefore, provision of a clutch between the second planetary gear unit PR and the first planetary gear unit PU is not necessary, and the length of the transmitting member 30 can be made that much shorter. Therefore, weight of the automatic transmission as a whole can be reduced.

Eleventh Embodiment

The eleventh embodiment is a partial modification of the ninth embodiment and will be described with reference to FIG. 17. Components of the eleventh embodiment which are the same as those of the ninth embodiment are denoted by the same reference numerals, and description thereof will be omitted, except for the partial modifications.

Figure 17:
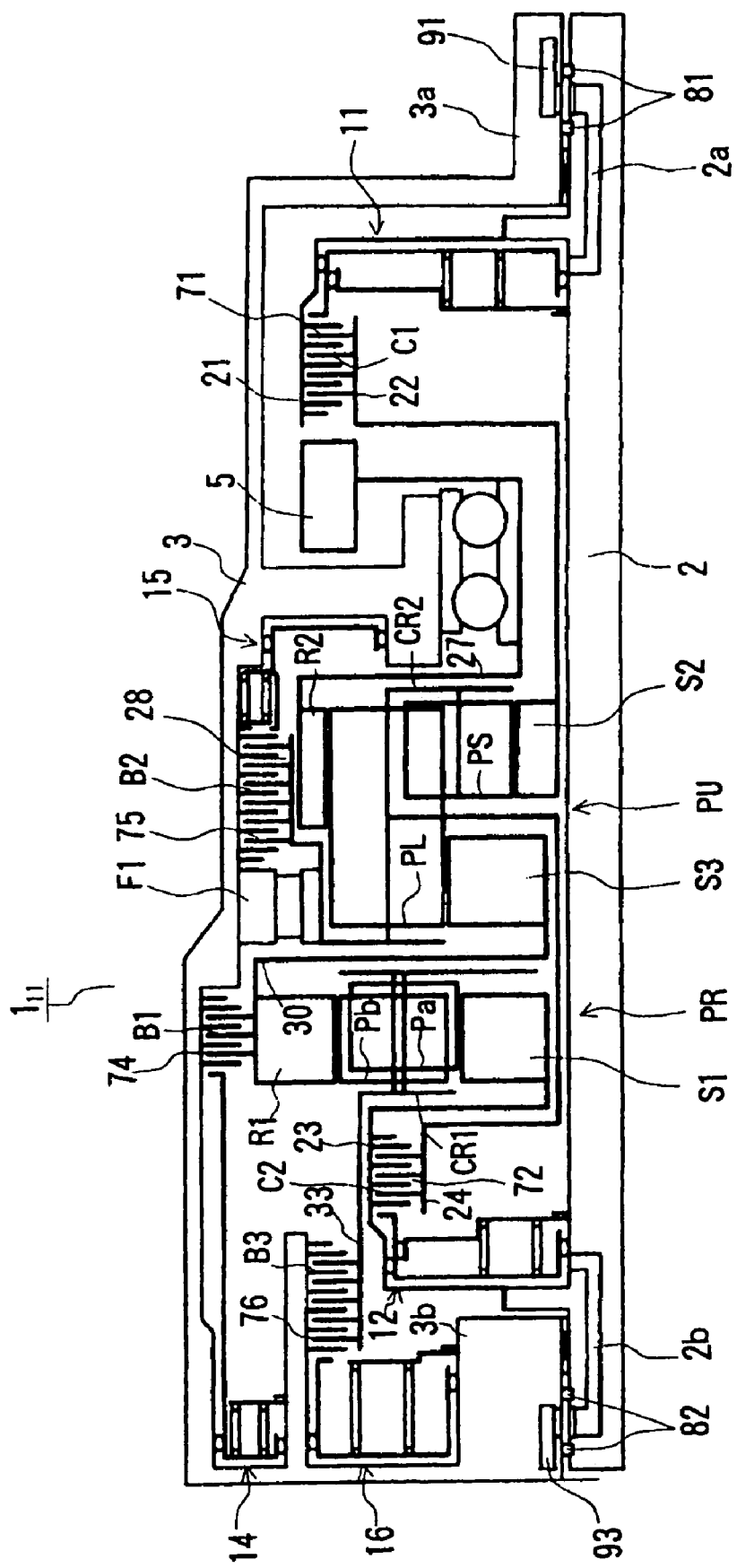
FIG. 17 is a schematic cross-sectional view of an automatic transmission of an eleventh embodiment.

As FIG. 17 illustrates, the automatic transmission $1_{11}$ of the eleventh embodiment has a modified configuration of the clutch C2, and further, has a brake B3 instead of a clutch C3, and thereby enables the carrier CR1 of the second planetary gear unit PR to be fixed by the brake B3, in which respects it differs from the automatic transmission $1_9$ of the ninth embodiment (see FIG. 15).

Within the automatic transmission $1_{11}$, the brake B3 is located on the side of the second planetary gear unit PR opposite the first planetary gear unit PU (left side of the diagram). This brake B3 comprises a hydraulic servo 16, friction plates 76, and a hub unit 33. Further, the clutch C2, comprising a hydraulic servo 12, friction plates 72, drum 23, and a hub unit 24, is located on the radially inward side of the brake B3, that is to say, it is positioned within the hub unit 33. The hub unit 33 of this brake B3 is connected to one side plate of the carrier CR1, and the other side plate of this carrier CR1 is rotatably supported by the input shaft 2. Further, the sun gear S1 is connected to the input shaft 2 via the drum 23 of the clutch C2. Also, the friction plates 74 of the brake B1 are intermeshed with friction plates splined to the outer circumferential surface of the ring gear R1, and this ring gear R1 is connected to the sun gear S3 via this transmitting member 30.

The operations of the automatic transmission $1_{11}$, of this eleventh embodiment are similar to those of the fourth embodiment (see FIG. 9 and FIG. 10), and accordingly description thereof will not be repeated here.

As described above, in the automatic transmission $1_{11}$ of the eleventh embodiment, due to the second planetary gear unit PR and the clutch C2 being located on one side of the first planetary gear unit PU, and the clutch C1 being located on the axially opposite side of the first planetary gear unit PU, the planetary gear units PR and PU can be located more closely together, as compared to the case wherein, for example, two clutches C1 and C2 are located between the planetary gear units PR and PU, and the transmitting member 30 for transmitting reduced speed rotation can be made relatively shorter. By doing so, the automatic transmission can be made more compact and more lightweight. Further, because the inertia (inertial force) can be reduced, the controllability of the automatic transmission can be increased, and the occurrence of speed change shock can be reduced.

Further, since the hydraulic servos 11 and 12 are provided on the input shaft 2, the seal rings 81 and 82 seal the case 3 to the oil lines 2a and 2b provided within input shaft 2, and therefore oil can be supplied to the oil chambers of hydraulic servos 11 and 12 without providing the seal rings between, for example, the input shaft 2 and the hydraulic servos 11 and 12. Therefore, oil can be supplied simply by providing the seal rings 81 and 82 for each of the hydraulic servos 11 and 12, sliding resistance from the seal rings can be minimized, and therefore the efficiency of the automatic transmission can be improved.

Because the clutch C1 engages at the relatively slow to medium speeds of first speed forward, second speed forward, third speed forward, and fourth speed forward, when this clutch C1 is released at the relatively high speeds of fifth speed forward, sixth speed forward, or first speed reverse, the hub unit 22 in particular, that connects this clutch C1 and the sun gear S2, rotates at a relatively high speed or in reverse (see FIG. 10). On the other hand, in fifth speed forward or first speed reverse the transmitting member 30 rotates at the reduced speed, and in sixth speed forward the transmitting member 30 may be fixed in some cases, and therefore there will be a difference in speeds between the hub unit 22 and the transmitting member 30. However, because this clutch C1 is located axially opposite the second planetary gear unit PR relative to the first planetary gear unit PU, the hub unit 22 and the transmitting member 30 can be spaced apart from one another. In comparison with the case wherein, for example, these members are in contact due to a multi-axial configuration, a loss in efficiency of the automatic transmission resulting from friction and so forth from the relative rotation of those units can be prevented.

Further, since the reduced speed rotation output to the first planetary gear unit PU from the second planetary gear unit PR is controlled by the brake B3, the number of parts (for example drum-shaped members and so forth) can be reduced as compared to a case wherein, for example, a clutch C3 is provided. Further, the brake B3 can connect directly with an oil line in the case 3, and therefore the configuration of the oil line can be simplified as compared to the case wherein, for example, a clutch C3 is provided.

Further, the automatic transmission $1_{11}$ according to this eleventh embodiment is directly coupled in fourth speed forward. Therefore, fifth speed forward and sixth speed forward, the gear ratio can be a high ratio, and particularly when the vehicle is running at a high speed, the engine speed can be lowered, and this allows the vehicle to run more quietly at a high speed.

When a clutch is located between the second planetary gear unit PR and the first planetary gear unit PU for example, the length of the transmitting member that links the planetary gear units PR and PU must be axially elongated, and since this transmitting member transmits reduced speed rotation, its thickness must be increased so as to withstand this load, and therefore its weight is also increased. Therefore an object of the present invention is to provide an automatic transmission that can shorten the distance between the speed reducing second planetary gear unit and the first planetary gear unit, and reduce the weight.

With this eleventh embodiment, in particular, the clutch C2 is disposed axially opposite the first planetary gear unit PU relative to the second planetary gear unit PR, and therefore, providing a clutch between the planetary gear units PR and PU is not necessary, and the length of the transmitting member 30 can be made that much shorter. Therefore, weight of the automatic transmission as a whole can be reduced.

Twelfth Embodiment

A twelfth embodiment, which is a partial modification of the first embodiment, will now be described, with reference to FIG. 18. Components of the twelfth embodiment which are the same as those of the first embodiment will be denoted by the same reference numerals, and description thereof omitted, except for partial modifications.

Figure 18:
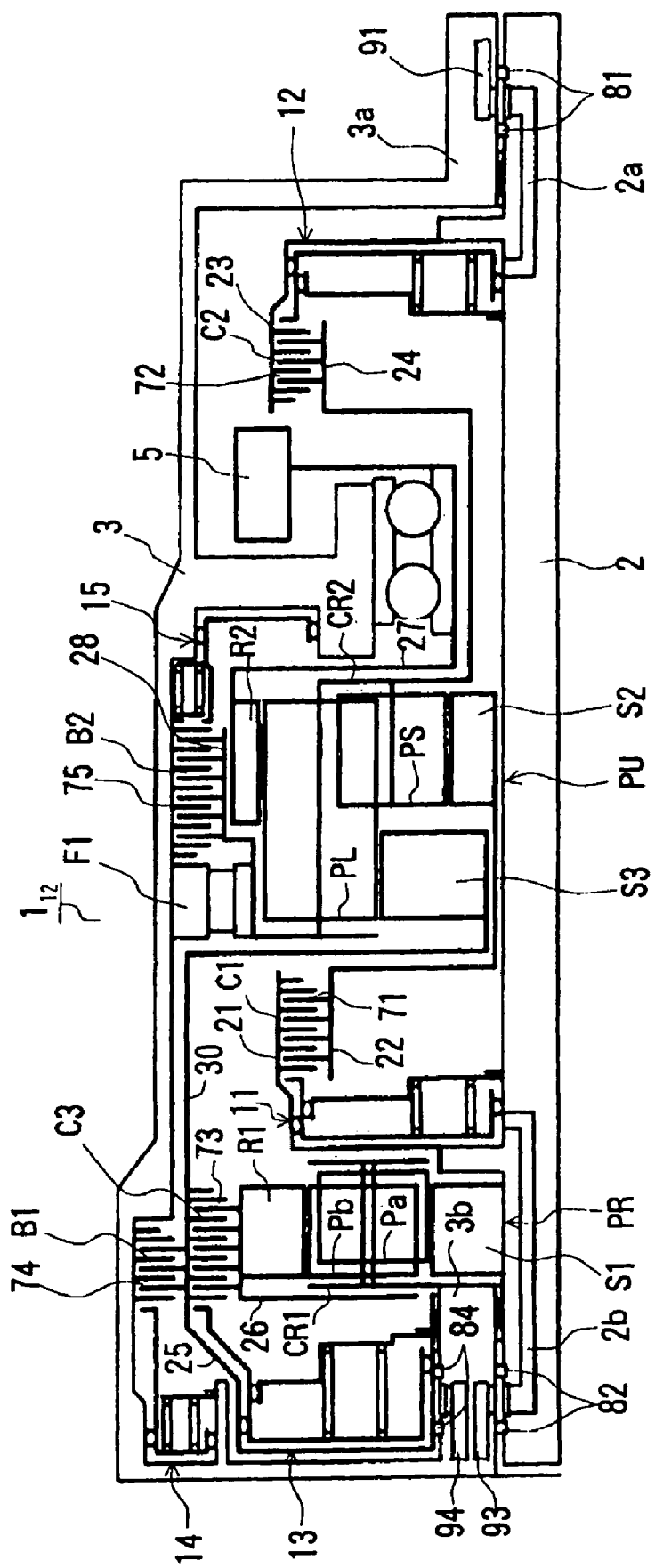
FIG. 18 is a schematic cross-sectional view of an automatic transmission according to a twelfth embodiment.

As FIG. 18 illustrates, the automatic transmission $1_{12}$ of the automatic transmission of the twelfth embodiment has the second planetary gear unit PR, the clutch C3, and the brake B1 located axially opposite the counter gear 5 relative to the first planetary gear unit PU (left side in the drawing), and in this respect differs from the automatic transmission $1_1$ of the first embodiment (see FIG. 1).

Within the automatic transmission $1_{12}$, on input shaft 2 is mounted a multi-disc clutch C2, which comprises a hydraulic servo 12, friction plates 72, a clutch drum 23, and a hub unit 24 linked to the sun gear S2 on the radially inner side.

The oil chamber of this hydraulic servo 12 is connected to an oil line 2a which is formed on the above-mentioned input shaft 2, and this oil line 2a is connected to the oil line 91 in the boss unit 3a. Further, this oil line 91 is connected to an oil pressure control unit, not illustrated. Thus, because the hydraulic servo 12 is mounted on input shaft 2, oil pressure communication between the oil pressure control unit and the oil chamber of the hydraulic servo 12 is provided by one set of seal rings 81 which form a seal between the boss 3a and the input shaft 2.

The input shaft 2 is connected to the clutch drum 23 which has its inner circumferential surface splined to the friction plates 72 of the clutch C2 which is operated by the hydraulic servo 12. The friction plates 72 of this clutch C2 are intermeshed with friction plates splined to the hub unit 24 which is connected to the carrier CR2.

At the other end of the input shaft 2 (left end in diagram) is a multi-disc clutch C1 operated by a hydraulic servo 11 and including friction plates 71, a clutch drum 21, and a hub unit 22 linked to a sun gear S2. Adjacent the outer circumference is a multi-disc clutch C3 operated by a hydraulic servo 13, and including friction plates 73, and a clutch drum 25. Further, radially outward of the clutch drum 25 is a multi-disc brake B1 that comprises a hydraulic servo 14 and friction plates 74.

The oil chamber of this hydraulic servo 11 is connected to an oil line 2b which is formed in the above-mentioned input shaft 2, and this oil line 2b is provided along the edge of the case 3 that is opposite the above-mentioned boss unit 3a, and is connected to the oil line 93 of the boss 3b which is formed as a sleeve around one end of the input shaft 2. Therefore, oil pressure communication between the oil pressure control unit and the oil chamber of the hydraulic servo 11 is provided by one set of seal rings 82 which form a seal between the boss unit 3b and the input shaft 2.

The oil chamber of the hydraulic servo 13 is connected to an oil line 94 in the boss 3b which also is connected to the oil pressure control unit. Thus, for the hydraulic servo 13, oil communication between the oil pressure control unit and the oil chamber of the hydraulic servo 13 is established by one set of seal rings 84 which provide a seal between the boss 3b and the clutch drum 25.

Further, the input shaft 2 is connected to the clutch drum 21 on the left side of the diagram, and located radially outward of this clutch drum 21 are the friction plates 71 of the clutch C1 which is operated by the hydraulic servo 11. Friction plates 71 are splined to the clutch drum 21 and are intermeshed with friction plates splined to the hub unit 22 which is connected to the sun gear S2.

The clutch drum 25 is rotatably supported by the boss 3b and its outer circumferential surface, at a front portion thereof, is splined to the friction plates 74 of the brake B1 which is operated by the hydraulic servo 14. The inner circumferential surface of the front portion of this clutch drum 25 is splined to the friction plates 73 of the clutch C3 which is operated by the hydraulic servo 13. The friction plates 73 of this clutch C3 are intermeshed with friction plates splined to the ring gear R1.

The carrier CR1 supports a pinion Pb, which meshes with the ring gear R1, and a pinion Pa which meshes with the sun gear S1 which, in turn, is connected to the input shaft 2. The carrier CR1 is secured to the boss 3b via a side plate, and ring gear R1 is rotatably supported by a supporting element 26 extending from the boss 3b.

Further, the clutch drum 25 is connected to one end of a transmitting member 30 that transmits the rotation of the ring gear R1 when the clutch C3 is engaged. The opposite end of this transmitting member 30 is connected to the sun gear S3 of the first planetary gear unit PU.

The operations of the automatic transmission $1_{12}$, of this twelfth embodiment are similar to those of the first embodiment (see FIG. 2 and FIG. 3), and accordingly description thereof will not be repeated here.

As described above, according to the automatic transmission $1_{12}$ of the twelfth embodiment, because the second planetary gear unit PR and the clutch C1 located on one side of the planetary gear unit PU, and the clutch C2 is located on the axially opposite side of the planetary gear unit PU, the planetary gear units PR and PU can be located more closely together, as compared to the case wherein, for example, two clutches C1 and C2 are located between the planetary gear units PR and PU, and the transmitting member 30 for transmitting the reduced speed rotation can be made relatively shorter and the automatic transmission can be made more compact and lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2a, 2b, 91, 93, 94) that supply the hydraulic servos 11, 12, and 13 can be constructed more easily, the manufacturing process can be simplified, and the costs can be reduced.

Further, since the hydraulic servos 11 and 12 are mounted on the input shaft 2, one set of seal rings 81 and 82 provide a seal between the case 3 and oil lines 2a and 2b provided within input shaft 2, and therefore oil can be supplied to the oil chambers of hydraulic servos 11 and 12 without providing seal rings between, for example, the input shaft 2 and the hydraulic servos 11 and 12. Further, the hydraulic servo 13 can receive a supply of oil directly from the boss 3a which extends from the case 3, i.e. without passing through other components, by provision of one set of seal rings 80. Therefore, oil supply can be secured simply by providing one set of seal rings 81 and 82, 84 for each of the hydraulic servos 11, 12, and 13, sliding resistance from the seal rings can be minimized, and therefore the efficiency of the automatic transmission can be improved.

Further, due to the clutch C3 being arranged radially outward of the clutch C1, the clutch C3, which must transmit a relatively large torque with transmission of the reduced speed rotation and its hydraulic servo 13 can have an increased diameter, the pressure-receiving area of the oil chamber of the hydraulic servo 13 can be enlarged, and the torque transmission capacity of clutch C3 can be increased. Further, by providing the clutch C1 with a smaller torque transmission capacity as compared to that of the clutch C3, the automatic transmission can be made more compact.

Further, because the automatic transmission $1_{12}$ of the twelfth embodiment is directly coupled in fourth speed forward, in fifth speed forward and in sixth speed forward, the gear ratio can be a high ratio, and particularly when the vehicle is running at a high speed, the engine speed can be lowered, thus allowing the vehicle to run more quietly at a high speed.

Thirteenth Embodiment

A thirteenth embodiment, which is a partial modification of the twelfth embodiment, will now be described with reference to FIG. 19. Components of the thirteenth embodiment which are the same as those of the twelfth embodiment are denoted by the same reference numerals, and description thereof omitted, except for the partial modifications.

Figure 19:
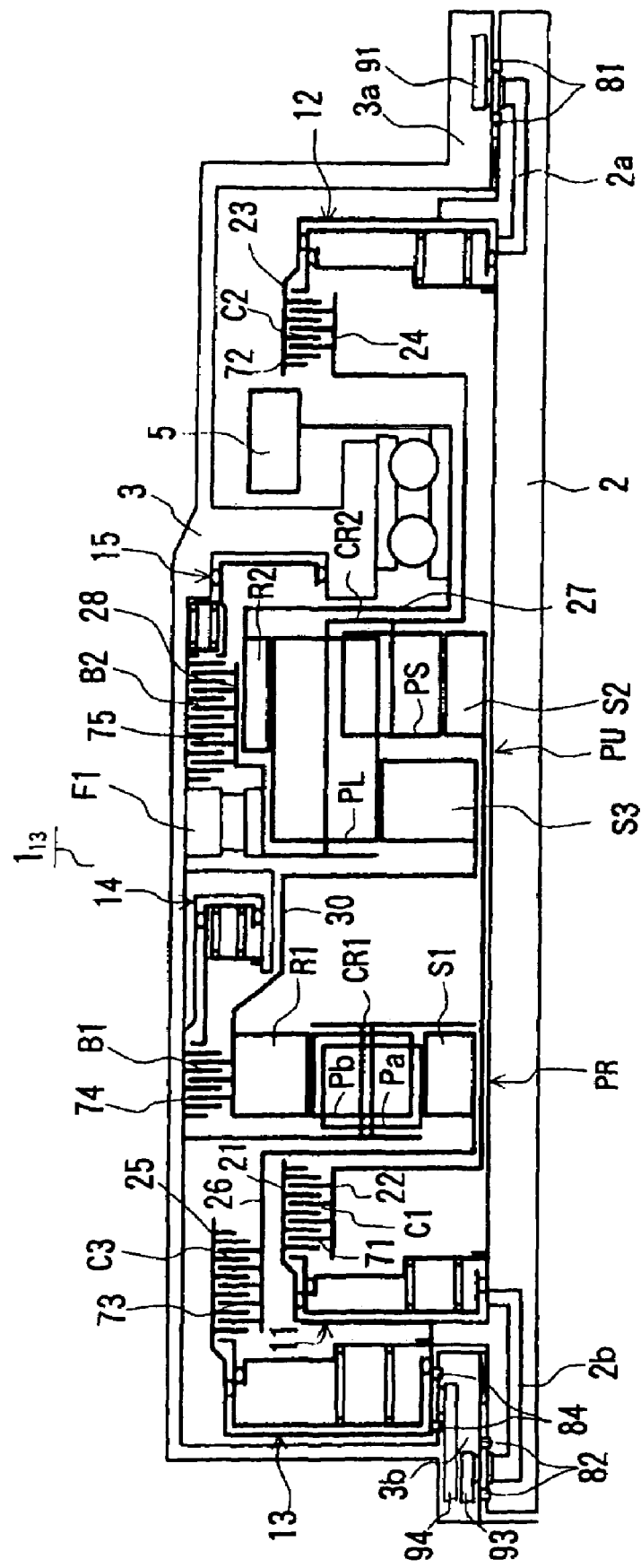
FIG. 19 is a schematic cross-sectional view of an automatic transmission according to a thirteenth embodiment.

As FIG. 19 illustrates, the automatic transmission $1_{13}$ of the thirteenth embodiment has the configuration of the second planetary gear unit PR, the clutch C1, and the clutch C3 modified relative to the twelfth embodiment (see FIG. 18).

In this thirteenth embodiment, the clutches C1 and C3 are located on the side of the second planetary gear unit PR (left side of diagram) opposite the first planetary gear unit PU. The inner surface of a front portion of the drum 25 of this clutch C3 is splined to the friction plates 73 which are intermeshed with friction plates splined to the hub unit 26. The clutch drum 25 is connected to the input shaft 2, and the hub unit 26 is connected to the sun gear S1. Further, the clutch C1 comprising a hydraulic servo 12, friction plates 71, a clutch drum 21, and a hub unit 22 is located radially inward of the clutch C3, that is to say, is enclosed within the hub unit 26.

Radially outward of the second planetary gear unit PR is a multi-disc brake B1 that comprises a hydraulic servo 14 and friction plates 74. The side plate of the carrier CR1 of the second planetary gear unit PR is fixed to and supported by the case 3. Further, the ring gear R1 is connected to the transmitting member 30, and the friction plates 74 of the brake B1 are splined to the outer circumferential surface of transmitting member 30, which, in turn, is connected to the sun gear S3.

The operations of the automatic transmission $1_{13}$ are similar to those of the third embodiment (see FIG. 6 and FIG. 7) and accordingly description thereof will not be repeated here.

As described above, in the automatic transmission $1_{13}$ of the thirteenth embodiment, because the second planetary gear unit PR and the clutch C1 are located on one side of the planetary gear unit PU, and the clutch C2 is located on the axially opposite side of the first planetary gear unit PU, the planetary gear units PR and PU can be located more closely together, as compared to a transmission wherein, for example, two clutches C1 and C2 are located between the planetary gear units PR and PU, and the transmitting member 30 for transmitting reduced speed rotation can be made relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the first planetary gear unit PU, the oil lines (for example, 2a, 2b, 91, 93, 94) that supply the hydraulic servos 11, 12, and 13 of these clutches C1, C2, C3 can be more easily constructed, the manufacturing process can be simplified, and the costs can be reduced.

Further, since the hydraulic servos 11 and 12 are mounted on the input shaft 2, one set of seal rings 81 and 82 serve to seal the case 3 to the input shaft 2 and thereby connect a supply of oil to the oil lines 2a and 2b provided within input shaft 2. Thus, oil can be supplied to the oil chambers of hydraulic servos 11 and 12 without providing seal rings between, for example, the input shaft 2 and the hydraulic servos 11 and 12. Further, the hydraulic servo 13 can be supplied with oil from the boss 3b extended from the case 3, without passing through other parts, by providing one set of seal rings 84. Because oil can be supplied by providing one set of seal rings 81 and 82, 84 for each of the hydraulic servos 11, 12, and 13, sliding resistance from the seal rings can be minimized, and therefore the efficiency of the automatic transmission can be improved.

Further, because the clutch C1 is located radially inward of the clutch C3, the clutch C3, which must transmit a relatively large torque in order to transmit the reduced speed rotation, can be located on the outer circumference side, and therefore clutch C3 and the hydraulic servo 13 thereof can have an increased diameter. In particular, the pressure-receiving area of the oil chamber of the hydraulic servo 13 can be enlarged, and the torque transmission capacity of clutch C3 can be increased. Further, by designing the clutch C1 to have a smaller torque transmission capacity as compared to the clutch C3, the automatic transmission can be made more compact.

In contrast, for example, if the clutch C3 were to be placed between the ring gear R1 and the sun gear S3, it would engage and disengage the reduced speed, high torque rotation, and would need to be relatively large. However, by locating clutch C3 between the input shaft 2 and the sun gear S1, engagement and disengagement of this clutch C3 indirectly causes the reduced speed rotation output from the ring gear R1 of the second planetary gear unit PR to be engaged and disengaged, and therefore the clutch C3 can be made more compact and the automatic transmission as a whole can be made more compact.

Further, the automatic transmission $1_{13}$ of the thirteenth embodiment is directly coupled in fourth speed forward. Therefore, at fifth speed forward and sixth speed forward, the gear ratio can be a high ratio and, particularly when the vehicle is running at a high speed, the engine speed can be lowered, thus allowing the vehicle to run more quietly at a high speed.

If a clutch is located between the planetary gear units PR and PU, the length of the transmitting member that links the planetary gear units PR and PU must be axially elongated, and since this transmitting member receives the reduced speed rotation, the thickness of the member must be increased so as to withstand the high torque, and therefore the weight is also increased. Therefore an object of the present invention is to provide an automatic transmission that can shorten the distance between the planetary gear units, and thereby prevent increase in weight.

In this thirteenth embodiment, because the clutch C1 is disposed on the side of the planetary gear unit PR axially opposite the planetary gear unit PU, provision of a clutch between the planetary gear units PR and PU is not necessary, and the transmitting member 30 can be made that much shorter. Therefore, an increase in weight of the automatic transmission as a whole can be avoided.

Fourteenth Embodiment

A fourteenth embodiment, which is a partial modification of the twelfth embodiment, will now be described with reference to FIG. 20. Components of the fourteenth embodiment which are the same as those of the twelfth embodiment are denoted by the same reference numerals, and description thereof omitted, except for partial modifications.

Figure 20:
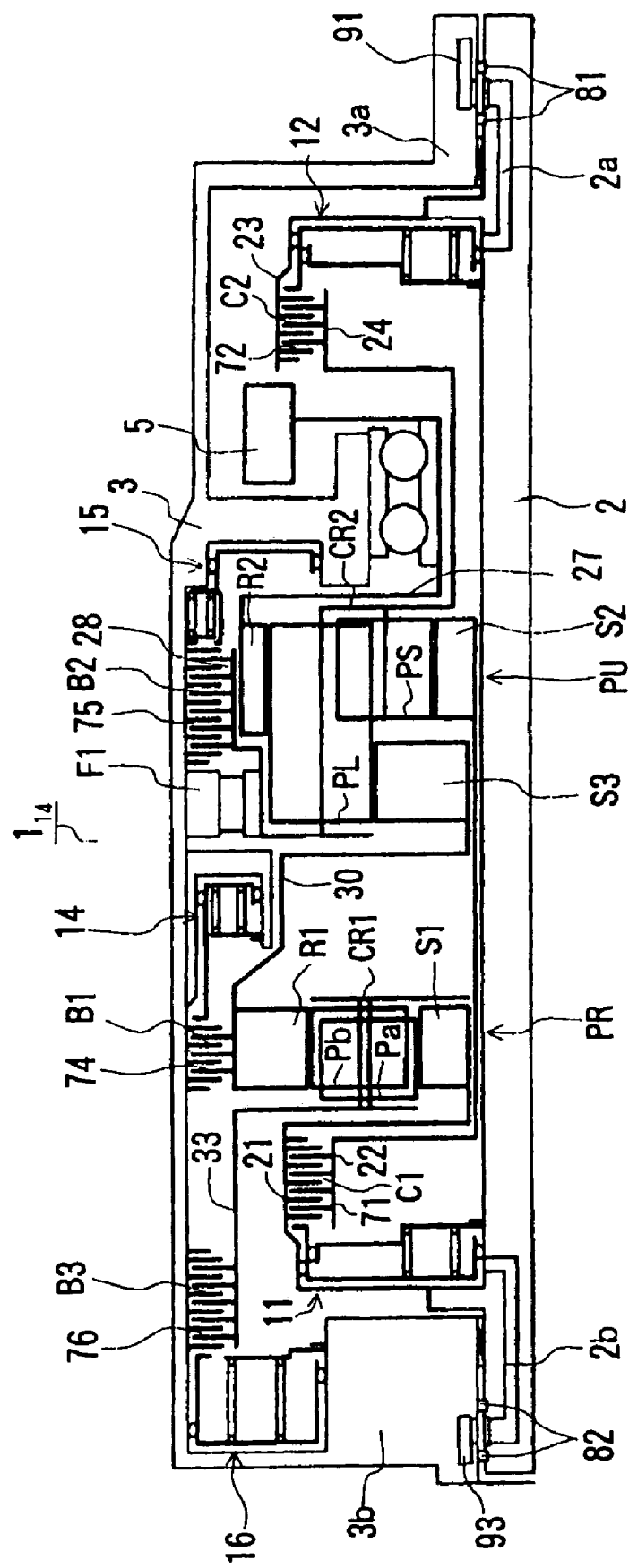
FIG. 20 is a schematic cross-sectional view of an automatic transmission according to a fourteenth embodiment.

As FIG. 20 illustrates, the automatic transmission $1_{14}$ of the fourteenth embodiment differs from that of the twelfth embodiment in the configuration of the clutch C2, in having a brake B3 instead of a clutch C3, and in enabling the carrier CR1 of the second planetary gear unit PR to be fixed by the brake B3.

Within the automatic transmission $1_{14}$, the brake B3 is located on the side of the planetary gear unit PR axially opposite (left side on the diagram) the planetary gear unit PU. This brake B3 comprises a hydraulic servo 16, friction plates 76, and a hub unit 33. The clutch C1 comprises a hydraulic servo 11, friction plates 71, a clutch drum 21, and a hub unit 22, and is located radially inward of the brake B3, enclosed within the hub unit 33. The hub unit 33 of this brake B3 is connected to one side plate of the carrier CR1, and the other side plate of the carrier CR1 is rotatably supported by the input shaft 2. Further, the sun gear S1 is connected to the input shaft 2 via the drum 21 of the clutch C1. The friction plates 74 of the brake B1 are intermeshed with friction plates splined to the outer circumferential surface of the ring gear R1, and this ring gear R1 is connected to the sun gear S3 by transmitting member 30.

The operations of the automatic transmission $1_{14}$ of this fourteenth embodiment are similar to those of the fourth embodiment (see FIG. 9 and FIG. 10), and accordingly description thereof will not be repeated here.

In the automatic transmission $1_{14}$ of the fourteenth embodiment, due to the second planetary gear unit PR and the clutch C1 being located on one side of the planetary gear unit PU, and the clutch C2 being located on the axially opposite side of the planetary gear unit PU, the planetary gear units PR and PU can be located more closely together as compared to, for example, a transmission wherein two clutches C1 and C2 are located between the planetary gear units PR and PU, and the transmitting member 30 for transmitting reduced speed rotation can be made relatively shorter. In this manner, the automatic transmission can be made more compact and more lightweight. Further, because the inertia (inertial force) can be reduced, the controllability of the automatic transmission can be increased, and the occurrence of speed change shock can be reduced. Further, compared to a transmission wherein three clutches C1, C2, C3 are located on one side of the planetary gear unit PU, the oil lines (for example, 2a, 2b, 91, 93) that supply oil to the hydraulic servos 11 and 12 of these clutches C1 and C2, can be more easily constructed, the manufacturing process can be simplified and the costs can be reduced.

Further, since the hydraulic servos 11 and 12 are provided on the input shaft 2, the seal rings 81 and 82 seal the case 3 to the oil lines 2a and 2b provided within input shaft 2, and therefore oil can be supplied to the oil chambers of hydraulic servos 11 and 12 without providing seal rings between, for example, the input shaft 2 and the hydraulic servos 11 and 12. Therefore, the oil supply can be connected simply by providing the seal rings 81 and 82 for each of the hydraulic servos 11 and 12, sliding resistance from the seal rings can be minimized, and therefore the efficiency of the automatic transmission can be improved.

Further, since output of the reduced speed rotation to the first planetary gear unit PU from the second planetary gear unit PR is controlled by the brake B3, the number of parts (for example drum members and so forth) can be reduced as compared to embodiments having a clutch C3. Further, the brake B3 can connect directly to an oil line in the case 3, and therefore the configuration of the oil line can be simplified as compared to the embodiments including a clutch C3.

Further, the automatic transmission $1_{14}$ of the fourteenth embodiment is directly coupled in fourth speed forward. Therefore, in fifth speed forward and sixth speed forward, the gear ratio can be a high ratio, and particularly when the vehicle is running at a high speed, the engine speed can be lowered, thereby allowing the vehicle to run more quietly at high speed.

If a clutch is located between the planetary gear units PR and PU, the length of the transmitting member that links the planetary gear units PR and PU must be axially elongated, and because this member transmits the reduced speed rotation, its thickness must be increased so as to withstand the transmitted torque, and therefore its weight must also be increased. Therefore, an object of the present invention is to provide an automatic transmission that can reduce the distance between the planetary gear units PU and PR, and to thereby minimize the weight of the transmitting member.

In this fourteenth embodiment, in particular, the clutch C1 is disposed on the side of the second planetary gear unit PR opposite the first planetary gear unit PU, and therefore, providing a clutch between planetary gear units PR and PU is not necessary, and the length of the transmitting member 30 can be made that much shorter. Therefore, weight of the automatic transmission as a whole can be reduced.

Fifteenth Embodiment

Figure 23:
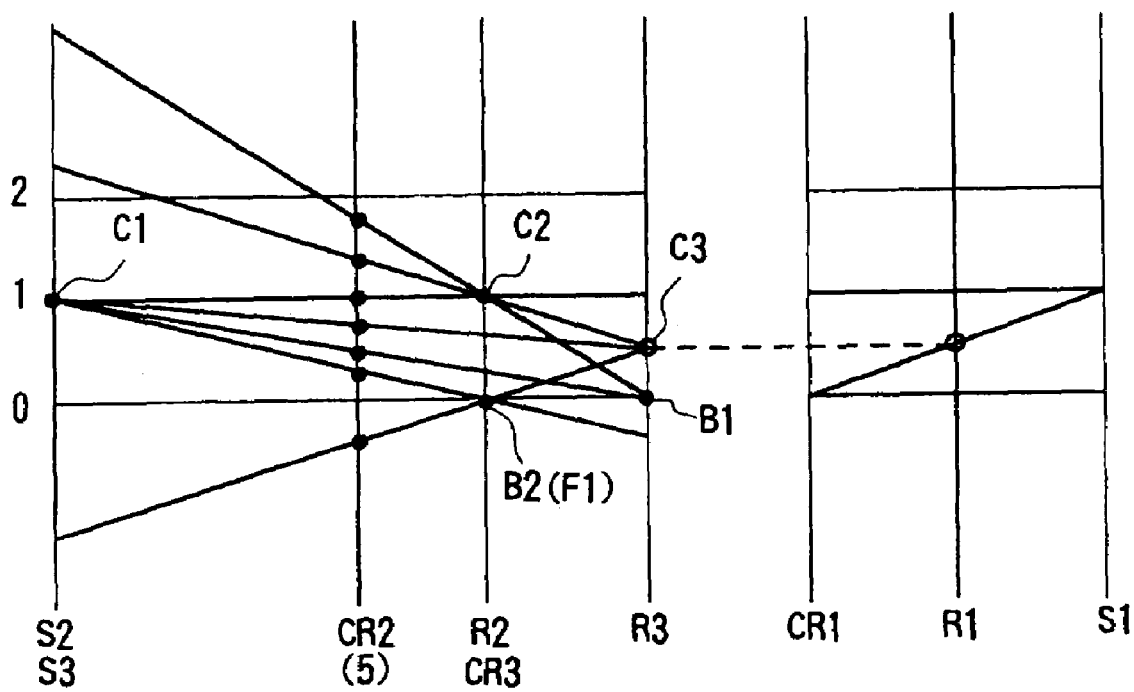
FIG. 23 is a speed line diagram for the automatic transmission of the fifteenth embodiment.

The fifteenth embodiment, which is a partial modification of the previously described embodiments will now be described with reference to FIG. 21 through FIG. 23. Components of the fifteenth embodiment which are the same as those of the first embodiment are denoted by the same reference numerals, and description thereof will not be repeated here, except for modifications.

Figure 21:
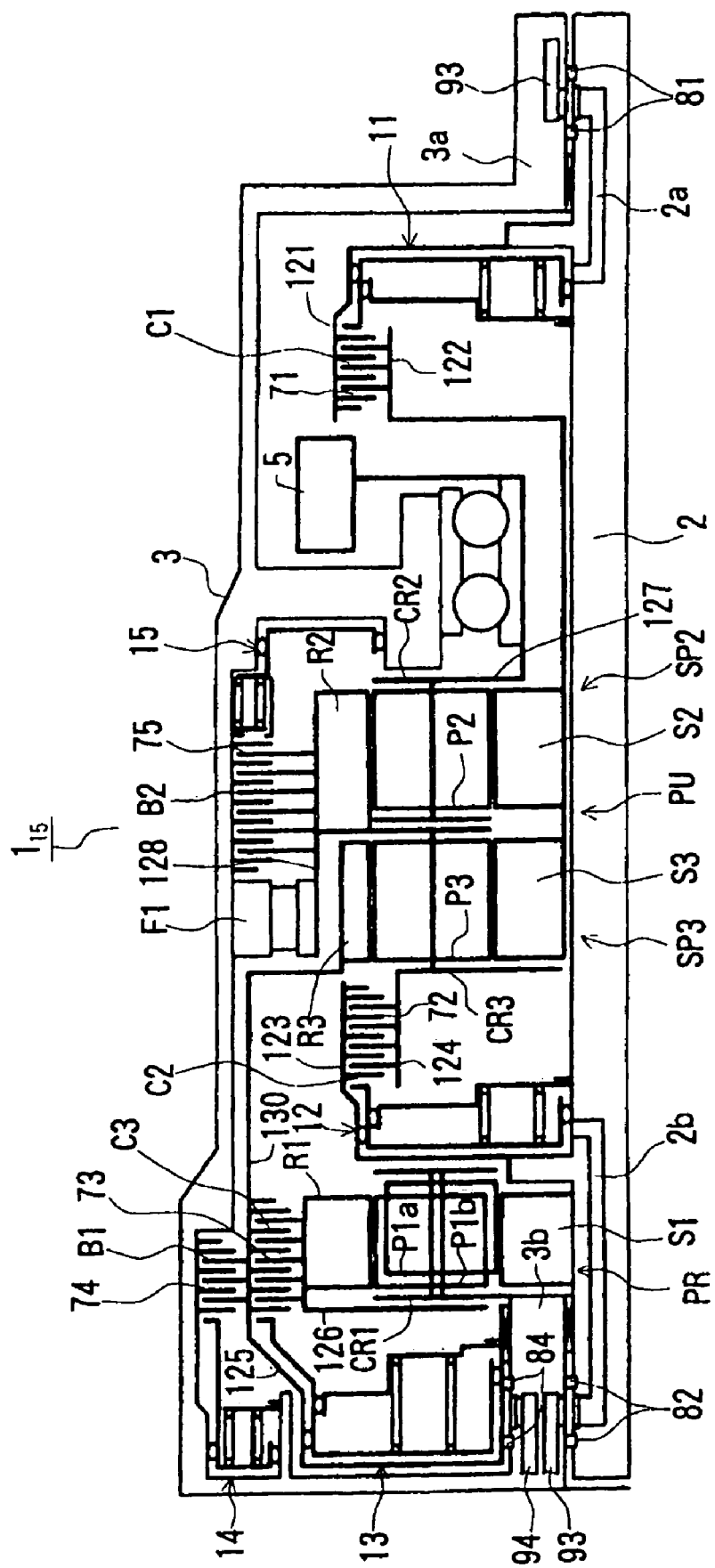
FIG. 21 is a schematic cross-sectional view of an automatic transmission according to a fifteenth embodiment.

As illustrated in FIG. 21, the automatic transmission $1_{15}$ of the fifteenth embodiment comprises a first planetary gear unit PU and a second planetary gear unit PR on the input shaft 2, similar to the automatic transmission $1_1$ of the first embodiment. The first planetary gear unit PU comprises a first simple planetary gear unit SP2 and a second simple planetary unit SP3, and is a Simpson-type planetary gear unit comprising a sun gear S2 and a sun gear S3 that are linked together, a carrier CR3 and a ring gear R2 that are linked together, a ring gear R3, and a carrier CR2, as the four rotary components. Further, the second planetary gear unit PR is a double pinion planetary gear unit comprising a carrier CR1, a pinion P1b which is meshed with a ring gear R1 and a pinion P1a which is meshed with a sun gear S1, wherein the pinions are also meshed with one another.

On the input shaft 2 is mounted a multi-disc clutch C1, which comprises a hydraulic servo 11, friction plates 71, a clutch drum 121, and a hub unit 122. The oil chamber of this hydraulic servo 11 is connected to an oil line 91 of the boss 3a which forms a sleeve around one end of the input shaft 2 and this oil line 91 is connected to an oil pressure control unit, not illustrated. In other words, an oil line from the oil pressure control unit, not illustrated, to the oil chamber of the hydraulic servo 11 is connected simply by providing one set of seal rings 81 which form a seal between the boss 3a and the drum 121.

The input shaft 2 is connected to the clutch drum 121, and the inner surface of this drum 121 is splined to the friction plates 71 of the clutch C1 which are intermeshed with friction plates splined to the hub unit 122 which, in turn, is connected to the sun gear S2.

At the other end (the left of the diagram) of the input shaft 2 is a multi-disc clutch C2 which comprises a hydraulic servo 12, friction plates 72, a clutch drum 123, and a hub unit 124 linked to a carrier CR3. At the outer circumference is a multi-disc clutch C3 which comprises a hydraulic servo 13, friction plates 73, and a clutch drum 125. Further, radially outward of the clutch drum 125 is a multi-disc brake B1 which comprises a hydraulic servo 14 and friction plates 74.

The oil chamber of this hydraulic servo 12 is connected to an oil line 2b which is formed on the input shaft 2, and this oil line 2b extends along the edge of the case 3 that is opposite the above-mentioned boss 3a, and is connected to the oil line 93 of the boss 3b which forms a sleeve around the input shaft 2. Therefore, an oil line from the oil pressure control unit, not illustrated, to the oil chamber of the hydraulic servo 12, is connected simply by providing one set of seal rings 82 to form a seal between the input shaft 2 and the clutch drum 23.

Further, the oil chamber of the hydraulic servo 13 is connected to an oil line 94 of the boss 3b, which oil line 94 is connected to the oil pressure control unit. In other words, for the above-mentioned hydraulic servo 13, an oil line from the oil pressure control unit to the oil chamber of the hydraulic servo 13 is connected by one set of seal rings 84 between the boss 3b and the clutch drum 125.

The input shaft 2 is connected to the drum-shaped member 123 on the left side of the diagram, and the inner surface of this drum-shaped member 123 is splined to the friction plates 72 of the clutch C2 which is operated by the hydraulic servo 12. The friction plates 72 are intermeshed with friction plates splined to the hub unit 124, which is connected to the carrier CR3.

The clutch drum 125 is rotatably supported by the boss 3b, and the outer surface of a front edge of this clutch drum 125 is splined to friction plates 74 of the brake B1 which is operated by hydraulic servo 14. The inner surface of the front portion of drum 125 is splined to the friction plates 73 of the clutch C3 which is operated by the hydraulic servo 13. The friction plates 73 are intermeshed with friction plates splined to the ring gear R1.

The carrier CR1 supports a pinion P1a and a pinion P1b. Pinion P1b meshes with the ring gear R1, and pinion P1a meshes with the sun gear S1 which is connected to the input shaft 2. Carrier CR1, in turn, is secured to the boss 3b of the case 3 via a side plate, and ring gear R1 is rotatably supported by a supporting element 126 fixed to the boss 3b.

The drum 125 is connected to a transmitting member 130 that receives the rotation of the ring gear R1 when the clutch C3 is engaged, and, further, the other end of this transmitting member 130 is connected the ring gear R3 of the second simple planetary gearing SP3 of the first planetary gear unit PU.

On the outer side of the first simple planetary gearing SP2 is a one-way clutch F1, and the inner race of this one-way clutch F1 is connected to the hub unit 128 which, in turn, is connected to the ring gear R2 of the first simple planetary gearing SP1. Further, on the outer side of this ring gear R2 is a brake B2 comprising a hydraulic servo 15 and friction plates 75. The friction plates 75 are intermeshed with friction plates splined to the ring gear R2 and the hub unit 128, and are splined to the inner surface of the case 3. Thus, ring gear R2 can be held against rotation by engagement of the brake B2.

Further, the carrier CR3 supports a pinion P3 which is meshed with the inner surface of the ring gear R3 and with the sun gear S3. The carrier CR3 is also linked to the ring gear R2. The carrier CR2 supports a pinion P2 which is meshed with the inner surface of the ring gear R2 and with sun gear S2. Also, this carrier CR2 is linked to the counter gear 5 via side plate 127.

The second planetary gear unit PR and the clutches C2 and C3 are located on one side of the first planetary gear unit PU, and the clutch C1 and the counter gear 5 are located on the axially opposite side (right side of the diagram) of the first planetary gear unit PU. Further, the clutch C2 is disposed radially inward of the clutch C3, and radially inward of the transmitting member 130. Further, the brake B1 is disposed radially outward of the second planetary gear unit PR, and the brake B2 is disposed radially outward of the first planetary gear unit PU.

The operations of the automatic transmission $1_{15}$ of this fifteenth embodiment will now be described with reference to FIG. 21, FIG. 22, and FIG. 23 below. The vertical axes of the speed line diagram illustrated in FIG. 23 indicate the speeds of each rotary component, and the horizontal axis indicates the corresponding gear ratio of the rotary components. In the first planetary gear unit PU section of this speed line diagram, the vertical axis to the farthest horizontal edge (the right side of FIG. 23) corresponds to ring gear R3, and moving to the left within the diagram, the vertical axes correspond to the ring gear R2 and the carrier CR3, the carrier CR2, and the sun gear S2 and the sun gear S3. In the second planetary gear unit PR section of this speed line diagram, the vertical axis to the farthest horizontal edge (the right side of FIG. 23) corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. The horizontal dotted line in the diagram illustrates the speed of rotation transmitted by the transmitting member 130.

As illustrated in FIG. 21, the rotation of input shaft 2 is input to the sun gears S2 and S3, by engaging the clutch C1. The rotation of input shaft 2 is also input to the carrier CR3 and ring gear R2, by engaging the clutch C2. The carrier CR3 and ring gear R2 can be fixed against rotation by engagement of the brake B2 and, further, their rotation can be limited to one direction by the one-way clutch F1.

When the rotation of the input shaft 2 is input to the sun gear S1, and the carrier CR1 is fixed to the case 3, the ring gear R1 rotates at a reduced speed. The reduced speed rotation of the ring gear R1 is input to the ring gear R3 via the transmitting member 130 by engagement of the clutch C3. Further, the ring gear R3 may be fixed against rotation by engagement of the brake B1. The rotation of the carrier CR2 is output to the counter gear 5 and to the drive wheels via this counter gear 5, a counter shaft (not illustrated), and a differential unit.

In first speed forward within the D (drive) range, as illustrated in FIG. 22, the clutch C1 and the one-way clutch F1 are engaged. Then, as illustrated in FIG. 23, the rotation of input shaft 2 is input to the sun gears S2 and S3 via the clutch C1, and the rotation of the carrier CR3 and the ring gear R2 is limited to one direction (the direction of forward rotation). With rotation of the input shaft 2 input to the sun gear S2 and the reduced speed rotation output to the carrier CR2 via the fixed ring gear R2, the forward rotation for first speed forward is output from the counter gear 5. At this time, within the second planetary gear unit PR, the reduced speed rotation is output to the ring gear R3 via the sun gear S1 (which receives the rotation of the input shaft 2) and the fixed carrier CR1; however, the transmitting member 130 does not transmit torque because the clutch C3 is released. Further, when downshifting (when coasting), the brake B2 is engaged and the ring gear R2 is fixed to maintain first speed forward while preventing forward rotation of ring gear R2.

Further, in first speed forward, the one-way clutch F1 prevents the ring gear R2 from rotating in reverse while allowing forward rotation, and therefore, switching from a non-driving range to a driving range and achieving first speed forward can be accomplished more smoothly by the automatic engaging of the one-way clutch.

In second speed forward within D (drive) range, as illustrated in FIG. 22, the clutch C1 and brake B1 are engaged. As illustrated in FIG. 23, the rotation of input shaft 2 is input to the sun gears S2 and S3 via the clutch C1, and the ring gear R3 is fixed against rotation. Also, reduced speed rotation is output to the carrier CR3 and the ring gear R2 via the rotation of the input shaft 2 that is input to the sun gear S3 and the fixed ring gear R3. Rotation at a speed reduced from that of the above-mentioned first speed forward is input to the carrier CR2, via the rotation of the input shaft 2 input to the sun gear S2 and the reduced speed rotation input to ring gear R2, and the forward rotation for second speed forward is output from the counter gear 5. At this time, within the second planetary gear unit PR, the reduced speed rotation is output to the ring gear R3 via the sun gear S1, which receives the rotation of the input shaft 2, and the fixed carrier CR1; however, the transmitting member 130 does not transmit torque because the clutch C3 is released.

In third speed forward within the D (drive) range, as illustrated in FIG. 22, the clutches C1 and C3 are engaged. As illustrated in FIG. 23, the rotation of input shaft 2 is input to the sun gear S1 and to the ring gear R1 through the fixed carrier CR1. The ring gear R1, now rotating at a reduced speed, outputs its reduced speed rotation to the ring gear R3 via the transmitting member 130, with the clutch C3 engaged. The rotation of the input shaft 2 is also input to the sun gear S2, and a slightly greater, but reduced, speed rotation is output to the carrier CR3 and to the ring gear R2 via sun gear S3 and the reduced speed rotation of the ring gear R3. A reduced speed rotation greater than that of the above-mentioned second speed forward is output to the carrier CR2 from the rotation of the input shaft 2 input to the sun gear S2 and the slightly greater but reduced speed rotation input to ring gear R2, and the forward rotation for third speed forward is output from the counter gear 5. In this case, because the ring gear R1 and the ring gear R3 are rotating at a reduced speed, the transmitting member 130 carries a relatively large torque.

In fourth speed forward within D (drive) range, as illustrated in FIG. 22, the clutches C1 and C2 are engaged. Then, as illustrated in FIG. 23, the rotation of input shaft 2 is input to the sun gears S2 and S3 via the clutch C1, and to the carrier CR3 and the ring gear R2 via the clutch C2 to establish a directly coupled state wherein the rotation of the input shaft 2 is output as is into the carrier CR2, and the forward rotation for fourth speed forward is output from the counter gear 5. At this time, within the second planetary gear unit PR, the reduced speed rotation is output to the ring gear R3 via the sun gear S1 (which receives the rotation of the input shaft 2) and the fixed carrier CR1; however, the transmitting member 130 does not transmit torque because the clutch C3 is released.

In fifth speed forward within the D (drive) range, as illustrated in FIG. 22, the clutches C1 and C3 are engaged. Then, as illustrated in FIG. 23, the rotation of input shaft 2 is input to the sun gear S1, and the ring gear R1 reduces the speed of rotation received through the fixed carrier CR1. Further, the reduced speed rotation of this ring gear R1 is output to the ring gear R3 via the transmitting member 130, with the clutch C3 engaged. The rotation of the input shaft 2 is also input to the carrier CR3 and the ring gear R2, and overdrive speed rotation is output to the sun gears S2 and S3. Overdrive rotation is also output to the carrier CR2 from the rotation of the input shaft 2 input to the ring gear R2 and to sun gear S2, and the forward rotation for fifth speed forward is output from the counter gear 5. In this case, because the ring gear R1 and the ring gear R3 are rotating at a reduced speed, the transmitting member 130 transmits a relatively large torque.

In sixth speed forward within the D (drive) range, as illustrated in FIG. 22, the clutch C2 and the brake B1 are engaged. Then, as illustrated in FIG. 23, the rotation of the input shaft 2 is input to the carrier CR3 and to the ring gear R2 via the clutch C2, and the ring gear R3 is fixed by engagement of the brake B1. This produces overdrive rotation (even greater than that of the above-mentioned fifth speed forward), which is output to the sun gears S3 and S2. From the rotation of the input shaft 2 input to the ring gear R2 and the increased speed rotation input to sun gear S2, a raised speed rotation, higher than that of the above-mentioned fifth speed forward, is output as sixth speed forward from the counter gear 5. At this time, within the second planetary gear unit PR, the reduced speed rotation is output to the ring gear R3 via the sun gear S1 (which receives the rotation of the input shaft 2) and the fixed carrier CR1; however, the transmitting member 130 does not transmit torque, because the clutch C3 is released.

In first speed reverse, as illustrated in FIG. 22, the clutch C3 and the brake B2 are engaged. In this manner, as illustrated in FIG. 23, the rotation of the input shaft 2 is input to the sun gear S1, and the ring gear R1 rotates at reduced speed rotation via the fixed carrier CR1. Further, because the clutch C3 is engaged, the reduced speed rotation of ring gear R1 is input to the ring gear R2 via the transmitting member 130. Further, because the brake B2 is engaged, the carrier CR3 and the ring gear R2 are fixed against rotation, and reverse rotation is output to the sun gear S3 and the sun gear S3 because of the fixed carrier CR3 and the reduced speed rotation of the ring gear R3. Reverse rotation is output to the carrier CR2, with ring gear R2 fixed and the reverse rotation input to sun gear S2, and the rotation for first speed reverse is output from the counter gear 5. In reverse, similar to third speed forward and fifth speed forward, the ring gears R1 and R3 are rotating at a reduced speed and, accordingly, the transmitting member 130 transmits a relatively large torque.

In P (parking) range and N (neutral) range, the clutches C1, C2, and C3 are released, the input shaft 2 is disconnected from the counter gear 5, and the automatic transmission $1_{15}$ as a whole is in an idle state (neutral state).

In the automatic transmission $1_{15}$ of this fifteenth embodiment, because the second planetary gear unit PR and the clutch C2 are located on one side of the first planetary gear unit PU, and the clutch C1 is located on the axially opposite side of the first planetary gear unit PU, the planetary gear units PR and PU can be located more closely together, compared to a transmission wherein, for example, two clutches C1 and C2 are located between the planetary gear units PR and PU, and the transmitting member 130 can be made relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2*a*, 2*b*, 91, 93, 94) that supply the hydraulic servos 11, 12, and 13 of these clutches C1, C2, C3 can be easily constructed, the manufacturing process can be simplified, and the costs can be reduced.

Because the hydraulic servos 11 and 12 are mounted on the input shaft 2, one set of seal rings 81 and 82 form a connection to the case 3 for supply of oil to the oil lines 2*a* and 2*b* within input shaft 2, and therefore oil can be supplied to the oil chambers of hydraulic servos 11 and 12 without providing seal rings between, for example, the input shaft 2 and the hydraulic servos 11 and 12. Further, hydraulic servo 13 can receive supply of oil directly from the boss 3*b*, i.e. without passing through other units. Therefore, oil can be supplied simply by providing one set of seal rings 81 and 82, 84 for each of the hydraulic servos 11, 12, and 13, sliding resistance from the seal rings can be minimized, and therefore the efficiency of the automatic transmission can be improved.

Further, because the clutch C2 is located radially inward of the clutch C3, the clutch C3, which must transmit a relatively large torque at the reduced speed, and its hydraulic servo 13 can have an increased diameter. In particular, the pressure-receiving area of the oil chamber of the hydraulic servo 13 can be enlarged, and the torque transmission capacity of this clutch C3 can be increased. Further, the clutch C2 can be designed have a smaller torque transmission capacity than the clutch C3, and therefore the automatic transmission can be made more compact.

Further, the clutch C1 engages at the relatively slow to medium speeds of first speed forward, second speed forward, third speed forward, and fourth speed forward, and therefore when this clutch C1 is released at the relatively high speeds, i.e. fifth speed forward, sixth speed forward, and first speed reverse, the hub unit 122 that connects this clutch C1 and the sun gear S2 rotates at a relatively high speed or in reverse (see FIG. 3). Because in fifth speed forward and first speed reverse the transmitting member 130 rotates at a reduced speed, and in sixth speed forward the transmitting member 130 may be fixed in some cases, the speeds of hub unit 122 and the transmitting member 130 can differ. However, because clutch C1 is located on the side of the first planetary gear unit PU axially opposite the second planetary gear unit PR, the hub unit 122 and the transmitting member 130 can be spaced apart from one another. As compared with a transmission wherein, for example, these members are in contact due to a multi-axial configuration, decrease in efficiency of the automatic transmission resulting from friction and so forth from the relative rotation of those units can be avoided.

The automatic transmission $1_{15}$ of this fifteenth embodiment is directly coupled in fourth speed forward. Therefore, in fifth speed forward and sixth speed forward, the gear ratio can be a high ratio, and particularly when the vehicle is running at a high speed, the engine speed can be reduced, thereby allowing the vehicle to run more quietly.

The transmitting member linking the planetary gear units PR and PU requires rigidity to withstand the reduced speed torque that it transmits. A clutch that engages at a slow to medium speed and a clutch that engages and disengages a reduced speed rotation on the inner side of the transmitting member must have a large capacity, and therefore a diameter corresponding to this capacity becomes necessary. Therefore, if the transmitting member passes on the outer circumferential side of this type of clutch, an even larger diameter becomes necessary, the linking member must be enlarged, and the automatic transmission as a whole is increased in diameter. Therefore an object of the present embodiment is to allow reduction of the diameter, and to provide a more compact automatic transmission.

According to the present embodiment, enlargement of the diameter of the linking member is avoided by locating a clutch C2 with a small capacity on the inner side of the transmitting member 130.

Sixteenth Embodiment

The sixteenth embodiment, which is a partial modification of the fifteenth embodiment will now be described with reference to FIGS. 24 through 26. Components of the sixteenth embodiment which are the same as those of the fifteenth embodiment are denoted by the same reference numerals, and description thereof will not be repeated, except for modifications.

Figure 24:
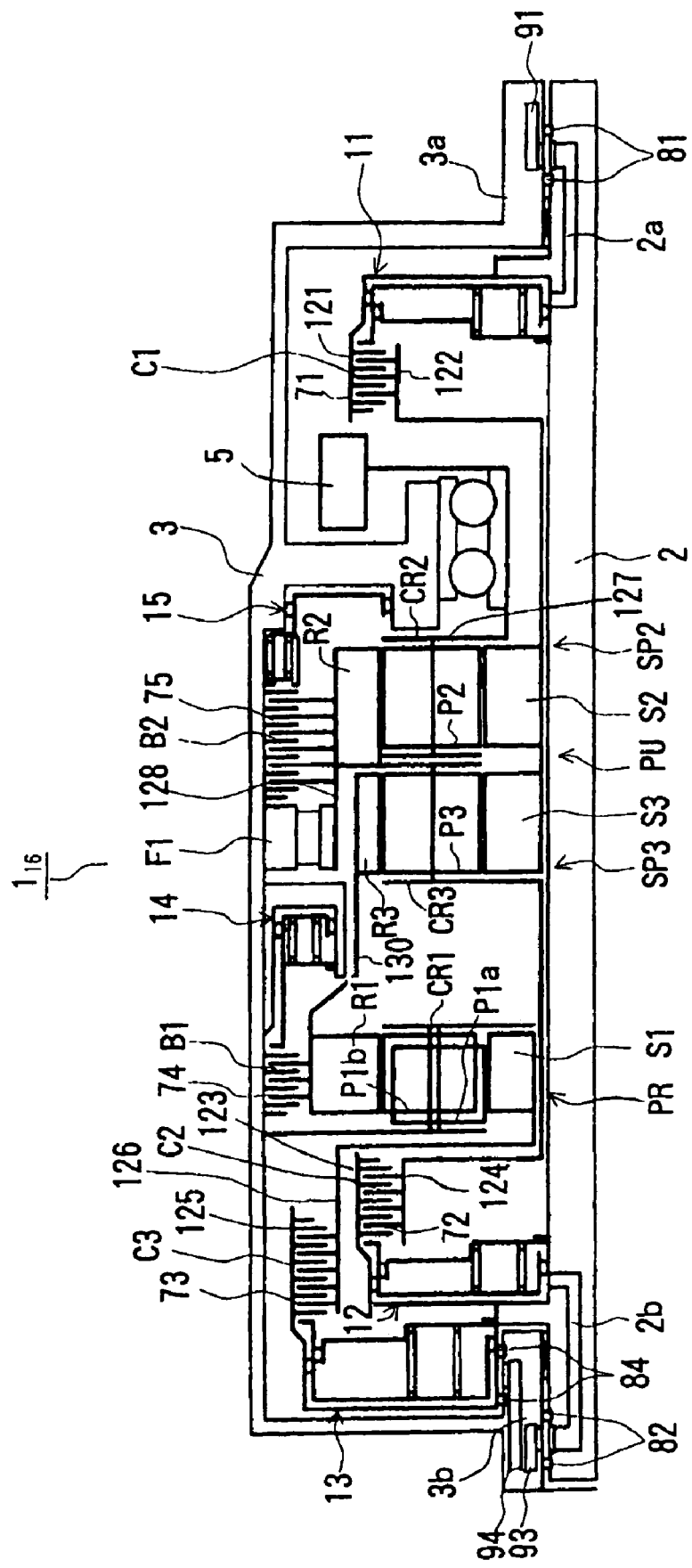
FIG. 24 is a schematic cross-sectional view of an automatic transmission according to a sixteenth embodiment.

As illustrated in FIG. 24, the automatic transmission $1_{16}$ of the sixteenth embodiment differs with regard to the configuration of the second planetary gear unit PR and the clutch C3, as compared to the automatic transmission $1_{15}$ of the fifteenth embodiment (see FIG. 21).

In this sixteenth embodiment the clutch C3 is located on the planetary gear unit PU side (left side of diagram) of the second planetary gear unit PR. The inner surface of a front portion of the drum 125 of this clutch C3 is splined to the friction plates 73, which are intermeshed with friction plates splined to the hub unit 126. The drum 125 is connected to the input shaft 2, and the hub unit 126 is connected to the sun gear S1. The clutch C2 includes a hydraulic servo 12, friction plates 72, a drum 123, and a hub unit 124 and is located radially inward of the clutch C3. Thus, clutch C2 is enclosed within the hub unit 126.

On radially outer side of the second planetary gear unit PR is a multi-disc brake B1 that comprises a hydraulic servo 14 and friction plates 74. The side plate of the carrier CR1 of this second planetary gear unit PR is fixed to and supported by the case 3. Further, the ring gear R1 is connected to the transmitting member 130, and the friction plates 74 of the brake B1 are intermeshed with friction plates splined to the outer circumferential surface of transmitting member 130 which is connected to the ring gear R3.

The operations of the automatic transmission $1_{16}$ will now be described with reference to FIG. 24, FIG. 25, and FIG. 26. As with the above-mentioned first embodiment, the vertical axes of the speed line diagram illustrated in FIG. 26 indicate the speed of each rotary component, and the horizontal axis indicates the corresponding gear ratio of these rotary components. Further, regarding the planetary gear unit PU section of this speed line diagram, the vertical axis to the farthest horizontal edge (the right side of FIG. 26) corresponds to ring gear R3, and moving to the left within the diagram, the vertical axes correspond to the ring gear R2 and the carrier CR3, the carrier CR2, and the sun gear S2 and the sun gear S3. Further, regarding the second planetary gear unit PR section of this speed line diagram, the vertical axis to the farthest horizontal edge (the right side of FIG. 26) corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Again, the dotted horizontal line represents the rotation transmitted by the transmitting member 130.

As illustrated in FIG. 24, by engaging the clutch C3, the rotation of the input shaft 2 is input to the sun gear S1. Further, the carrier CR1 is fixed to the case 3, and the ring gear R1 rotates at a reduced speed based on the rotation of the input shaft 2 input to sun gear S1. In other words, by engaging the clutch C3, the reduced speed rotation of the ring gear R1 is input to the ring gear R3 via the transmitting member 130.

Figure 26:
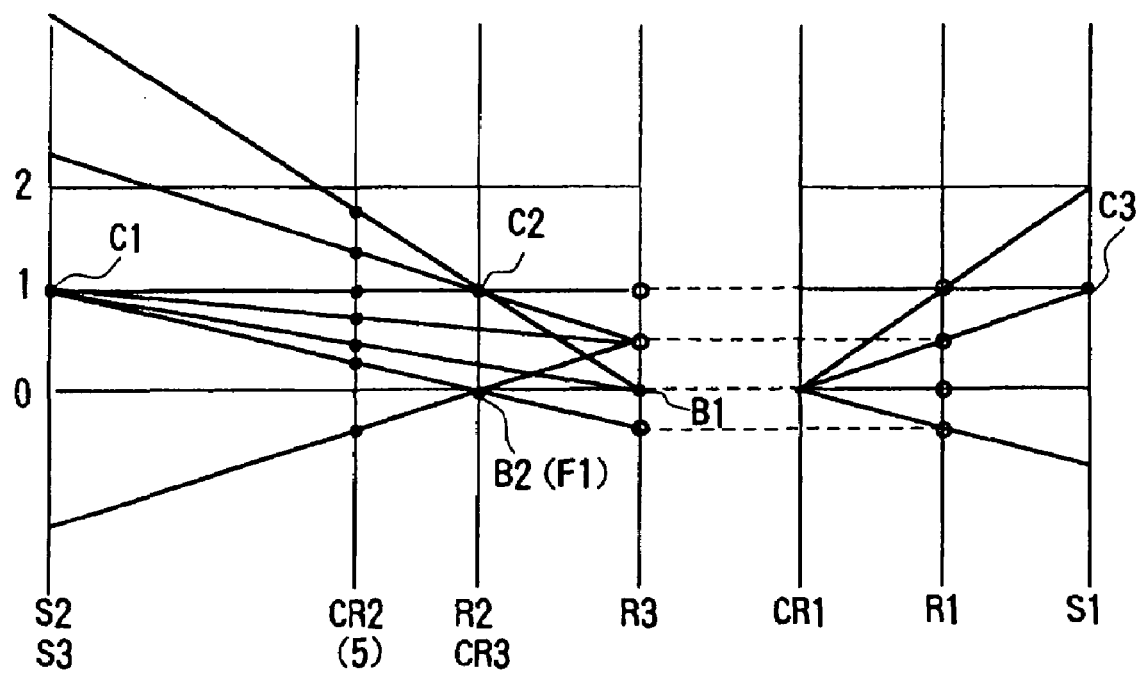
FIG. 26 is a speed line diagram for the automatic transmission of the sixteenth embodiment.

As illustrated in FIG. 25 and FIG. 26, within the second planetary gear unit PR, in third speed forward, fifth speed forward, and first speed reverse, the rotation of the input shaft 2 is input to the sun gear S1 by engaging the clutch C3, the reduced speed rotation is output to the ring gear R3 through the fixed carrier CR1, and the reduced speed rotation is input to the ring gear R3 via the transmitting member 130. At this time, the ring gear R1 and the ring gear R3 are rotating at a reduced speed, and therefore the transmitting member 130 transmits a relatively large torque. On the other hand, in first speed forward, second speed forward, fourth speed forward, and sixth speed forward, the rotation of the ring gear R3 is input to the ring gear R1 via the transmitting member 130, and further, because clutch C3 is released, as illustrated in FIG. 7, the sun gear S1 rotates in accordance with the speed of ring gear R1.

The operations of the second planetary gear unit PR are similar to those of the above-described fifteenth embodiment (see FIG. 22 and FIG. 23), and accordingly description thereof will be omitted.

In the automatic transmission $1_{16}$ of this sixteenth embodiment, because the second planetary gear unit PR and the clutch C2 are located on one side of the first planetary gear unit PU, and the clutch C1 is located on the axially opposite side of the first planetary gear unit PU, the planetary gear units PR and PU can be located more closely together, compared to a transmission wherein, for example, two clutches C1 and C2 are located between the planetary gear units PR and PU, and the transmitting member 130 can be made relatively shorter. Thus, the automatic transmission can be made more compact and more lightweight. Further, because the inertia (inertial force) can be reduced, the controllability of the automatic transmission can be increased, and the occurrence of speed change shock can be reduced. Further, compared to a transmission wherein three clutches C1, C2, C3 are located on one side of the first planetary gear unit PU, the oil lines (for example, 2a, 2b, 91, 93, 94) that supply the hydraulic servos 11, 12, and 13 of these clutches C1, C2, C3 can be more easily constructed, the manufacturing process can be simplified and the costs can be reduced.

Further, since the hydraulic servos 11 and 12 are mounted on the input shaft 2, one set of seal rings 81 and 82 seal the case 3 to the input shaft 2 for supply of oil to the oil lines 2a and 2b, and therefore oil can be supplied to the oil chambers of hydraulic servos 11 and 12 without providing seal rings between, for example, the input shaft 2 and the hydraulic servos 11 and 12. Further, the hydraulic servo 13 can receive supply of oil directly from the boss 3a extended from the case 3, without passing through other elements. Therefore, oil can be supplied simply by providing one set of seal rings 81 and 82, 84 for each of the hydraulic servos 11, 12, and 13, sliding resistance from the seal rings can be minimized, and therefore the efficiency of the automatic transmission can be improved.

Further, the clutch C1 engages at the relatively slow to medium speeds of first speed forward, second speed forward, third speed forward, and fourth speed forward, and therefore when this clutch C1 is released at the relatively high speeds of fifth speed forward, sixth speed forward, and first speed reverse, the hub unit 122 that connects clutch C1 and the sun gear S2 rotates at a relatively high speed or in reverse (see FIG. 3). On the other hand, in the fifth speed forward and first speed reverse the transmitting member 130 rotates at a reduced speed, and in sixth speed forward the transmitting member 130 may be fixed in some cases, whereby the speeds of the hub unit 122 and the transmitting member 130 may differ. However, because clutch C1 is located on the side of the first planetary gear unit PU opposite the second planetary gear unit PR, the hub unit 122 and the transmitting member 130 can be spaced apart from one another. As compared with a transmission wherein, for example, these members are in contact due to a multi-axial configuration, decreased efficiency of the automatic transmission resulting from friction and so forth from the relative rotation of those units can be avoided.

Further, if the clutch C3 is placed between the ring gear R1 and the sun gear S3, for example, the reduced speed rotation must be engaged and disengaged, and the clutch C3 must be relatively large, but by placing clutch C3 between the input shaft 2 and the sun gear S1, the engaging and disengaging of clutch C3 indirectly controls transmission of the reduced speed rotation from the ring gear R1 of the second planetary gear unit PR, the clutch C3 can be made more compact, and therefore the automatic transmission can be made more compact.

Further, the automatic transmission $1_{16}$ of this sixteenth embodiment is directly coupled in fourth speed forward. Therefore, in fifth speed forward and sixth speed forward, the gear ratio can be a high ratio, and when the vehicle is running at a high speed, the engine speed can be reduced, and the vehicle can run more quietly at a high speed.

If a clutch is located between the planetary gear units PR and PU, the length of the transmitting member that links the planetary gear units PR and PU must be axially elongated, and since this transmitting member transmits the reduced speed rotation, the thickness of the transmitting member must be increased, and therefore the weight also increases. Therefore an object of the present invention is to provide an automatic transmission that can shorten the distance between the planetary gear units and thereby reduce the weight.

In the present embodiment, the clutch C2 is disposed on the side of the first planetary gear unit PU opposite the second planetary gear unit PR, and therefore a clutch between the planetary gear units PR and PU is not necessary, and the length of the transmitting member 130 can be shorter. Therefore, the weight of the automatic transmission as a whole can be reduced.

Seventeenth Embodiment

A seventeenth embodiment, which is a partial modification of the fifteenth embodiment will now be described with reference to FIG. 27 through FIG. 29. Components of the seventeenth embodiment which are the same as those of the fifteenth embodiment are denoted by the same reference numerals, and description thereof omitted, except for the modifications.

Figure 27:
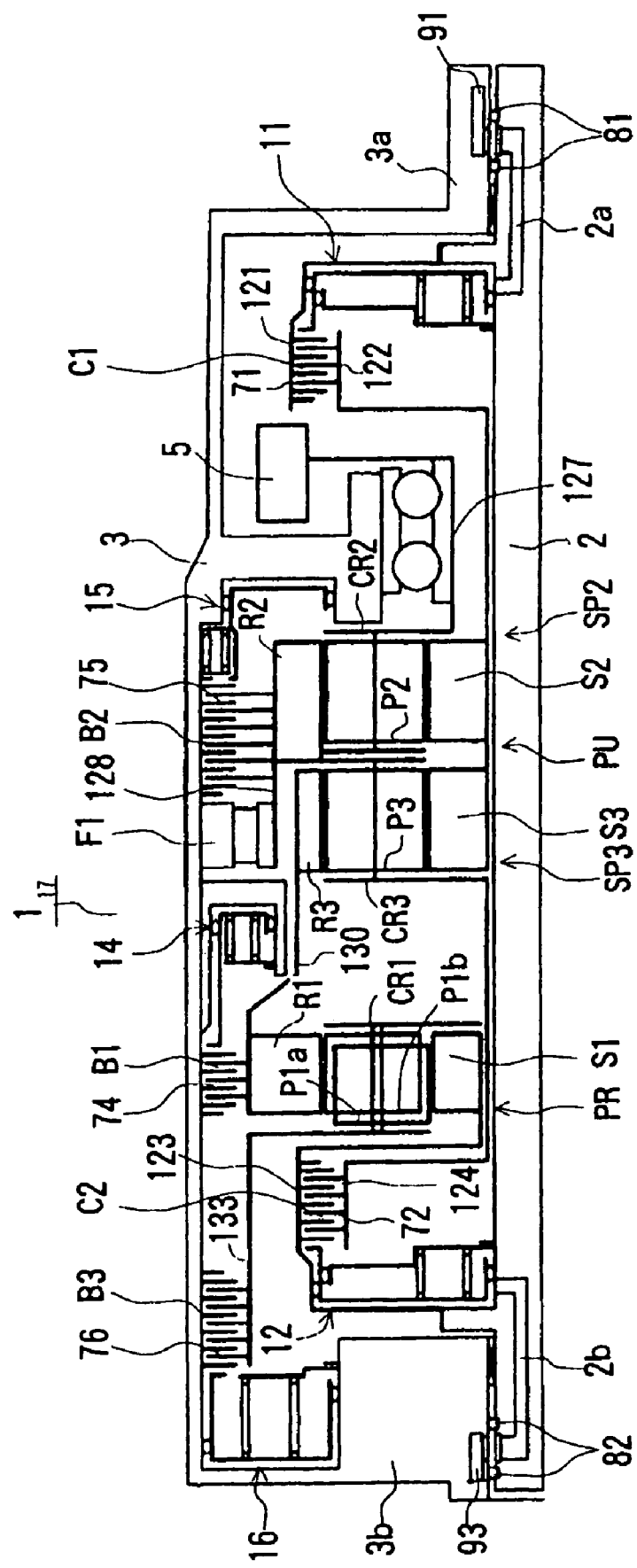
FIG. 27 is a schematic cross-sectional view of an automatic transmission according to a seventeenth embodiment.

As FIG. 27 illustrates, the automatic transmission $1_{17}$ of the seventeenth embodiment differs from the fifteenth embodiment with respect to the configuration of the clutch C2, and in use of a brake B3 instead of a clutch C3, whereby the carrier CR1 of the second planetary gear unit PR can be fixed by the brake B3.

Within the automatic transmission $1_{17}$, the brake B3 is located on the second planetary gear unit PR, on the side (left side on the diagram) opposite the planetary gear unit PU. This brake B3 comprises a hydraulic servo 16, friction plates 76, and a hub unit 133. Further, the clutch C2, comprising a hydraulic servo 12, friction plates 72, a drum 123, and a hub unit 124, is located radially inward of the brake B3 and within the hub unit 133. The hub unit 133 of brake B3 is connected to one side plate of the carrier CR1, and the other side plate of the carrier CR1 is rotatably supported by the input shaft 2. Further, the sun gear S1 is connected to the input shaft 2 via the drum 123 of the clutch C2. The friction plates 74 of the brake B1 are intermeshed with friction plates splined to the outer circumferential surface of the ring gear R1, and this ring gear R1 is connected by the transmitting member 130 to the sun gear S3.

The operations of the automatic transmission $1_{17}$ will now be described with reference to FIG. 27, FIG. 28, and FIG. 29 below. Now, as with the above-mentioned first embodiment, the vertical axes of the speed line diagram illustrated in FIG. 29 indicate the speeds of each rotary component, and the horizontal axis indicates the corresponding gear ratio of these rotary components. In the planetary gear unit PU section of this speed line diagram, the vertical axis to the farthest horizontal edge (the right side of FIG. 29) corresponds to ring gear R3, and moving to the left within the diagram, the vertical axes correspond to the ring gear R2 and the carrier CR3, the carrier CR2, and the sun gears S2 and S3. Further, in the second planetary gear unit PR section of this speed line diagram, the vertical axis to the farthest horizontal edge (the right side of FIG. 29) corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Again, the horizontal dotted line in the diagram represents the rotation transmitted by the transmitting member 130.

As FIG. 27 illustrates, by engaging the brake B3, the carrier CR1 is fixed to the case 3. Further, the rotation of the input shaft 2 is input to the sun gear S1, and the ring gear R1 rotates at reduced speed rotation based on the rotation of input shaft 2 which is input to this sun gear S1, with the carrier CR1 fixed. In other words, by engaging the brake B3, the reduced speed rotation of the ring gear R3 is input to the sun gear S3 via the transmitting member 130.

Figure 29:
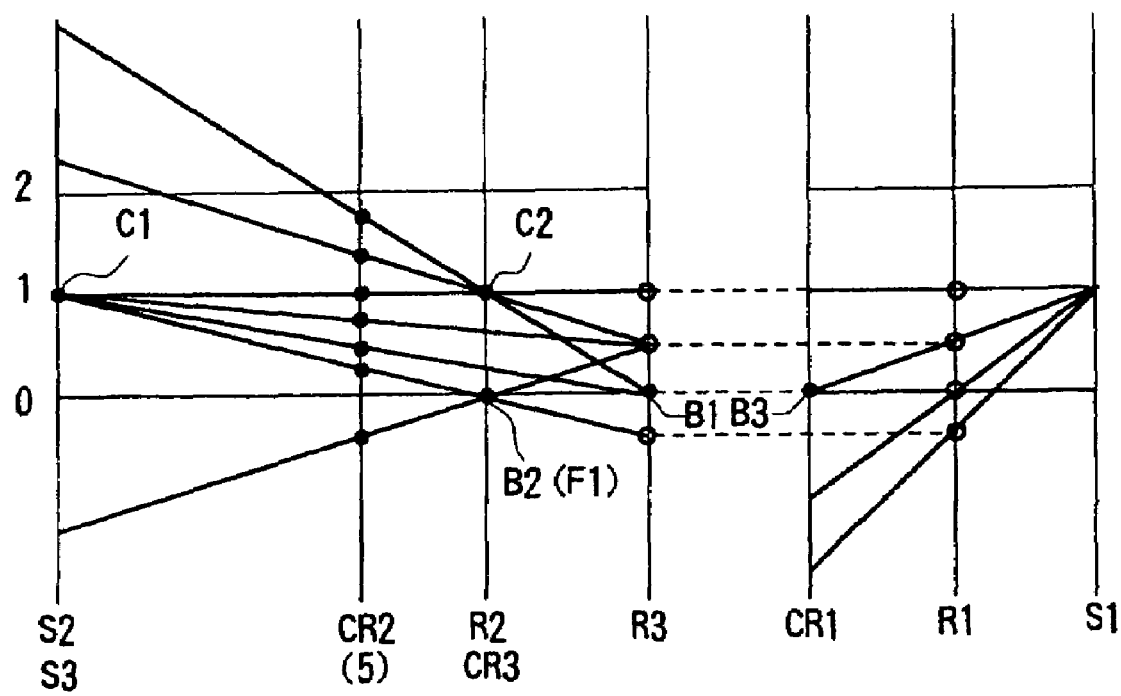
FIG. 29 is a speed line diagram for the automatic transmission of the seventeenth embodiment.

As FIG. 28 and FIG. 29 illustrate, with regard to the second planetary gear unit PR, in third speed forward, fifth speed forward, and first speed reverse, the rotation of the input shaft 2 is input to the sun gear S1 by engagement of the brake B3 to fix the carrier CR1, and the reduced speed rotation is output to the ring gear R3 by the rotation of the sun gear S1 which receives input of the rotation of the input shaft 2, and the reduced speed rotation is input to the sun gear S3 via the transmitting member 130. In this case, the ring gears R1 and R3 are rotating at the reduced speed, and therefore the transmitting member 130 transmits a relatively large torque. On the other hand, at first speed forward, second speed forward, fourth speed forward, and sixth speed forward, the rotation of the ring gear R3 is input to the ring gear R1 via the transmitting member 130, and further, because the brake B3 is released, as FIG. 29 illustrates, the carrier CR1 rotates within the speed range of this ring gear R1 and the sun gear S1.

The operations of the second planetary gear unit PR are similar to those of the fifteenth embodiment (see FIG. 22 and FIG. 23), and accordingly description thereof will not be repeated here.

In the automatic transmission $1_{17}$ of this seventeenth embodiment, due to the second planetary gear unit PR and the clutch C2 being located on one side of the planetary gear unit PU, and the clutch C1 being located on the axially opposite side of the planetary gear unit PU, the second planetary gear unit PR and the planetary gear unit PU can be located more closely together, as compared to a transmission wherein, for example, two clutches C1 and C2 are disposed between the planetary gear units PR and PU, and the transmitting member 130 can be made relatively shorter. By doing so, the automatic transmission can be made more compact and more lightweight. Further, because the inertia (inertial force) can be reduced, the controllability of the automatic transmission can be increased, and the occurrence of speed change shock can be reduced.

Further, since the hydraulic servos 11 and 12 are mounted on the input shaft 2, one set of the seal rings 81 and 82 seal the case 3 to the input shaft 2 for supply of oil to the oil lines 2a and 2b provided within input shaft 2, and therefore oil can be supplied to the oil chambers of hydraulic servos 11 and 12 without providing seal rings between, for example, the input shaft 2 and the hydraulic servos 11 and 12. Therefore, oil can be supplied simply by providing one set of the seal rings 81 and 82 for each of the hydraulic servos 11 and 12, sliding resistance from the seal rings can be minimized, and therefore the efficiency of the automatic transmission can be improved.

Further, the clutch C1 engages at the relatively slow to medium speeds of first speed forward, second speed forward, third speed forward, and fourth speed forward, and therefore when this clutch C1 is released at the relatively high speeds of fifth speed forward, sixth speed forward, or first speed reverse, the hub unit 122 that connects this clutch C1 and the sun gear S2 rotates at a relatively high speed or in reverse (see FIG. 3). On the other hand, in fifth speed forward and first speed reverse the transmitting member 130 rotates at reduced speed, and in sixth speed forward the transmitting member 130 may be fixed in some cases, and accordingly the speeds of the hub unit 122 and the transmitting member 130 can differ. However, because clutch C1 is located on the side of the first planetary gear unit PU opposite the second planetary gear unit PR, the hub unit 122 and the transmitting member 130 can be spaced apart from one another. In comparison with a transmission wherein, for example, these members are in contact due to a multi-axial configuration, decreased efficiency of the automatic transmission resulting from friction and so forth from the relative rotation of those units can be avoided.

Further, since the reduced speed rotation output to the first planetary gear unit PU from the second planetary gear unit PR is engaged and disengaged by the brake B3, the number of components (for example drums and so forth) can be reduced as compared to an embodiment including, for example, clutch C3. Further, the brake B3 can receive oil supply directly from the case 3, and therefore the configuration of the oil line can be simplified as compared to the case wherein, for example, a clutch C3 is provided.

The automatic transmission $1_{17}$ of this seventeenth embodiment is directly coupled in fourth speed forward. Therefore, in fifth speed forward and sixth speed forward, the gear ratio can be a high ratio, and particularly when the vehicle is running at a high speed, the engine speed can be reduced, whereby the vehicle will run more quietly at a high speed.

In this seventeenth embodiment, because the clutch C2 is disposed on the side of the first planetary gear unit PU opposite the second planetary gear unit PR, provision of a clutch between the second planetary gear unit PR and the first planetary gear unit PU is not necessary, and the length of the transmitting member 130 can be shorter. Therefore, the weight of the automatic transmission as a whole can be less.

Eighteenth Embodiment

Figure 32:
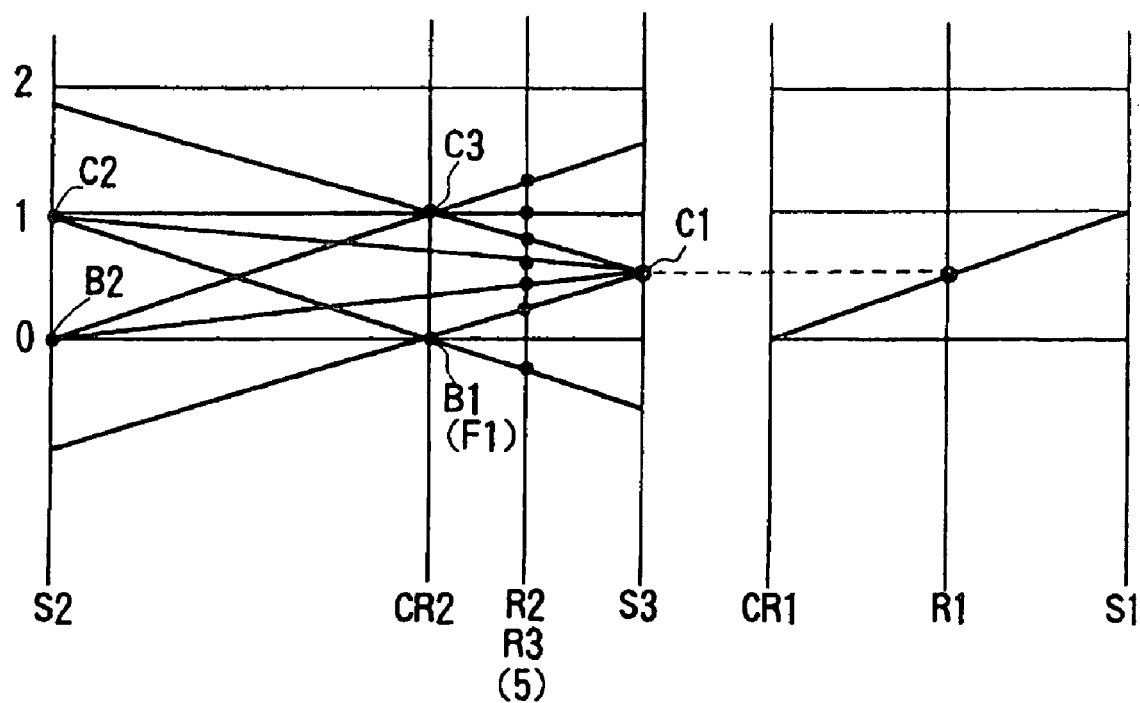
FIG. 32 is a speed line diagram for the automatic transmission of the eighteenth embodiment.

An eighteenth embodiment, which is a partial modification of the first through the seventeenth embodiments will now be described, with reference to FIG. 30 through FIG. 32. Components of the eighteenth embodiment which are the same as those of the first embodiment are denoted by the same reference numerals, and description will be omitted, except for modifications.

Figure 30:
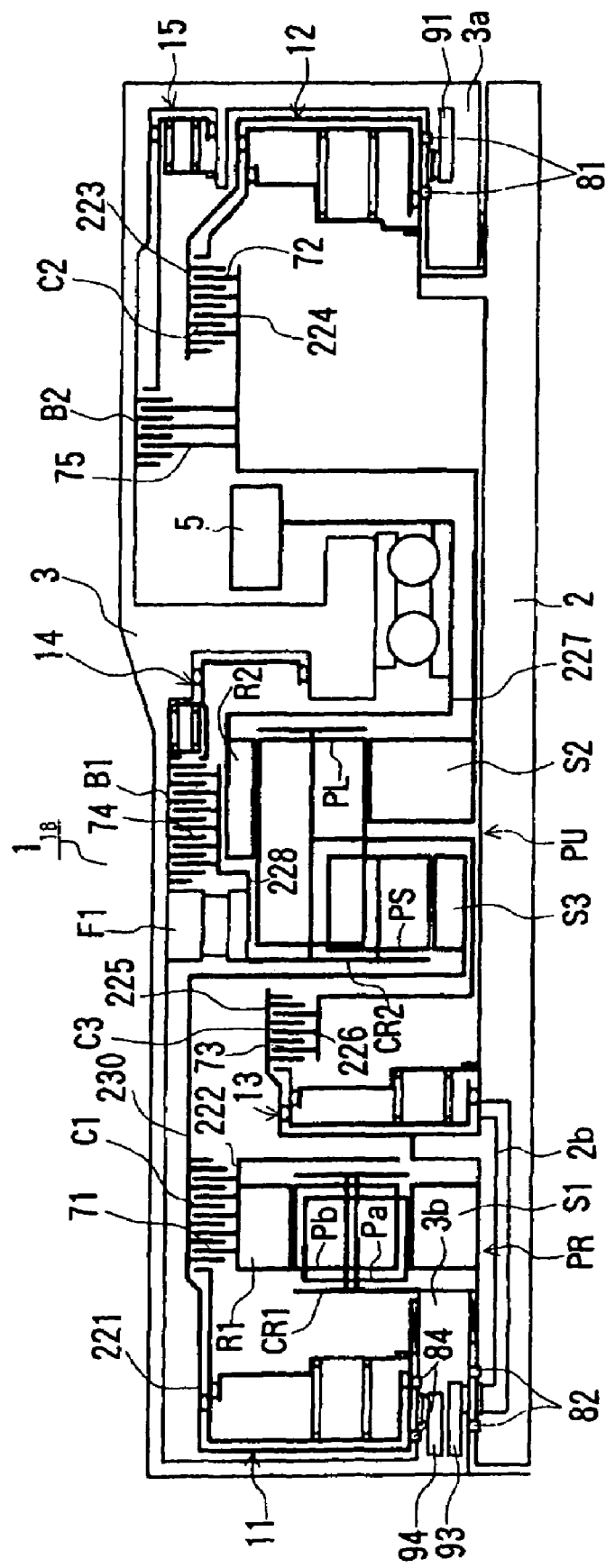
FIG. 30 is a schematic cross-sectional view of an automatic transmission according to an eighteenth embodiment.

As illustrated in FIG. 30, the automatic transmission $1_{18}$ of the eighteenth embodiment comprises a first planetary gear unit PU and a second planetary PR on the input shaft 2. The first planetary gear unit PU is a multiple type planetary gear unit, which comprises a sun gear S2, a carrier CR2, a ring gear R2, and a sun gear S3, a total of four rotary components. The carrier CR2 supports a long pinion PL, that meshes with the sun gear S3 and the ring gear R2, and a short pinion PS that meshes with the sun gear S3, with pinions PL and PS meshed one to another. Further, the second planetary gear unit PR is a double pinion planetary gear unit that has a carrier CR1 supporting a pinion Pb, which is meshed with a ring gear R1, and a pinion Pa, which is meshed with a sun gear S2, with the pinions Pa and Pb meshed one to another.

On the input shaft 2 is a multi-disc clutch (second clutch) C2 on the inner circumference side, which comprises a hydraulic servo 12, friction plates 72, a clutch drum 223, and a hub unit 224 linked to the sun gear S2. A multi-disc brake B2, located on the outer circumference side, comprises a hydraulic servo 15, and friction plates 75 that are intermeshed with friction plates splined to the hub unit 224.

The oil chamber of this hydraulic servo 12 extends from one end of the case 3, and is connected to an oil line 91 of the boss 3a which is formed as a sleeve on the input shaft 2. Also, this oil line 91 connects to an oil pressure control unit not illustrated. Because the hydraulic servo 12 is mounted on the boss 3a, an oil line from the oil pressure control unit, not illustrated, is connected to the oil chamber of the hydraulic servo 12 by one set of seal rings 81 which provide a seal between boss unit 3a and the clutch drum 223.

Further, the above-mentioned input shaft 2 is connected to the clutch drum 223 and the inner surface of a front portion of this drum 223 is splined to friction plates 72 of the clutch C2 which is operated by the hydraulic servo 12. Further, hub unit 224 is connected to the sun gear S2. Further, the brake B2 has friction plates 75 intermeshed with friction plates splined to the outer circumferential surface of the drum 224, engaged by operation of hydraulic servo 15.

At the other end (the left of the diagram) of the input shaft 2 is a multi-disc clutch (first clutch) C3 which comprises a hydraulic servo 13, friction plates 73, a clutch drum 225, and a hub unit 226. Friction plates 73 are splined to the inner surface of a front portion of the clutch drum 225, and are intermeshed with friction plates splined to the outer surface of a front portion of the hub unit 226 which is connected to the carrier CR2.

The oil chamber of this hydraulic servo 13 is connected through an oil line 2b which is formed on the input shaft 2 to oil line 93 of the boss 3b which, in turn, is connected to the oil pressure control unit. Therefore, by providing one set of seal rings 81 to seal between the boss 3b and the drum 225, an oil line from the oil pressure control device is connected to the oil chamber of the hydraulic servo 13.

Mounted on the boss 3b is a multi-disc clutch (third clutch) C1 comprising a hydraulic servo 11, friction plates 71, and a drum 221. The oil chamber of the hydraulic servo 11 is connected to the oil line 94 of the boss unit 3b, and through oil line 94 to the oil pressure control unit.

The boss unit 3b rotatably supports the drum 221 and a front portion of the inner surface of drum 221 is splined to the friction plates 71 of the clutch C1 engaged by the hydraulic servo 11. Around the outer circumference of this clutch C1 is a hub unit 222 on which is formed the ring gear R1. This hub unit 222 is rotatably supported by the input shaft 2. Carrier CR1 supports a pinion Pb meshed with the ring gear R1 and a pinion Pa meshed with the sun gear S1 which is connected to the input shaft 2. This carrier CR1 is fixed to the boss 3b of the case 3, via a side plate.

Also, the drum 221, to which the above-mentioned clutch C1 is splined, is rotatably supported by the boss 3b, and is connected to a transmitting member 230 for transmitting the rotation of the ring gear R1, when the clutch C1 is engaged, to the sun gear S3 of the first planetary gear unit PU.

Around the outer circumference of the first planetary gear unit PU is a multi-disc brake B1 that comprises a hydraulic servo 14, friction plates 74, and a hub unit 228. A side plate of the carrier CR2 of the first planetary gear unit PU is connected to a hub unit 228 to which friction plates of the above-mentioned brake B1 are splined. Further, this hub unit 228 is connected to the inner race of a one-way clutch F1. The short pinion PS of this carrier CR2 meshes with the sun gear S3. Further, the sun gear S2 and ring gear R2 mesh with the long pinion PL. Transmitting member 227 connects one edge of ring gear R2 to the counter gear 5.

As described above, the second planetary gear unit PR and the clutches C1 and C3 are located on one side of the first planetary gear unit PU, and the clutch C2 and the counter gear 5 are located on the axially opposite side (right side of the diagram) of the first planetary gear unit PU. Further, the clutch C3 is arranged radially inward of the clutch C1 and radially inward of the transmitting member 230 that transmits the output thereof. Further, brake B2 is located around the outer circumference of the clutch C2, and the brake B1 is located around the outer circumference of the first planetary gear unit PU.

Operations of the automatic transmission $1_{18}$ of the eighteenth embodiment will now be described with reference to FIG. 30, FIG. 31, and FIG. 32 below. The vertical axes of the speed line diagram illustrated in FIG. 32 indicate the speed of the various rotary components, and the horizontal axis indicates the corresponding gear ratio of these rotary components. Further, in the first planetary gear unit PU section of this speed line diagram, the vertical axis to the farthest horizontal edge (the right side of FIG. 32) corresponds to sun gear S3, and moving to the left within the diagram, the vertical axes correspond to the ring gear R2, the carrier CR2, and the sun gear S2. Further, in the second planetary gear unit PR section of this speed line diagram, the vertical axis to the farthest horizontal edge (the right side of FIG. 32) corresponds to the sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Again, the horizontal dotted line in the diagram represents the rotation transmitted by the transmitting member 230.

As illustrated in FIG. 30, the rotation of the input shaft 2 is input to the above-mentioned sun gear S2 by engaging the clutch C2, and the sun gear S2 can be fixed by engagement of the brake B2. The rotation of the input shaft 2 is input to the carrier CR2, by engaging the clutch C3, and the carrier C2 can be fixed by engagement of the brake B1. Further, rotation in one direction is controlled by the one-way clutch F1.

The sun gear S1 is connected to and receives input from the input shaft 2, the carrier CR1 is connected to the case 3 whereby its rotation is fixed, and therefore the ring gear R1 rotates at a reduced speed. Further, by engaging the clutch C1, the reduced speed rotation of ring gear R1 is input to the sun gear S3. Also, the rotation of the ring gear R2 is output to the drive wheels through this counter gear 5, a counter shaft unit not illustrated, and a differential unit.

In first speed forward within the D (drive) range, as illustrated in FIG. 31, the clutch C1 and the one-way clutch F1 are engaged. Then, as illustrated in FIG. 32, the reduced speed rotation of the ring gear R1 is input to the sun gear S3 via the clutch C1 and the transmitting member 230. Further, the rotation of the carrier CR2 is limited to one direction (the forward rotation direction) by the one-way clutch F1. Then, the ring gear R2 rotates in first speed forward, derived from the reduced speed rotation input to the sun gear S2 and the fixed state of carrier CR2, and this rotation at first speed forward is output from the counter gear 5.

For downshifting (when coasting), the brake B1 is engaged to fix the carrier CR2, and the above-described state of first speed forward is maintained while preventing forward rotation of carrier CR2. Further, in first speed forward, the one-way clutch F1 prevents the carrier CR2 from reverse rotation, and therefore, switching from a non-driving range to a driving range and establishing first speed forward can be accomplished more smoothly by the automatic engagement of the one-way clutch. In this first speed forward, because the sun gear S3 and the ring gear R1 are rotating at a reduced speed, the transmitting member 230 transmits a relatively large torque.

In second speed forward within the D (drive) range, as illustrated in FIG. 31, the clutch C1 and the brake B2 are engaged. Then, as illustrated in FIG. 32, the reduced speed rotation of the ring gear R1 is input to the sun gear S3 via the clutch C1 and the transmitting member 230, and the rotation of the sun gear S2 is fixed by the brake B2. By doing so, the carrier CR2 rotates at a slightly reduced speed, and driven by the reduced speed rotations input to the sun gear S3 and this slightly reduced rotation of the carrier CR2, the ring gear R2 rotates at second speed forward, which rotation is output to the counter gear 5. Also in this case, because the sun gear S3 and the ring gear R1 are rotating at a reduced speed, the transmitting member 230 transmits a relatively large torque.

In third speed forward within the D (drive) range, as illustrated in FIG. 31, the clutch C1 and the clutch C2 are engaged. Then, as illustrated in FIG. 32, the reduced speed rotation of the ring gear R1 is input to the sun gear S3 via the clutch C1 and the transmitting member 230, and also the rotation of the input shaft 2 is input to the sun gear S2 by engaging the clutch C2. Further, with the rotation of the input shaft 2 input to the sun gear S2 and the reduced speed rotation of the sun gear S3, the carrier CR2 has slightly slower speed than the sun gear S3. Further, from the input rotation of the sun gear S2 and the reduced speed rotation of the sun gear S3, the ring gear R2 is rotated at third speed forward, and this rotation is output from the counter gear 5. In this case also, because the sun gear S3 and the ring gear R1 are rotating at a reduced speed, the transmitting member 230 transmits a relatively large torque.

In fourth speed forward within D (drive) range, as illustrated in FIG. 31, the clutch C1 and the clutch C3 are engaged. Then, as illustrated in FIG. 32, the reduced speed rotation of the ring gear R2 is input to the sun gear S3 via the clutch C1 and the transmitting member 230, and also the rotation of the input shaft 2 is input to the carrier CR2 via the clutch C3. Then, driven by the rotation of input shaft 2 input to the carrier CR2 and by the reduced speed rotation of the sun gear S3, the ring gear R2 rotates at fourth speed forward, and this rotation is output from the counter gear 5. In this case also, because the sun gear S3 and the ring gear R1 are rotating at a reduced speed, the transmitting member 230 transmits a relatively large torque.

In fifth speed forward within the D (drive) range, as illustrated in FIG. 31, the clutch C2 and the clutch C3 are engaged. Then, as illustrated in FIG. 32, the rotation of input shaft 2 is input to the carrier CR2 via the clutch C3, and also the rotation of the input shaft 2 is input to the sun gear S2 via the clutch C2. Then, with the rotation of the input shaft 2 input to the sun gear S2 and to the carrier CR2, the ring gear R2 is in a direct-connect rotating state, and rotates at fifth speed forward, i.e. at the same speed as the input shaft 2, and this rotation is output from the counter gear 5.

In sixth speed forward within the D (drive) range, as illustrated in FIG. 31, the clutch C3 and the brake B2 are engaged. Then, as illustrated in FIG. 32, the rotation of the input shaft 2 is input to the carrier CR2 via the clutch C3, and the sun gear S2 is fixed by engagement of the brake B2. Then, with the rotation of the input shaft 2 input to the carrier CR2 and the sun gear S2 fixed, the ring gear R2 rotates at sixth speed forward, and this rotation is output from the counter gear 5.

In first speed reverse within the R (reverse) range, as illustrated in FIG. 31, the clutch C2 and the brake B1 are engaged. Then, as illustrated in FIG. 32, the rotation of the input shaft 2 is input to the sun gear S2 by engaging the clutch C2, and the carrier CR2 is fixed by engagement of the brake B1. Then, with the rotation of the input shaft 2 input to the sun gear S2 and the carrier CR2 fixed, the ring gear R2 rotates at first speed reverse, and this rotation is output to the counter gear 5.

In P (parking) range and N (neutral) range, the clutches C1, C2, and C3 are released, the input shaft 2 is disconnected from the counter gear 5, and the automatic transmission $1_{18}$ as a whole is in an idle state (neutral state).

As described above, in the automatic transmission $1_{18}$ of the eighteenth embodiment, because the second planetary gear unit PR and the clutch C3 are located on one side of the first planetary gear unit PU, and the clutch C2 is located on the axially opposite side of the first planetary gear unit PU, the planetary gear units PR and PU can be located more closely together, as compared, for example, to an embodiment wherein two clutches C2 and C3 are located between the planetary gear units PR and PU, and the transmitting member 230 can be relatively shorter. In this manner, the automatic transmission can be made more compact and more lightweight. Further, because the inertia (inertial force) can be reduced, the controllability of the automatic transmission can be increased, and the occurrence of speed change shock can be reduced. Further, compared to an embodiment wherein three clutches C1, C2, C3 are located on one side of the first planetary gear unit PU, the oil lines (for example, 2b, 91, 93, 94) that supply the hydraulic servos 11, 12, and 13 of these clutches C1, C2, C3 can be more easily constructed, the manufacturing process can be simplified, and the costs can be reduced.

Further, since the hydraulic servo 13 is provided on the input shaft 2, one set of seal rings 82 form a seal between the case 3 and input shaft 2 to supply oil through the oil line 2b provided within input shaft 2 to the oil chamber of hydraulic servo 13, without providing seal rings between, for example, the input shaft 2 and the hydraulic servo 13. Further, hydraulic servos 11 and 12 can receive supply of oil directly from the bosses 3a, 3b without passing through other components. Therefore, oil can be supplied simply by providing one set of seal rings 81, 82, and 84 for each of the hydraulic servos 11, 12, and 13, and sliding resistance from the seal rings can be minimized, and therefore the efficiency of the automatic transmission can be improved.

Further, since the clutch C3 is radially inward of the clutch C1, the clutch C1, which must transmit a relatively large torque at the reduced speed, can be located on the outer circumference side, and this clutch C1 and the hydraulic servo 11 thereof can have an increased diameter. Particularly, the pressure-receiving area of the oil chamber of the hydraulic servo 11 can be enlarged, and the torque transmission capacity of this clutch C1 can thereby be increased. By designing the clutch C3 to have a smaller torque transmission capacity as compared to the clutch C1, the automatic transmission can be made more compact.

Further, because clutch C2 engages in first speed reverse, the hub unit 224 that connects this clutch C2 and the sun gear S2 rotate at the same speed as the input shaft 2, while the transmitting member 230 rotates in the opposite direction, and accordingly there is a great difference between the rotational speed of the transmitting member 230 and that of the hub unit 224, but due to clutch C2 being located on the side of the first planetary gear unit PU opposite the second planetary gear unit PR, the transmitting member 230 and the hub 224 can be spaced apart from one another. Compared to the case wherein, for example, those parts come into contact due to a multiple axis construction, the decreased efficiency of the automatic transmission caused by the friction produced by the relative rotation between those parts can be avoided.

Further, the automatic transmission $1_{18}$ according to this eighteenth embodiment is directly coupled in fifth speed forward. Therefore, at first speed forward and fourth speed forward, the gear ratio can be more precisely set, and particularly when the vehicle is running at a high speed, the engine speed can be reduced and fuel economy of the vehicle while running at a low to medium speed can be improved.

The transmitting member for linking the planetary gear units PR and PU requires rigidity to withstand the reduced speed torque that it transmits. For example, in the case of a clutch that engages at a slow to medium speed and a clutch that engages and disengages reduced speed rotation located on the inner circumference side of the linking member, the clutch must have a large capacity, and therefore a diameter appropriately corresponding to this capacity becomes necessary. Therefore, in the event that the transmitting member is the type that passes on the radially outer circumference side of this clutch, an even larger diameter becomes necessary, the diameter of the transmitting member must be further enlarged, and the automatic transmission as a whole must have a greater diameter. Therefore an object of the present embodiment is to minimize the diameter, and to thereby provide a compact automatic transmission.

According to the present embodiment, all clutches can be designed to avoid enlarging the diameter of the transmitting (linking) member, by providing a clutch C3 with a small capacity on the radially inner side of the transmitting member 230.

Nineteenth Embodiment

A nineteenth embodiment, which is a partial modification of the eighteenth embodiment will now be described with reference to FIG. 33 through FIG. 36. Components of the nineteenth embodiment which are the same as those of the eighteenth embodiment are denoted by the same reference numerals, and description thereof will not be repeated, except for the modifications.

Figure 33:
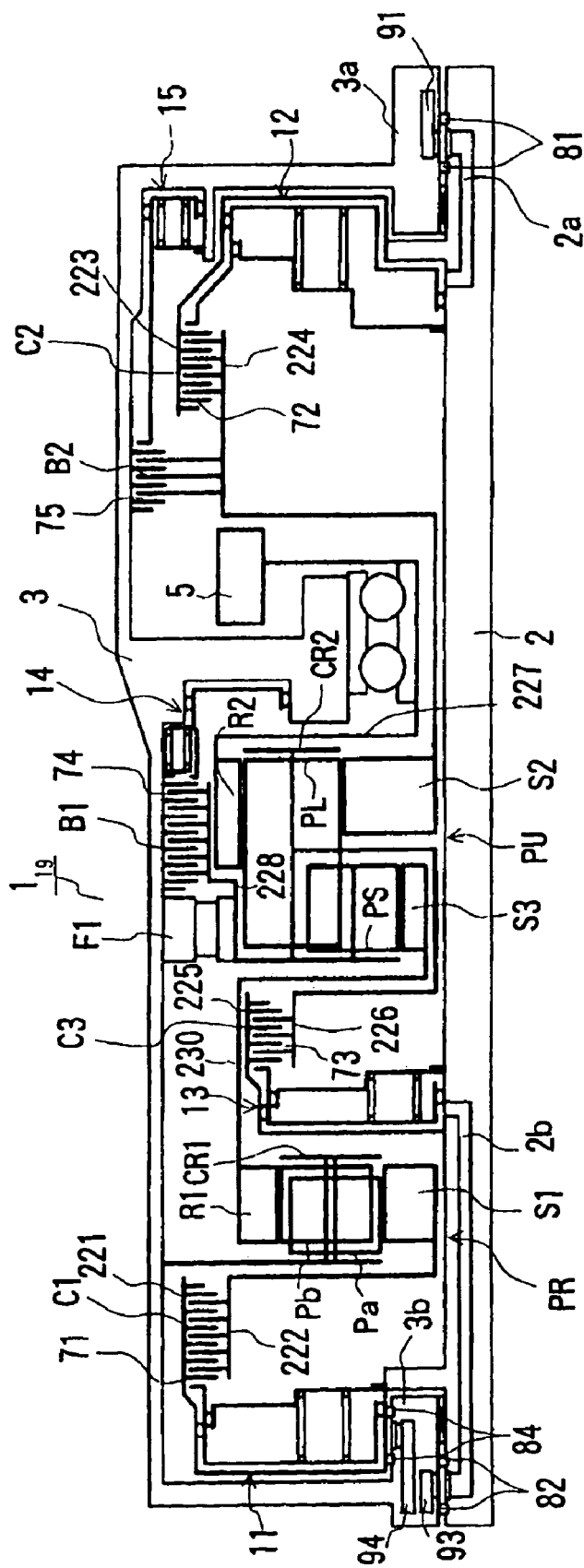
FIG. 33 is a schematic cross-sectional view of an automatic transmission of a nineteenth embodiment.

As FIG. 33 illustrates, the automatic transmission $1_{19}$ of the automatic transmission of the nineteenth embodiment has the configuration of the clutch C2 modified, and the construction of the oil line for the hydraulic servo 12 is changed as compared to the automatic transmission $1_{18}$ of the eighteenth embodiment (see FIG. 30).

Within the automatic transmission $1_{19}$, the clutch C1 is located on the side of the second planetary gear unit PR, opposite (left side on the diagram) the first planetary gear unit PU. A front portion of the inner circumferential surface of the drum 221 of this clutch C1 is splined to the friction plates 71 which are intermeshed with friction plates splined to the hub unit 222. The drum 221 is connected to the input shaft 2, and the hub unit 222 is connected to the sun gear S1 of the second planetary gear unit PR. The side plate of the carrier CR1 of this second planetary gear unit PR is fixed to and supported by the case 3. The ring gear R1 is connected through the transmitting member 230 to the sun gear S3. Further, the clutch C3, comprising a hydraulic servo 13, friction plates 73, a drum 225, and a hub unit 226, is located so as to be enclosed within this transmitting member 230.

The oil chamber of this hydraulic servo 12 is connected to an oil line 2a which is formed on the input shaft 2, and this oil line 2a is connected to the oil line 91 of the boss 3a which forms a sleeve around one end of the input shaft 2, and this oil line 91 is linked to an oil pressure control unit not illustrated. Therefore, simply by providing one set of seal rings 81 between the input shaft 2 and the boss 3a, oil communication is established between the oil pressure control device and the oil chamber of the hydraulic servo 12.

The operations of the automatic transmission $1_{19}$ of the nineteenth embodiment will be now described with reference to FIG. 33, FIG. 34, and FIG. 35 below. As with the previously described embodiments, the vertical axes of the speed line diagram illustrated in FIG. 35 indicate the speeds of the various rotary components, and the horizontal axis indicates the corresponding gear ratio of these rotary components. In the first planetary gear unit PU section of this speed line diagram, the vertical axis to the farthest horizontal edge (the right side of FIG. 35) corresponds to sun gear S3, and moving to the left within the diagram, the vertical axes correspond to the ring gear R2, the carrier CR2, and the sun gear S2. Further, in the second planetary gear unit PR section of this speed line diagram, the vertical axis to the farthest horizontal edge (the right side of FIG. 35) corresponds to sun gear S1, and moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the horizontal dotted line in the diagram represents the rotation transmitted by the transmitting member 230.

As illustrated in FIG. 33, by engaging the clutch C1, the rotation of the input shaft 2 is input to the sun gear S1. Further, the carrier CR1 is fixed to the case 3, and the ring gear R1 rotates at a reduced speed based on the rotation of the input shaft 2 input into sun gear S1. In other words, by engaging the clutch C1, the reduced speed rotation of the ring gear R1 is input to the sun gear S2 via the transmitting member 230.

Figure 35:
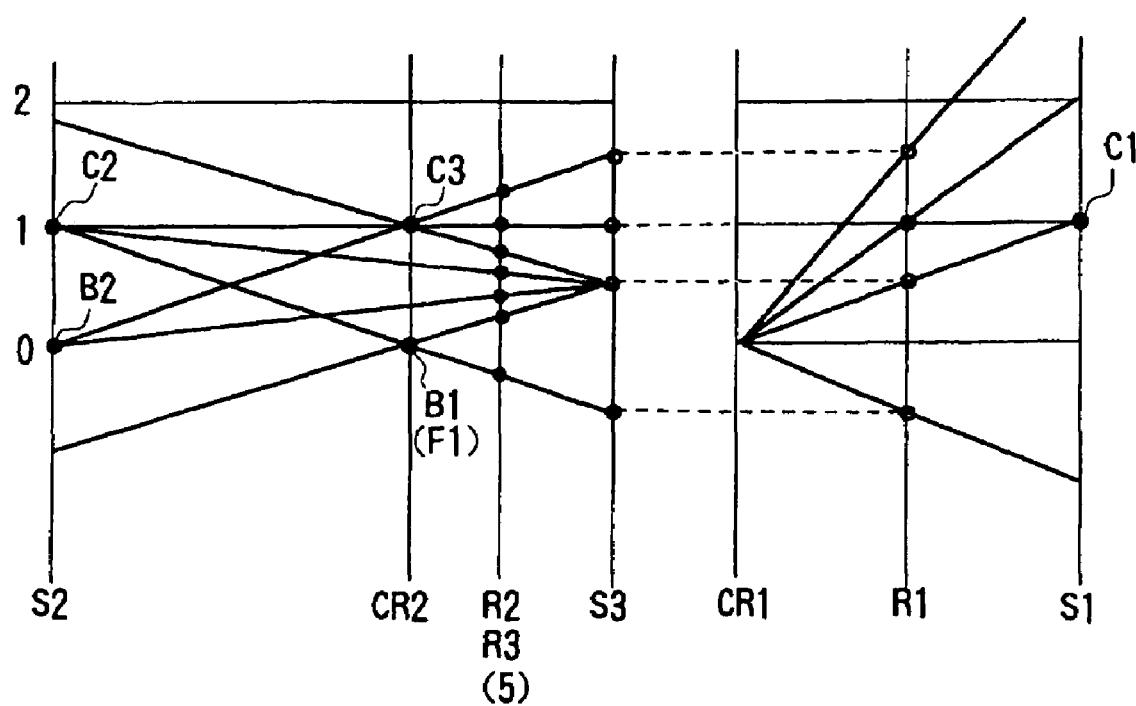
FIG. 35 is a speed line diagram for the automatic transmission of the nineteenth embodiment.

As illustrated in FIG. 34 and FIG. 35, within the second planetary gear unit PR, in first speed forward, second speed forward, third speed forward, and fourth speed forward, the rotation of the input shaft 2 is input to the sun gear S1 by engagement of the clutch C1, the reduced speed rotation is output to the ring gear R3 through the fixed carrier CR1, and the reduced speed rotation is input to the sun gear S3 via the transmitting member 230. At this time, the ring gear R1 and the sun gear S3 rotate at a reduced speed, and therefore the transmitting member 230 transmits a relatively large torque. On the other hand, in fifth speed forward, sixth speed forward, and first speed reverse, the rotation of the sun gear S3 is input to the ring gear R1 via the transmitting member 230, and further, because the clutch C1 is released, as illustrated in FIG. 35, the sun gear S1 rotates based on the speed of ring gear R1 and the fixation of the carrier CR1.

The other operations of the nineteenth embodiment are similar to those of the eighteenth embodiment (see FIG. 31 and FIG. 32), and accordingly description thereof will be omitted.

In the automatic transmission $1_{19}$ of the nineteenth embodiment, due to the second planetary gear unit PR and the clutch C3 being located on one side of the first planetary gear unit PU, and the clutch C2 being located on the axially opposite side of the first planetary gear unit PU, the planetary gear units PR and PU can be located more closely together, as compared to an embodiment wherein, for example, two clutches C2 and C3 are located between the planetary gear units PR and PU, and the transmitting member 230 can be made relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the first planetary gear unit PU, the oil lines (for example, 2a, 2b, 91, 93, 94) that supply the hydraulic servos 11, 12, and 13 of these clutches C1, C2, C3 can be more easily constructed, the manufacturing process can be simplified and the costs can be reduced.

Further, since the hydraulic servos 12, 13 are provided on the input shaft 2, one set of seal rings 81 and 82 form a seal with the case 3 for supply oil through the oil lines 2a and 2b within input shaft 2 to the oil chambers of hydraulic servos 12, 13, without providing the paired seal rings between, for example, the input shaft 2 and the hydraulic servos 12, 13. Further, the hydraulic servo 11 can receive supply of oil directly from the boss 3b without passing through other components, and therefore the oil supply can be connected by providing one set of seal rings 84. Therefore, oil can be supplied through sets of seal rings 81 and 82, 84 for the hydraulic servos 11, 12, and 13, sliding resistance from the seal rings can be minimized, and therefore the efficiency of the automatic transmission can be improved.

Further, since the clutch C2 engages for first speed reverse, when this clutch 2 is engaged in first speed reverse, the hub unit 224 that connects this clutch C2 and the sun gear S2 rotates at the same speed as the input shaft 2, while the transmitting member 230 rotates in the opposite direction, and therefore the speed difference between the transmitting member 230 and the hub unit 224 is large. However, since clutch C2 is located on the side of the first planetary gear unit PU opposite the second planetary gear unit PR, the transmitting member 230 and the hub 224 can be spaced apart from one another. Compared to the case wherein, for example, those parts come in contact in a multiple axis construction, the loss of efficiency of the automatic transmission caused by the friction produced by the relative rotation between those parts can be avoided.

If the clutch C1 were to be placed between the ring gear R1 and the sun gear S3, for example, the reduced speed rotation must be engaged and disengaged, and a larger clutch C1 would be required. However, by placing the clutch C1 between the input shaft 2 and the sun gear S1, the engaging and disengaging of the rotation of the input shaft 2 by this clutch C1 indirectly engages and disengages the reduced speed rotation output from the ring gear R1 of the second planetary gear unit PR, the clutch C1 can be made more compact, and therefore the automatic transmission can be made more compact.

Further, because the automatic transmission $1_{19}$ according to the nineteenth embodiment is directly coupled in fifth speed forward, in first speed forward and fourth speed forward, the gear ratio can be more precisely set for optimum efficiency, and particularly when the vehicle is running at a high speed, the engine can be operated more efficiently and fuel economy of the vehicle while running at a low to medium speed can also be increased.

The transmitting member which links the planetary gear units PR and PU requires rigidity to withstand the reduced speed torque that is input. In the case of a clutch that engages at a slow to medium speed and in the case of a clutch that engages and disengages at reduced speed and is located radially inward of the transmitting member, the clutch must have a large capacity and therefore a large diameter to provide the required capacity. Therefore, in the event that the transmitting member passes on the radially outer side of such a clutch, the diameter necessary for the clutch becomes even larger, the diameter of the transmitting member is enlarged more than necessary, and the automatic transmission as a whole has a greater diameter. Therefore an object of the present embodiment is to avoid the need for enlargement of the diameter, and to provide a more compact automatic transmission.

In this nineteenth embodiment, all clutches can be configured so as to avoid enlargement of the diameter of the transmitting member, because clutch C3 with a small capacity is provided radially inward of the transmitting member 230.

Twentieth Embodiment

The twentieth embodiment, which is a partial modification of the eighteenth embodiment will now be described with reference to FIG. 36 through FIG. 38. Components of the twentieth embodiment which are the same as those of the eighteenth embodiment are denoted by the same reference numerals, and description thereof omitted, except for the modified features.

Figure 36:
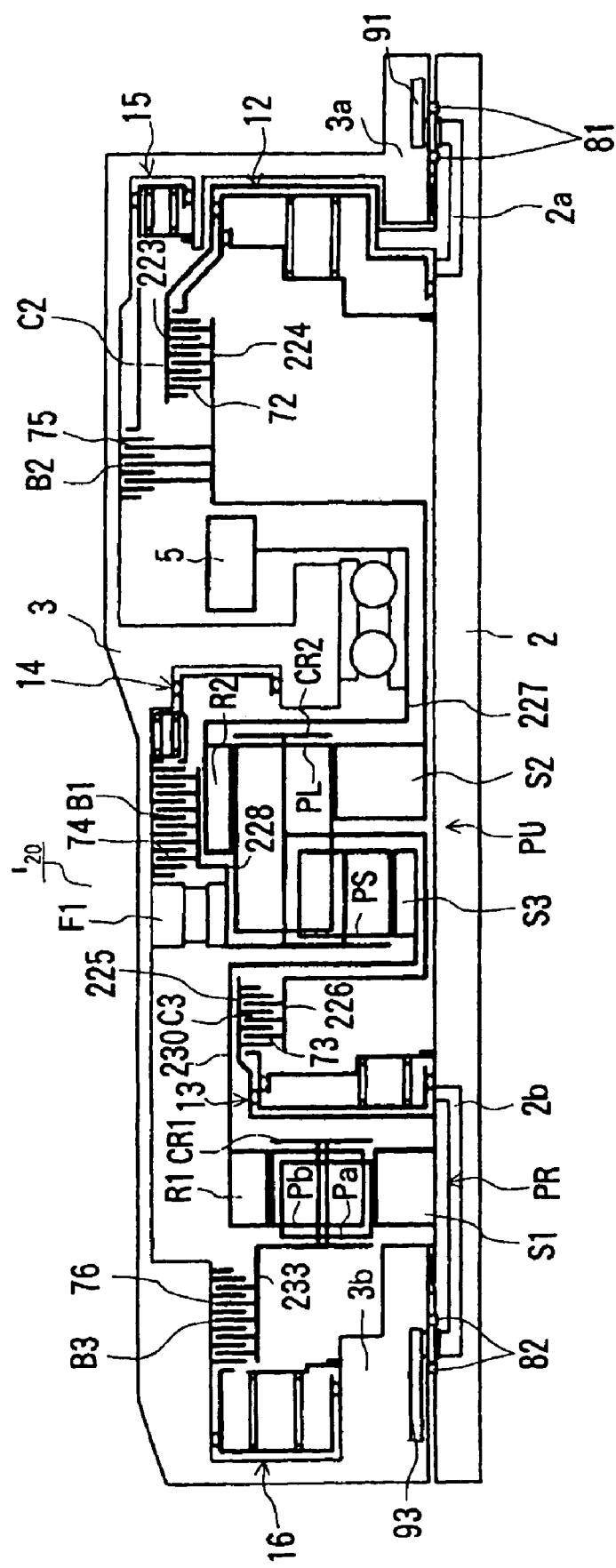
FIG. 36 is a schematic cross-sectional view of an automatic transmission according to a twentieth embodiment.

As FIG. 36 illustrates, the automatic transmission $1_{20}$ of the twentieth embodiment comprises a brake B3 instead of a clutch C1, and enables the carrier CR1 of the second planetary gear unit PR to be fixed by the brake B3, and further differs from the eighteenth embodiment in the construction of the oil line for the hydraulic servo 12 of the second planetary gear unit PR.

Within this automatic transmission $1_{20}$, the brake B3 is located on the side of the second planetary gear unit PR opposite (left side on the diagram) the first planetary gear unit PU. This brake B3 comprises a hydraulic servo 16, friction plates 76, and a hub unit 233.

The hub unit 233 of brake B3 is connected to the side plate on one side of the carrier CR1, and this carrier CR1 is rotatably supported by the input shaft 2 or the boss 3a. The sun gear S1 is connected to the input shaft 2. Ring gear R1 is connected to the sun gear S3 via transmitting member 230.

The oil chamber of the hydraulic servo 12 is connected to an oil line 2a which is formed on the input shaft 2. This oil line 2a, in turn, is connected to the oil line 91 which is connected to an oil pressure control unit not illustrated. Therefore, for hydraulic servo 11, simply by providing one set of seal rings between the input shaft 2 and the boss unit 3a of the case 3, the oil supply is connected from the oil pressure control device to the oil chamber of the hydraulic servo 12.

Operations of the automatic transmission $1_{20}$ of the twentieth embodiment will now be described with reference to FIG. 36, FIG. 37, and FIG. 38. Now, as with the previously described embodiments, the vertical axes of the speed line diagram illustrated in FIG. 38 indicate the respective speeds of the various rotary components, and the horizontal axis represents the corresponding gear ratios of these rotary components. In the first planetary gear unit PU section of this speed line diagram, the vertical axis to the farthest horizontal edge (the right side of FIG. 38) corresponds to sun gear S3 and, moving to the left within the diagram, the vertical axes correspond to the ring gear R2, the carrier CR2, and the sun gear S2. Further, in the second planetary gear unit PR section of this speed line diagram, the vertical axis to the farthest horizontal edge (the right side of FIG. 38) corresponds to sun gear S1 and, moving to the left within the diagram, the vertical axes correspond to the ring gear R1 and the carrier CR1. Further, the widths between these vertical axes are inversely proportional to the number of teeth of each of the sun gears S1, S2, S3, and to the number of teeth of each of the ring gears R1, R3. Also, the horizontal dotted line in the diagram represents the rotation transmitted from the transmitting member 230.

As FIG. 36 illustrates, by engaging the brake B3, the carrier CR1 is fixed to the case 3. Further, the rotation of the input shaft 2 is input to the sun gear S1, and the ring gear R1 rotates at a reduced speed because this carrier CR1 is fixed. In other words, by engaging the brake B3, the reduced speed rotation of the ring gear R1 is input to the sun gear S3 via the transmitting member 230.

Figure 38:
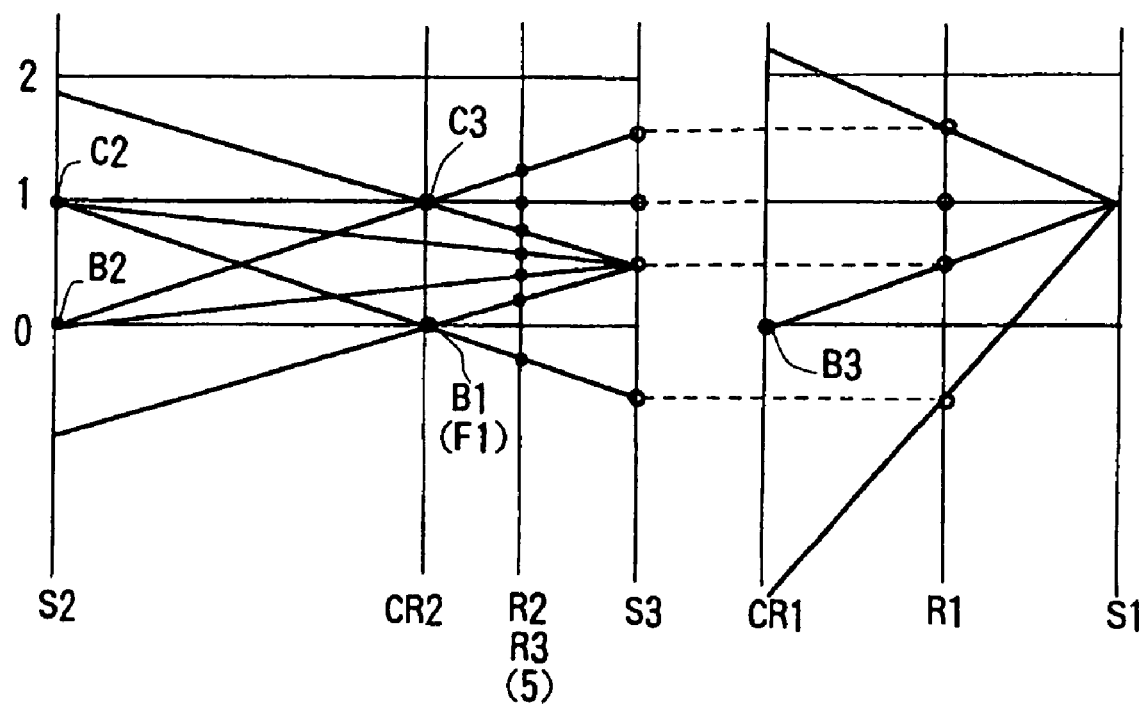
FIG. 38 is a speed line diagram for the automatic transmission of the twentieth embodiment.

In this manner, as FIG. 37 and FIG. 38 illustrate, in the second planetary gear unit PR, in first speed forward, second speed forward, third speed forward, and fourth speed forward, the rotation of the input shaft 2 is input to the sun gear S1 by engaging the brake B3, the carrier CR1 is fixed, the reduced speed rotation is output to the ring gear R3 by the rotation of the sun gear S1, and the reduced speed rotation is input to the sun gear S3 via the transmitting member 230. In this case, the ring gear R1 and the sun gear S3 are rotating at reduced speed, and therefore the transmitting member 230 transmits a relatively large torque. On the other hand, in fifth speed forward, forward speed level, and first speed reverse, the rotation of the sun gear S3 is input to the ring gear R1 via the transmitting member 230, and further, because the brake B3 is released, as FIG. 38 illustrates, the carrier CR1 rotates with the speed of ring gear R1 and the sun gear S1.

The operations of the second planetary gear unit are similar to those of the eighteenth embodiment, and accordingly description thereof will be omitted.

As described above, in the automatic transmission $1_{20}$ of the twentieth embodiment, due to the second planetary gear unit PR and the clutch C3 being located on one side of the first planetary gear unit PU, and the clutch C2 being located on the axially opposite side of the first planetary gear unit PU, the planetary gear units PR and PU can be located more closely together, as compared to an embodiment wherein, for example, two clutches C2 and C3 are located between the planetary gear units PR and PU, and the transmitting member 230 for transmitting reduced speed rotation can be made relatively shorter. In this manner, the automatic transmission can be made more compact and more lightweight. Further, because the inertia (inertial force) can be reduced, the controllability of the automatic transmission can be increased, and the occurrence of speed change shock can be reduced.

Further, since the hydraulic servos 11 and 12 are mounted on the input shaft 2, one set of seal rings 81 and 82 serves to supply oil from the oil lines 2a and 2b provided within input shaft 2 to the oil chambers of hydraulic servos 12, 13 without providing seal rings between, for example, the input shaft 2 and the hydraulic servos 12, 13. Therefore, oil can be supplied simply by providing one set of seal rings 81 and 82 for each of the hydraulic servos 12, 13, sliding resistance from the seal rings can be minimized, and therefore the efficiency of the automatic transmission can be improved.

Further, when the clutch C2 is engaged in first speed reverse, the hub unit 224 that connects this clutch C2 and the sun gear S2 rotates at the same speed as the input shaft 2. Accordingly, by engaging clutch C2, while the transmitting member 230 is rotating in the opposite direction, will cause the speeds of the transmitting member 230 and the hub unit 224 to become greatly different, but because clutch C2 is located on the side of the first planetary gear unit PU opposite the second planetary gear unit PR, the transmitting member 230 and the hub 224 can be spaced apart from one another. Compared to the case wherein, for example, those components come into contact in a multiple axis construction, the decrease in efficiency of the automatic transmission caused by the friction produced by the relative rotation between those components can be avoided.

Further, since the output of the reduced speed rotation to the first planetary gear unit PU from the second planetary gear unit PR is controlled by engagement of the brake B3, the number of components (for example drum-shaped members and so forth) can be reduced as compared to an embodiment wherein, for example, a clutch C1 is employed. Further, the brake B3 can receive a supply of oil directly from the case 3, and therefore the configuration of the oil line can be simplified as compared to the case wherein, for example, a clutch C1 is employed.

Further, the automatic transmission $1_{20}$ according to the twentieth embodiment is directly coupled at fifth speed forward. Therefore, in first speed forward and fourth speed forward, the gear ratio can be such as to provide greater efficiency, and particularly when the vehicle is running at a high speed, the engine can be operated more efficiently, and fuel economy of the vehicle while running at a low to medium speed is increased.

In this embodiment also, the transmitting member which links the planetary gear units PR and PU requires rigidity to withstand the reduced speed torque that is input. For example, in the case of a clutch that engages at a slow to medium speed and a clutch that engages to transmit reduced speed rotation and that is located on the inner side of the transmitting member, the clutch must have a large capacity and, therefore, a large diameter to provide the necessary capacity. Therefore, in the event that the transmitting member passes on the radially outer side of such a clutch, even a larger diameter of the clutch becomes necessary, the diameter of the transmitting member is enlarged more than necessary, and the automatic transmission as a whole has a greater diameter. Therefore an object of the present embodiment is to avoid enlargement of the diameter, and to provide a compact automatic transmission.

According to this twentieth embodiment, all clutches can be configured without enlarging the diameter of the transmitting member, because a clutch C3 with a small capacity is provided on the inner side of the transmitting member 230.

Twenty-first Embodiment

A twenty-first embodiment is a partial modification of the eighteenth embodiment and will now be described with reference to FIG. 39. Components of the twenty-first embodiment which are the same as those of the eighteenth embodiment are denoted by the same reference numerals, and description thereof will be omitted here, except for modified components.

Figure 39:
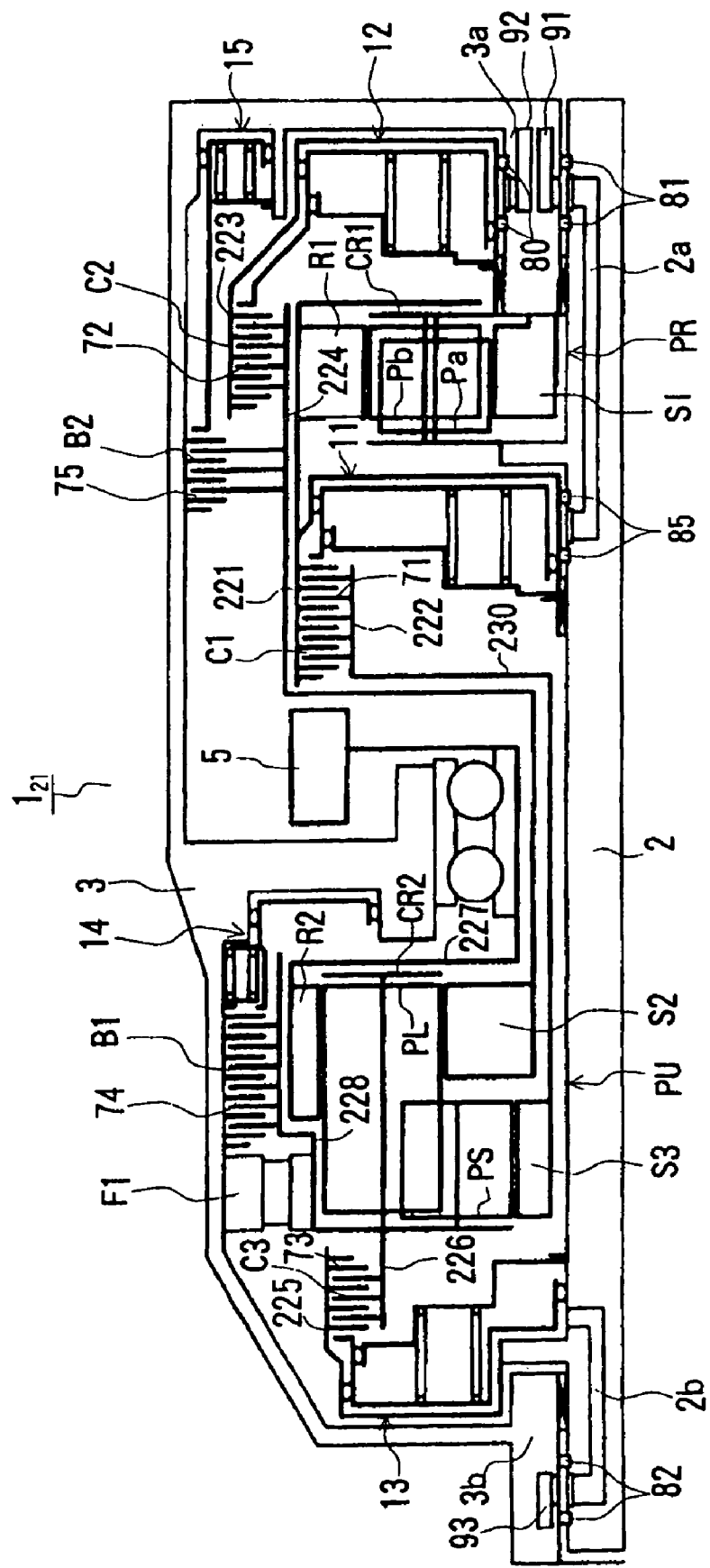
FIG. 39 is a schematic cross-sectional view of an automatic transmission according to a twenty-first embodiment.

As FIG. 39 illustrates, the automatic transmission $1_{21}$ of the twenty-first embodiment differs from the eighteenth embodiment in the configuration of the clutch C1 and that of the second planetary gear unit PR. More specifically, in the diagram, the second planetary gear unit PR and the clutch C1 are on the right side of the planetary gear unit PU, and the counter gear 5 is located between the planetary gear units PR and PU.

Within the automatic transmission $1_{21}$ is a multi-disc clutch C1 comprising a hydraulic servo 11, friction plates 71, a clutch drum 221, a hub unit 222 connected to a sun gear S3, and radially outward of the clutch C1 is a multi-disc clutch C2 comprising a hydraulic servo 12, friction plates 72, a clutch drum 223, and a hub unit 224. Further, radially outward of the hub 224 is a multi-disc brake B2 comprising a hydraulic servo 15 and friction plates 75.

The input shaft 2 is rotatably supported by the clutch drum 221, and a front edge portion of the inner circumferential surface of this drum 221 is splined to the friction plates 71 of the clutch C1, which friction plates 71 are intermeshed with the friction plates splined to the hub unit 222.

Further, the sun gear S1 is fixed to and supported by the boss 3a, and the carrier CR1 is connected to the input shaft 2 via a side plate. The ring gear 1 is rotatably supported by the boss 3a, and also is connected to the clutch drum 221. Further, the hub unit 222 is connected to the sun gear S3 by transmitting member 230.

Now, the oil chamber of the hydraulic servo 11 is connected to the oil line 2a which is formed on the input shaft 2 and is connected to the oil line 91 in the boss 3a which, in turn, is connected to the oil pressure control device. This hydraulic servo 11 comprises one set of seal rings 81 between the boss 3b of the case 3 and the input shaft 2, and one set of seal rings 85 between the input shaft 2 and the clutch drum 221. Thus, two sets of seal rings connect oil supply from the oil pressure control device to the oil chamber of the hydraulic servo 11.

At the other end of the input shaft 2 (left side in diagram) is a multi-disc clutch C that comprises a hydraulic servo 13, friction plates 73, a clutch drum 225, and a hub unit 226. The friction plates 73 are splined to a front edge portion of the inner surface of the clutch drum 225 of this clutch C3, and friction plates 73 are intermeshed with friction plates splined to the front edge of the outer circumferential surface of the hub unit 226, and this hub unit 226 is connected to the side plate of the carrier CR2.

The oil chamber of this hydraulic servo 13 is connected to an oil line 2b which is formed on the above-mentioned input shaft 2, and this oil line 2b is connected to the oil line 93 of the boss 3b, which boss 3b forms a sleeve around one end of the input shaft 2. Therefore, an oil line from the oil pressure control unit, not illustrated, to the oil chamber of the hydraulic servo 13 is constructed simply by providing one set of seal rings 82 between the boss 3a of the case 3 and the clutch drum 225.

On the radially outer side of the planetary gear unit PU is a multi-disc brake B1 comprising a hydraulic servo 14, friction plates 74, and a hub unit 228. The side plate of the carrier CR2 of the first planetary gear unit PU is connected to the hub unit 228 that is splined to friction plates intermeshed with the friction plates 74 of the brake B1, and further, the hub unit 228 is connected to the inner race of the one-way clutch F1. The sun gear S3 is meshed with the short pinion PS of this carrier CR2 and the long pinion PL of this carrier CR2 is meshed with the sun gear S2 and the ring gear 2. One edge of this ring gear R2 is connected to the counter gear 5 via the transmitting member 227.

The operations of the automatic transmission $1_{21}$ differ from those of the eighteenth embodiment in that, within the second planetary gear unit PR, the carrier CR1 and the sun gear S1 have switched positions. In other words, the sun gear S1 is fixed, and the rotation of the input shaft 2 is input to the carrier CR1, but the other components are the same as those of the eighteenth embodiment (see FIG. 31 and FIG. 32), and accordingly description will be omitted.

In the automatic transmission $1_{21}$ of the twenty-first embodiment, due to the second planetary gear unit PR and the clutch C2 being located on one side of the planetary gear unit PU, and the clutch C3 being located on the other axial side of the first planetary gear unit PU, the planetary gear units PR and PU can be located more closely together, as compared to an embodiment wherein, for example, two clutches C2 and C3 are located between the planetary gear units PR and PU, and the transmitting member 230 which transmits reduced speed rotation can be made relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2a, 2b, 91, 92, 93) that supply the hydraulic servos 11, 12, and 13 of these clutches C1, C2, C3 can be constructed easily, the manufacturing process can be simplified, and the costs can be reduced.

Further, since the counter gear 5 is located axially between the planetary gear units PU and PR, the counter gear 5 can be located in approximately the axial center of the automatic transmission. For example, when the automatic transmission is mounted on the vehicle, need for enlargement in one direction (particularly in the rear direction when the side the drive source is the "front") can be avoided because the counter gear 5 is mounted adjacent the drive wheel transmission device. Because of this, particularly in the case of a FF vehicle, interference with the front wheels is reduced, and the mountability on a vehicle can be improved such that the steering angle can be greatly increased, for example.

Further, the automatic transmission $1_{21}$ is directly coupled in fifth speed forward. Therefore, in first speed forward and fourth speed forward, the gear ratio can be specified for better efficiency, and particularly when the vehicle is running at a high speed, the engine can be operated more efficiently, and fuel economy is increased while running at a low to medium speed.

Twenty-Second Embodiment

Figure 40:
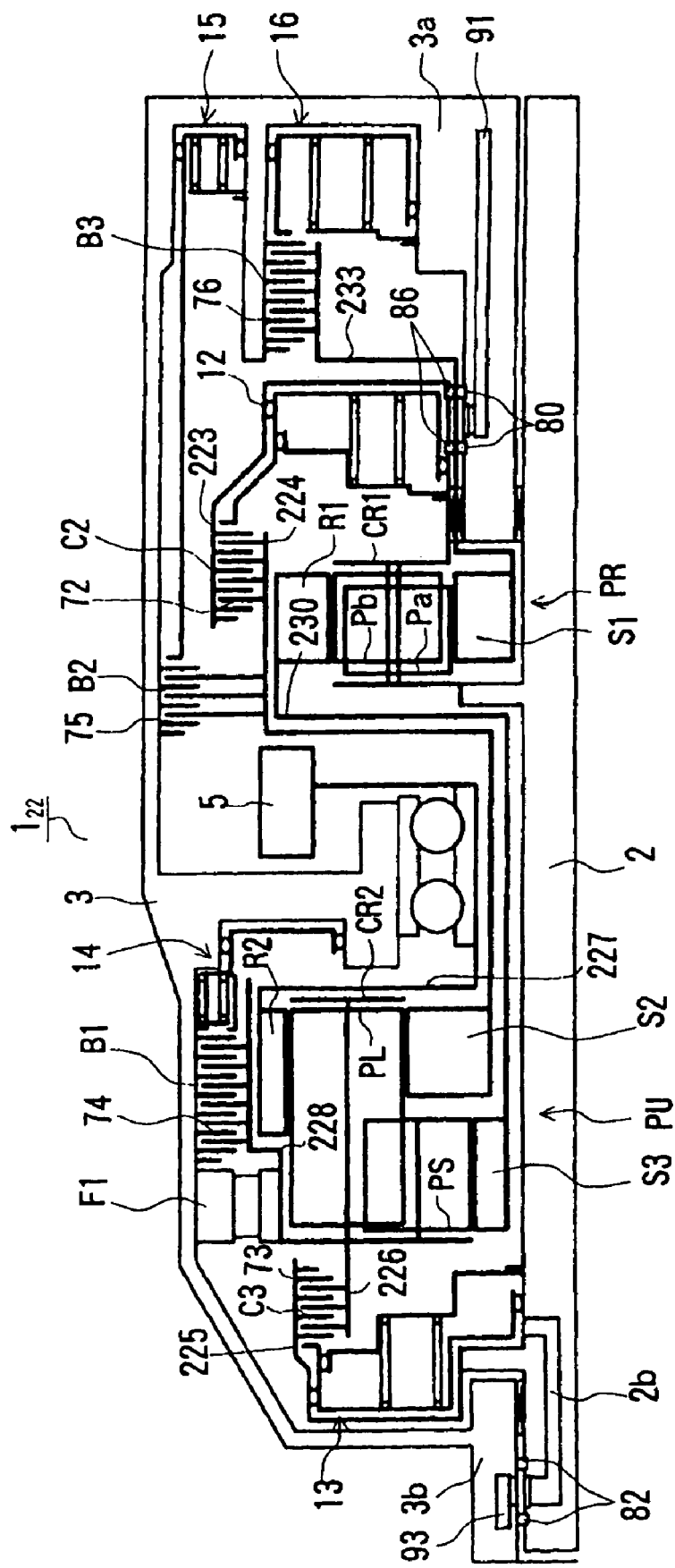
FIG. 40 is a schematic cross-sectional view of an automatic transmission according to a twenty-second embodiment.

A twenty-second embodiment, which is a partial modification of the twenty-first embodiment, will now be described with reference to FIG. 40. FIG. 40 is a schematic cross-sectional diagram illustrating the automatic transmission of the twenty-second embodiment. Components of the twenty-second embodiment which are the same as those of the twenty-first embodiment are denoted by the same reference numerals, and description thereof omitted, except for modified components.

As FIG. 40 illustrates, the automatic transmission $1_{22}$ of the twenty-second embodiment differs from that of the twenty-first embodiment in the configuration of the second planetary gear unit PR and the clutch C2, and further differs in that brake B3 is utilized instead of clutch C1, which enables the carrier CR1 of the second planetary gear unit PR to be fixed by the brake B3.

Within this automatic transmission $1_{22}$, the brake B3 is located on the side (the right side of the diagram) of the second planetary gear unit PR opposite the planetary gear unit PU. This brake B3 comprises a hydraulic servo 16, friction plates 76, and a hub unit 233. Hub unit 233 is connected to the sun gear S1 and is rotatably supported by the boss 3a. Further, the clutch C2 comprises a hydraulic servo 12, friction plates 72, a drum member 223, and a hub unit 224 and is located on the outer side of the hub unit 233 of brake B3. The drum 223 of this clutch C2 is connected to one side plate of the carrier CR1, and the other side plate of carrier CR1 is connected to the input shaft 2. Also, the ring gear R1 is connected to the sun gear S3 via transmitting member 230.

The oil chamber of the hydraulic servo 12 is linked to the oil line 91 of the boss 3a provided on the input shaft 2 in a sleeve form, via an oil hole (not illustrated) formed in the hub unit 233, and this oil line 91 is linked to the oil pressure control device. This hydraulic servo 11 comprises one set of seal rings 80 between the boss 3a of the case 3 and the hub unit 233, and one set of seal rings 86 between the hub unit 233 and the drum 223. In other words, two sets of seal rings construct an oil line from the oil pressure control device to the oil chamber of the hydraulic servo 12.

The automatic transmission $1_{22}$, of this twenty-second embodiment differs from that of the twentieth embodiment in that, within the second planetary gear unit PR, the carrier CR1 and the sun gear S1 have switched positions; in other words, the sun gear S1 is fixed by the brake B3, and the rotation of the input shaft 2 is input to the carrier CR1, but the other components are the same as those of the twentieth embodiment (see FIG. 37 and FIG. 38), and accordingly description thereof will be omitted.

In the automatic transmission $1_{22}$ of the twenty-second embodiment, due to the second planetary gear unit PR and the clutch C2 being located on one side of the planetary gear unit PU, and the clutch C3 being located on the axially opposite side of the first planetary gear unit PU, the planetary gear units PR and PU can be located more closely together, as compared with an embodiment wherein, for example, two clutches C2 and C3 are located between the second planetary gear units PR and PU, and the transmitting member 230 for transmitting reduced speed rotation can be made relatively shorter. By doing so, the automatic transmission can be made more compact and more lightweight. Further, because the inertia (inertial force) can be reduced, the controllability of the automatic transmission can be increased, and the occurrence of speed change shock can be reduced.

Further, since the counter gear 5 is located between the first planetary gear unit PU and the second planetary gear unit PR, the counter gear 5 can be located in approximately the axial center of the automatic transmission. For example, when the automatic transmission is mounted on the vehicle, enlargement in one direction (particularly in the rear direction when the side facing the drive source is the "front") can be prevented because the counter gear 5 is mounted adjacent the drive wheel transmission device. Because of this, particularly in the case of a FF vehicle, interference with the front wheels is reduced, mountability on a vehicle is improved, and the steering angle is greatly increased.

Further, since the reduced speed rotation output to the first planetary gear unit PU from the second planetary gear unit PR is engaged and disengaged by the brake B3, the number of components (for example drum-shaped members and so forth) can be reduced as compared to the case wherein, for example, a clutch C1 is provided. Further, the brake B3 can connect with an oil line directly from the case 3, and therefore the configuration of the oil line can be simplified as compared to the case wherein, for example, a clutch C1 is provided.

Further, the automatic transmission $1_{22}$ according to the present embodiment is directly coupled in fifth speed forward. Therefore, in first speed forward and fourth speed forward, the gear ratio can be better set for maximum efficiency, and particularly when the vehicle is running at a high speed, the engine can be operated more efficiently, and fuel economy while running at a low to medium speed can be improved.

If a clutch is located between the planetary gear units PR and PU for example, the length of the transmitting member that links the planetary gear units PR and PU becomes axially longer, and since this linking member transmits the reduced speed rotation, the thickness of the member must be increased so as to withstand the high torque, and therefore the weight also increases. Therefore, an object of the present invention is to provide an automatic transmission that can shorten the distance between the speed reduction (second) planetary gear unit PR and the first planetary gear unit PU, and avoid increase in weight.

In this twenty-second embodiment the clutch C2 is disposed on the side of the second planetary gear unit PR axially opposite the first planetary gear unit PU, and, therefore, a clutch between the planetary gear units PR and PU is not necessary, and the length of the transmitting member 230 can be made that much shorter. Therefore, increase in weight of the automatic transmission as a whole can be avoided.

Twenty-third Embodiment

A twenty-third embodiment, which is a partial modification of the eighteenth embodiment will now be described, with reference to FIG. 41. Components of the twenty-third embodiment which are the same as those of the eighteenth embodiment are denoted by the same reference numerals, and description thereof omitted, except for modified components.

Figure 41:
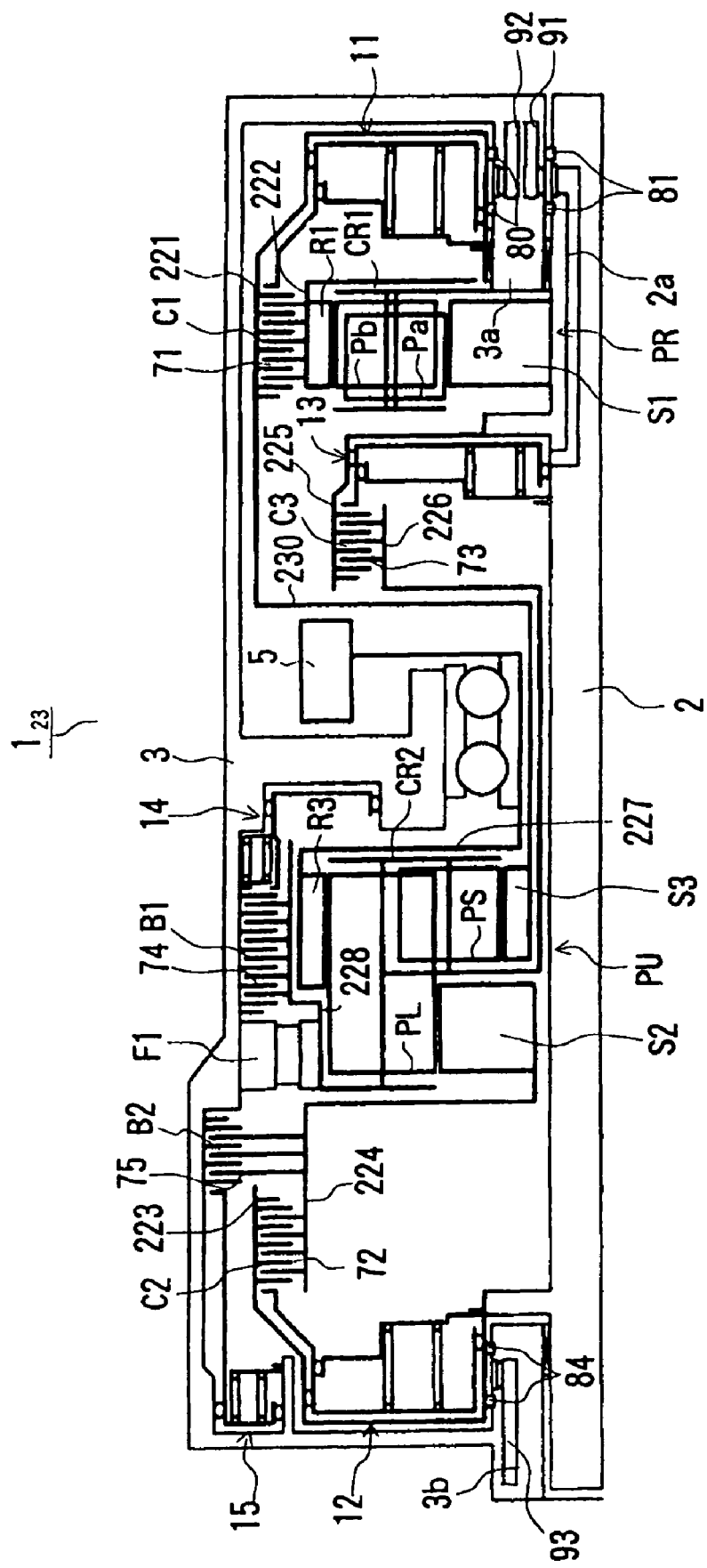
FIG. 41 is a schematic cross-sectional view of an automatic transmission according to a twenty-third embodiment.

As FIG. 41 illustrates, the automatic transmission $1_{23}$ of the twenty-third embodiment differs from the eighteenth embodiment in the configuration of the clutch C1 and the second planetary gear unit PR. More specifically, the second planetary gear unit PR and the clutch C1 are located on one side (the right side in the diagram) of the first planetary gear unit PU, and the counter gear 5 is located between the planetary gear units PR and PU. The twenty-third embodiment also differs in that the locations of the clutch C2 and the brake B2 are switched as compared to the automatic transmission $1_{18}$ of the eighteenth embodiment (see FIG. 30).

Within the automatic transmission $1_{23}$, mounted on the input shaft 2 is a multi-disc clutch C3 comprising a hydraulic servo 13, friction plates 73, a clutch drum 225, a hub unit 226 connected to sun gear S2, and, located radially outward of clutch C3, is a multi-disc clutch C1 comprising a hydraulic servo 11, friction plates 71, a clutch drum 221 and a hub unit 224.

The oil chamber of the hydraulic servo 13 is connected to the oil line 2a formed on the input shaft 2, and this oil line 2a is connected to the oil line 91 of the boss 3a, which oil line 91, in turn, is connected to the oil pressure controller not illustrated. Thus, because the hydraulic servo 13 is mounted on the input shaft 2, simply providing one set of seal rings 81 between the boss 3a and the input shaft 2 serves to connect oil supply from the oil pressure controller to the oil chamber of the hydraulic servo 13.

Further, the oil chamber of the hydraulic servo 11 is connected to the oil line 92 of the boss 3a, which oil line 92, in turn, is connected to the oil pressure controller. Thus, for the hydraulic servo 11, simply by providing one set of seal rings 80 between the boss 3a and the clutch drum 221, oil supply from the oil pressure controller is connected to the oil chamber of the hydraulic servo 11.

The input shaft 2 is connected to the clutch drum 225 of the clutch C3, and the front portion of the inner surface of this clutch drum 225 is splined with the friction plates 73. Friction plates 73 are intermeshed with friction plates splined to the hub unit 226, and hub unit 226 is connected to the sun gear S2.

The input shaft 2 rotatably supports the clutch drum 221. The inner surface of this clutch drum 221 is splined to the friction plates 71 of the clutch C1 which is operated by the hydraulic servo 11, and these friction plates 71 are intermeshed with friction plates splined to the hub unit 222 that is connected to the ring gear R1. Ring gear R1 is rotatably supported by the boss 3a via hub unit 222. The sun gear S1 is connected to the input shaft 2, and the carrier CR1 is fixed to and supported by the boss 3a via a side plate. Also, the clutch drum 221 is connected to the sun gear S3 via the transmitting member 230.

The boss 3b of the case 3 is in the form of a sleeve fitted on one end of the input shaft 2, and extending as a sleeve on the opposite end of input shaft 2 is a boss 3a, which supports a multi-disc clutch C1 comprising a hydraulic servo 12, friction plates 72, a clutch drum 223, and a hub unit 224. The oil chamber of this hydraulic servo 12 is connected to oil line 93 of the boss 3b, which oil line 93, in turn, is connected to the oil pressure controller. In other words, the above-mentioned hydraulic servo 12 is connected to the oil pressure controller by one set of seal rings 84 between the boss 3b and the clutch drum 223.

A front portion of the inner surface of the clutch drum 223 is splined to friction plates 72 which are intermeshed with friction plates splined to a front portion of the outer surface of the hub unit 224. Further, radially outward of the clutch C2 is a multi-disc brake comprising an hydraulic servo 15 and friction plates 75, and the outer circumferential surface of hub unit 224 is splined to friction plates 75 that can be engaged by operation of the hydraulic servo 15. Also, this hub unit 224 is connected to the sun gear S2.

Radially outward of the planetary gear unit PU is a multi-disc brake B1 comprising a hydraulic servo 14, friction plates 74, and a hub unit 228. The side plate of the carrier CR2 of the first planetary gear unit PU is connected to the hub unit 228 that is splined to the friction plates of the above-mentioned brake B1, and further, the hub unit 228 is connected to the inner race of the one-way clutch F1. The sun gear S3 is meshed with the short pinion PS of this carrier CR2. The long pinion PL of this carrier CR2 meshes with the sun gear S2 and the ring gear R2, and to one edge of this ring gear R2 is connected the transmitting member 227, and ring gear R2 is linked to the counter gear 5 via this transmitting member 227.

The operations of the automatic transmission $1_{23}$ of this twenty-third embodiment are similar to those of the eighteenth embodiment (see FIG. 31 and FIG. 32), and, accordingly, description thereof will not be repeated here.

In the automatic transmission $1_{23}$ of this embodiment, due to the second planetary gear unit PR and the clutch C3 being located on one side of the first planetary gear unit PU, and the clutch C2 being located on the axially opposite side of the first planetary gear unit PU, the planetary gear units PR and PU can be located more closely together, as compared to the case wherein, for example, two clutches C2 and C3 are located between the planetary gear units PR and PU, and the transmitting member 230 for transmitting reduced speed rotation can be relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the first planetary gear unit PU, the oil lines (for example, 2a, 91, 92, 93) that supply the hydraulic servos 11, 12, and 13 of these clutches C1, C2, C3 can be more easily constructed, the manufacturing process can be simplified and the costs can be reduced.

Further, since the hydraulic servo 13 is mounted on the input shaft 2, one set of seal rings 81 serves to connect the oil supply to the oil lines 2a provided within input shaft 2, and therefore oil can be supplied to the oil chamber of hydraulic servo 13 without providing seal rings between, for example, the input shaft 2 and the hydraulic servo 12. Further, the hydraulic servos 11 and 12 can receive supply of oil directly from the bosses 3a, 3b extending from the case 3, without passing through other components. Therefore, oil can be supplied simply by providing one set of seal rings 81, 80, 84 for each of the hydraulic servos 11, 12, and 13, sliding resistance from the seal rings can be minimized, and therefore the efficiency of the automatic transmission can be improved.

Further, because the clutch C3 is located radially inward of the clutch C1, the clutch C1, which must transmit a relatively large torque in order to transmit the reduced speed rotation, can be located on the outer circumference side, and its hydraulic servo 11 can have an increased diameter. Thus, the pressure-receiving area of the oil chamber of the hydraulic servo 11 can be enlarged, and the torque transmitting capacity of this clutch C1 can be increased. By configuring the clutch C3 to have a smaller torque transmitting capacity than clutch C1, the automatic transmission can be made more compact.

Because when clutch C2 is engaged in first speed reverse, the transmitting member 230 rotates in the opposite direction while the hub unit 224 that connects clutch C2 and the sun gear S2 rotates in the same direction as the input shaft 2, the transmitting member 230 and the hub unit 224 rotate at greatly different speeds, but because this clutch C2 is located on the side of the first planetary gear unit PU opposite the second planetary gear unit PR, the transmitting member 230 and the hub hunt 224 can be spaced apart from one another. Compared to the case wherein, for example, these components come into contact in a multiple axis construction, the decrease in efficiency of the automatic transmission caused by the friction produced by the relative rotation between these components can be avoided.

Further, because the counter gear 5 is located between the planetary gear units PU and PR, the counter gear 5 can be located in approximately the axial center of the automatic transmission. For example, enlargement of the automatic transmission toward the rear of the vehicle (when the input side facing the drive source is the "front") is not necessary because the counter gear 5 is mounted adjacent the drive wheel transmission device. Because of this, particularly in the case of a FF vehicle, interference with the front wheels is reduced, the mountability on a vehicle is improved, and the steering angle can be greatly increased.

Further, the automatic transmission $1_{23}$ according to the present embodiment is directly coupled in fifth speed forward. Therefore, in first speed forward and fourth speed forward, the gear ratio can be determined for greater efficiency, when the vehicle is running at a high speed the engine can be operated more efficiently, and fuel economy of the vehicle can be increased when running at a low to medium speed.

The transmitting member for linking the planetary gear units PR and PU requires rigidity to withstand the reduced speed torque that is input. For example, a clutch that engages at a slow to medium speed and a clutch that engages and disengages reduced speed rotation and that is located radially inward of the linking member must have a large capacity, and therefore must have a diameter corresponding to this required large capacity. Therefore, in the event that the transmitting member passes radially outward of such a clutch, an even larger diameter for the clutch becomes necessary, the diameter of the transmitting member must be further enlarged, and the diameter of the automatic transmission as a whole becomes greater. Therefore an object of the present embodiment is to reduce the diameter, and to provide a more compact automatic transmission.

According to the present embodiment, all clutches can be designed to avoid enlarging the diameter of the transmitting member, by designing clutch C3 to have a small capacity and to be located radially inward of the transmitting member 230.

Twenty-fourth Embodiment

The twenty-fourth embodiment is a partial modification of the twenty-third embodiment and will be described with reference to FIG. 42. Components of the twenty-fourth embodiment which are the same as those of the twenty-third embodiment are denoted by the same reference numerals, and description thereof will not be repeated here, except for modified components.

Figure 42:
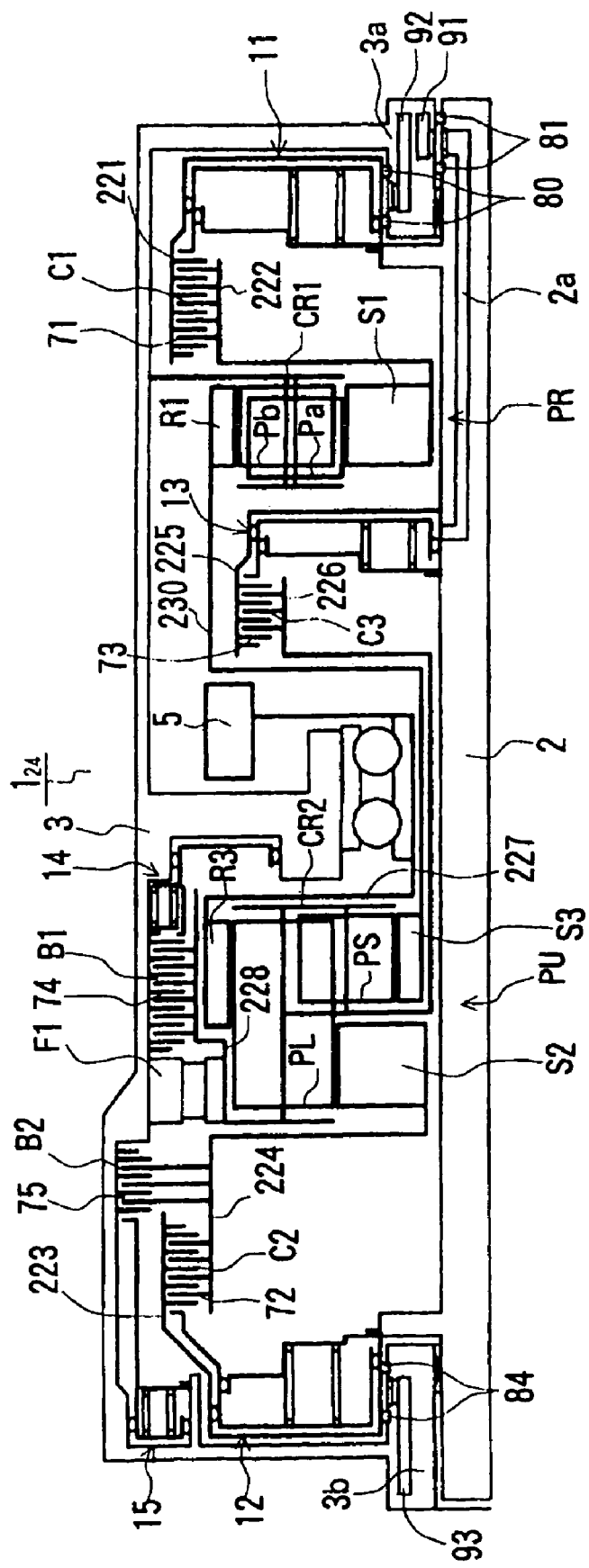
FIG. 42 is a schematic cross-sectional view of an automatic transmission according to a twenty-fourth embodiment.

As FIG. 42 illustrates, the automatic transmission $1_{24}$ of the twenty-third embodiment is modified with respect to the configuration of the clutch C1, as compared to that of the automatic transmission $1_{23}$ of the eighteenth embodiment (see FIG. 41).

Within the automatic transmission $1_{24}$, the clutch C1 is located on the side of the second planetary gear unit PR opposite (right side on the diagram) the first planetary gear unit PU. A front portion of the inner circumferential surface of the drum 221, which is connected to the input shaft 2, is splined to friction plates 71 which are intermeshed with friction plates splined to the hub unit 222. The hub unit 222 is connected to the sun gear S1 of the second planetary gear unit PR.

The side plate of the carrier CR1 of the second planetary gear unit PR is fixed to and supported by the case 3. The ring gear R1 is connected to the sun gear S3 by the transmitting member 230. The clutch C3 comprises a hydraulic servo 13, friction plates 73, a drum 225, and a hub unit 226 and is located radially inward of the transmitting member 230, that is to say, enclosed within transmitting member 230.

The operations of the automatic transmission $1_{24}$ are the same as those of the nineteenth embodiment (see FIG. 34 and FIG. 35), and, accordingly, description thereof will not be repeated here.

In the automatic transmission $1_{24}$, because the second planetary gear unit PR and the clutch C3 are located on one side of the first planetary gear unit PU, and the clutch C2 is located on the other (axially opposite) side of the first planetary gear unit PU, the planetary gear units PR and PU can be located more closely together, as compared to the case wherein, for example, two clutches C2 and C3 are located between the planetary gear units PR and PU, and the transmitting member 230 for transmitting the reduced speed rotation can be relatively shorter. By doing so, the automatic transmission can be made more compact and more lightweight. Further, because the inertia (inertial force) can be reduced, the controllability of the automatic transmission can be increased, and the occurrence of speed change shock can be reduced. Further, compared to the case wherein three clutches C1, C2, C3 are located on one side of the planetary gear unit PU, the oil lines (for example, 2a, 91, 92, 93) that supply the hydraulic servos 11, 12, and 13 of these clutches C1, C2, C3 can be more easily constructed, the manufacturing process can be simplified and the costs can be reduced.

Further, because the hydraulic servo 13 is mounted on the input shaft 2, one set of seal rings 81 seal the case 3 with the oil lines 2a provided within input shaft 2 to supply oil to the oil chamber of hydraulic servo 13 without providing seal rings between, for example, the input shaft 2 and the hydraulic servo 13. Further, the hydraulic servos 11 and 12 can receive supply of oil directly from the bosses 3a, 3b extending from the case 3, without passing through other components, and therefore the oil supply can be connected by providing one set of seal rings 80, 84. Therefore, oil can be supplied simply by providing one set of seal rings 81, 80, 84 for each of the hydraulic servos 11, 12, and 13, sliding resistance from the seal rings can be minimized, and therefore the efficiency of the automatic transmission can be improved.

Further, when the clutch C2 is engaged in first speed reverse, the transmitting member 230 rotates in the opposite direction while the hub unit 224 that connects this clutch C2 and the sun gear S2 rotates in the same direction as the input shaft 2. Accordingly, the transmitting member 230 and the hub unit 224 rotate at greatly different speeds. However, because this clutch C2 is located on the side of the first planetary gear unit PU opposite the second planetary gear unit PR, the transmitting member 230 and the hub unit 224 can be spaced apart from one another. Compared to the case wherein, for example, those components come into contact in a multiple axis construction, a decrease in efficiency of the automatic transmission caused by the friction produced by the relative rotation between those components can be avoided.

Further, because the counter gear 5 is located axially between the planetary gear units PU and PR, the counter gear 5 can be located in approximately the axial center of the automatic transmission. For example, when the automatic transmission is mounted on a vehicle, enlargement towards the rear (when the input side facing the drive source is the "front") is not necessary because the counter gear 5 is mounted to mate with the drive wheel transmission device. Because of this, particularly in the case of a FF vehicle, interference with the front wheels is reduced, the mountability on a vehicle is improved, and the steering angle can be greatly increased.

If the clutch C1 were to be placed between the ring gear RI and the sun gear S3 for example, it would be required to engage and disengage low speed and high torque rotation, and to be relatively large, but by placing the clutch C1 between the input shaft 2 and the sun gear S1, the engaging and disengaging of the rotation of the input shaft 2 by clutch C1 indirectly engages and disengages reduced speed rotation output from the ring gear R1 of the second planetary gear unit PR, the clutch C1 can be made more compact, and therefore the automatic transmission can be made more compact.

Further, the automatic transmission $1_{24}$ according to the present embodiment is directly coupled in fifth speed forward. Therefore, in first speed forward and fourth speed forward, the gear ratio can be more precisely set to improve efficiency and when the vehicle is running at a high speed, the engine can be operated more efficiently, and better fuel economy is achieved while running at a low to medium speed.

In this embodiment also, the transmitting member linking the planetary gear units PR and PU requires rigidity to withstand the reduced speed torque that is input. For example, a clutch that engages at a slow to medium speed and a clutch that engages and disengages reduced speed rotation and that is located on the radially inner side of the transmitting member must have a large capacity and, therefore, a diameter appropriate for such a large capacity becomes necessary. Therefore, in the event that the transmitting member passes on the radially outer side of this type of clutch, an even larger diameter for the clutch becomes necessary, the diameter of the transmitting member is enlarged more than necessary, and the diameter of the automatic transmission as a whole is increased. Therefore, an object of the present embodiment is to reduce the diameter and to provide a more compact automatic transmission.

According to the present embodiment, all clutches can be configured to avoid enlarging the diameter of the transmitting member, by locating a clutch C3 with a small capacity on the radially inner side of the transmitting member 230.

Twenty-fifth Embodiment

A twenty-fifth embodiment, which is a partial modification of the twenty-third embodiment will now be described with reference to FIG. 43. Components of the twenty-fifth embodiment which are the same as those of the twenty-third embodiment are denoted by the same reference numerals, and description thereof will not be repeated here.

Figure 43:
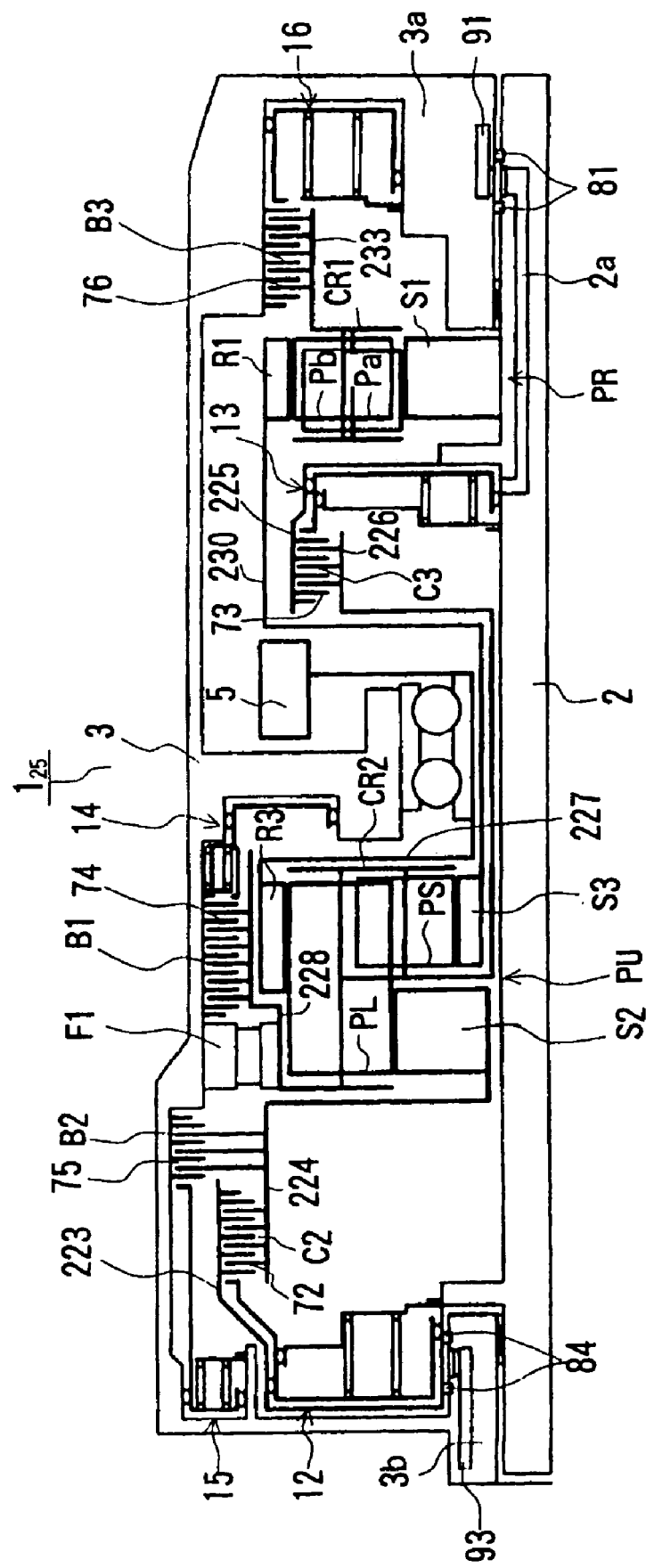
FIG. 43 is a schematic cross-sectional view of an automatic transmission according to a twenty-fifth embodiment.

As FIG. 43 illustrates, the automatic transmission $1_{25}$ of the twenty-third embodiment utilizes a brake B3 instead of the clutch C3, and has the carrier CR1 of the second planetary gear unit PR capable of being fixed by the brake B3, in which respect it differs from the automatic transmission $1_{23}$ of the twenty-third embodiment (see FIG. 41).

In this automatic transmission $1_{25}$, the brake B3 is located on the side (the right side of the diagram) of the second planetary gear unit PR opposite the planetary gear unit PU. This brake B3 comprises a hydraulic servo 16, friction plates 76, and a hub unit 233. The hub unit 233 of this brake B3 is connected to the carrier CR1, and this carrier CR1 is rotatably supported by the input shaft 2. Further, the sun gear S1 is connected to the input shaft 2. Also, the ring gear R1 is connected to the sun gear S3, via transmitting member 230. The clutch C3, which comprises a hydraulic servo 13, friction plates 73, a drum 225, and a hub unit 226, is located on the radially inner side of the transmitting member 230, that is to say, is enclosed within transmitting member 230.

The operations of the automatic transmission $1_{25}$ are the same as those of the twentieth embodiment (see FIG. 37 and FIG. 38), and accordingly description thereof will not be repeated here.

In the automatic transmission $1_{25}$ of this twenty-fifth embodiment, since the second planetary gear unit PR and the clutch C3 are located on one axial side of the first planetary gear unit PU, and the clutch C2 is located on the other axial side of the first planetary gear unit PU, the planetary gear units PR and PU can be located more closely together, as compared to the case wherein, for example, two clutches C2 and C3 are located between the planetary gear units PR and PU, and the transmitting member 230 for transmitting the reduced speed rotation can be relatively shorter. In this manner, the automatic transmission can be made more compact and more lightweight. Further, because the inertia (inertial force) can be reduced, the controllability of the automatic transmission can be increased, and the occurrence of speed change shock can be reduced.

Further, since the hydraulic servo 13 is mounted on the input shaft 2, one set of seal rings 81 serves to seal the case 3 to the oil lines 2a provided within input shaft 2, and therefore oil can be supplied to the oil chamber of hydraulic servo 13 without providing seal rings between, for example, the input shaft 2 and the hydraulic servo 12. Further, the hydraulic servo 12 can receive supply of oil from the boss 3b extending from the case 3, without passing through other components and supply of oil is secured by providing one set of seal rings 84. Therefore, oil can be supplied simply by providing one set of seal rings 81, 84 for each of the hydraulic servos 12, 13, sliding resistance from the seal rings can be minimized, and therefore the efficiency of the automatic transmission can be improved.

Further, when clutch C2 is engaged in first speed reverse, the transmitting member 230 rotates in the opposite direction while the hub unit 224 that connects this clutch C2 and the sun gear S2 rotates in the same direction as the input shaft 2, and the difference in speeds between the transmitting member 230 and the hub unit 224 will be great; however because this clutch C2 is located on the side of the first planetary gear unit PU opposite the second planetary gear unit PR, the transmitting member 230 and the hub hunt 224 can be spaced apart from one another. Compared to the case wherein, for example, these components come in contact in to a multiple axis construction, the decrease in efficiency of the automatic transmission caused by the friction produced by the relative rotation between those components can be avoided.

Further, since the counter gear 5 is located axially intermediate the planetary gear units PU and PR, the counter gear 5 can be located in approximately the axial center of the automatic transmission. Again in this embodiment, there is no need for enlargement towards the rear (when the input side facing the drive source is the "front") because the counter gear 5 is mounted to mate with the drive wheel transmission device. Thus, particularly in the case of a FF vehicle, interference with the front wheels is reduced, mountability on a vehicle is improved, and the steering angle can be greatly increased.

Further, since the reduced speed rotation output to the first planetary gear unit PU from the second planetary gear unit PR is engaged and disengaged by the brake B3, the number of components (for example drum-shaped members and so forth) can be reduced as compared to the case wherein, for example, a clutch C1 is provided. Further, the brake B3 can be directly connected with an oil line in the case 3, and therefore the configuration of the oil line can be simplified as compared to the case wherein, for example, a clutch C1 is used.

Further, the automatic transmission $1_{25}$ according to the twenty-fifth embodiment is directly coupled in fifth speed forward. Therefore, in first speed forward and fourth speed forward, the gear ratio can be better set for efficiency, and particularly when the vehicle is running at a high speed, the engine can be operated more efficiently, and fuel economy can be increased in running at a low to medium speed.

In this embodiment also, the transmitting member linking the planetary gear units PR and PU requires rigidity to withstand the reduced speed torque that is input. Further, in the case of a clutch that engages at a slow to medium speed and a clutch that engages and disengages reduced speed rotation and that is located on the radially inner side of the transmitting member, the clutch must have a large capacity and therefore a large diameter to provide the required torque transmitting capacity. Therefore, in the event that the transmitting member is the type that passes on the radially outward side of this type of clutch, an even larger diameter becomes necessary, the diameter of the transmitting member must be further enlarged, and the automatic transmission as a whole must have a greater diameter. Therefore, an object of the present embodiment is to avoid enlargement of the diameter, and to provide a more compact automatic transmission.

In this twenty-fifth embodiment, all clutches can be accommodated without enlarging the diameter of the linking member, because clutch C3 with a small capacity is located radially inward of the transmitting member 230.

While the above first through twenty-fifth embodiments of the present invention were described as being applicable to an automatic transmission having a torque converter, the invention is not so limited, and any motion-starting device may be used that would transmit the torque (rotation) at start of movement. Further, while the foregoing embodiments have been described as mounted on a vehicle having an engine as a drive source, the invention is not so limited, and any drive source may be used as a matter of course, and the present invention may be applied to a hybrid vehicle. Further, the above-described automatic transmission is favorable for use in a FF vehicle, but is not so limited to this, and can be used in a FR vehicle, a four-wheel drive vehicle, or vehicles with other types of drive systems.

Further, the above first through twenty-fifth embodiments have been described as having a double pinion planetary gear unit as the second planetary gear unit PR, i.e. as a reduced speed rotation output means, but again the invention is not so limited, and a single pinion planetary gear unit may also be used.

Further, the above first through twentieth embodiments and the twenty-third through twenty-fifth embodiments have been described as having input of the rotation of the input shaft 2 into the sun gear S1 of second planetary gear unit PR, with fixing the rotation of the carrier CR1, whereby the ring gear R1 rotates at a reduced speed. However, the rotation of the sun gear S1 may be fixed, with the rotation of the input shaft 2 input to the carrier CR such that the ring gear R1 rotates at a reduced speed.

Further, the first embodiment and the second embodiment have been described with the input side and the output side of the automatic transmission interchanged. Likewise, the input side and the output side may be interchanged for the automatic transmission according to the other embodiments.

As described above, the automatic transmission according to the present invention is used to advantage on vehicles such as automobiles, trucks, busses, and so forth, and is particularly suitable for use with vehicles which require reduction in size and reduction in weight and further require reduction in shock upon changing speeds.

The invention claimed is:

1. An automatic transmission comprising:
an input shaft rotatably driven by a drive source;
a first planetary gear unit comprised of first, second, third, and fourth rotary components;
reduced speed rotation output means for outputting rotation at a reduced speed to said first rotary component;
a first clutch that connects and disconnects said input shaft and said second rotary component;
a second clutch that connects and disconnects said input shaft and said third rotary component;
an output member that outputs the rotation of said fourth rotary component to a drive wheel transmission mechanism;
wherein said reduced speed rotation output means and said first clutch are located on one axial side of said first planetary gear unit; and
wherein said second clutch is located on a second axial side of said first planetary gear unit, opposite said first axial side.

2. An automatic transmission according to claim 1, further comprising a transmitting member linking said reduced speed rotation output means to said first planetary gear unit; and
wherein said first clutch is located radially inward of said transmitting member.

3. An automatic transmission according to claim 2 wherein said reduced speed rotation output means is a speed reducing second planetary gear unit comprising an input rotary element for receiving input of rotation of said input shaft, a reduced speed rotary element that rotates at a speed reduced from the speed of rotation of the input rotary element, a fixed element, and a third clutch for controlling the connection, through said transmitting member, between said reduced speed rotary element and said first rotary component;
wherein said reduced speed rotation is transmitted to said first rotary component by engagement of said third clutch.

4. An automatic transmission according to claim 3 wherein said fixed element is a fixed carrier having pinions meshed with said input rotary element and said reduced speed rotary element.

5. An automatic transmission according to claim 1 wherein said reduced speed rotation output means is a speed reducing second planetary gear unit comprising an input rotary component for receiving input of rotation of said input shaft, a reduced speed rotary component that rotates at a speed reduced from the speed of rotation of the input rotary component, a fixed component, and a third clutch for controlling the connection, through said transmitting member, between said reduced speed rotary component and said first rotary component;
wherein said reduced speed rotation is transmitted to said first rotary component by engagement of said third clutch.

6. An automatic transmission according to claim 5, wherein said first clutch is located radially inward of said third clutch.

7. An automatic transmission according to claim 6, wherein:

said third clutch comprises friction members and a drum unit and a hub unit that are linked upon engagement of said friction members, wherein:

said hub unit is linked to said reduced speed rotary component;

said drum unit forms a hydraulic servo with a piston sealed in an oil-tight manner, and is linked to said first rotary component; and said first clutch is located radially inward of said drum unit.

8. An automatic transmission according to claim 7, wherein:

friction members of said third clutch are located radially outward of said second planetary gear unit;

and wherein a hydraulic servo of said third clutch is disposed adjoining said second planetary gear unit on said one axial side of said first planetary gear unit.

9. An automatic transmission according to claim 8, wherein a hydraulic servo of a first brake, for holding against rotation said first rotary component of said first planetary gear unit to which reduced speed rotation is input, is located radially outward of the hydraulic servo of said third clutch.

10. An automatic transmission according to claim 5 wherein:

an engagement element of said second planetary gear unit is fixed to a first boss extending from one wall of a case;

a hydraulic servo of said third clutch is mounted on said first boss unit;

a hydraulic servo of said second clutch is mounted on a second boss that extends from another wall of said case;

said first clutch is located adjoining said first planetary gear unit and comprises friction members, a hydraulic servo, a drum unit, and a hub unit integral with said hydraulic servo; and said drum unit is linked to said input shaft.

11. An automatic transmission according to claim 10, further comprising:

a transmitting member linking said first and second planetary gear units; and wherein said third clutch is disposed radially inward of said transmitting member.

12. An automatic transmission according to claim 11, wherein said first clutch and said third clutch are located axially adjacent and radially inward of said transmitting member.

13. An automatic transmission according to claim 12, wherein:

said third clutch comprises friction members, a drum unit, and a hydraulic servo;

wherein said hydraulic servo is located on the side of said friction members axially opposite said second planetary gear unit; and said drum unit serves as a cylinder of said hydraulic servo and is linked to said input shaft.

14. An automatic transmission according to claim 13, wherein the hydraulic servo of said third clutch is located adjoining the hydraulic servo of said first clutch, between the hydraulic servo of said first clutch and the friction members of said third clutch.

15. An automatic transmission according to claim 5 wherein said fixed element is a fixed carrier having pinions meshed with said input rotary element and said reduced speed rotary element.

16. An automatic transmission according to claim 1, wherein said reduced speed rotation output means is a speed reducing second planetary gear unit comprising an input rotary element for receiving input of rotation of said input shaft, a reduced speed rotary element that is linked to said first rotary component at all times and rotates at said reduced speed, a fixable element, a third clutch for selectively connecting said input shaft and said input rotary component, and a third brake for fixing said fixable element;

wherein said reduced rotation is transmitted to said first rotary component by engagement of said third clutch and said third brake.

17. An automatic transmission according to claim 16, further comprising:

a transmitting member linking said reduced speed rotation output means and said first planetary gear unit; and wherein said third brake is located on the side of said second planetary gear unit axially opposite said first planetary gear unit.

18. An automatic transmission according to claim 17, wherein said third brake comprises a hydraulic servo including a cylinder formed in a case housing said automatic transmission.

19. An automatic transmission according to claim 17 wherein:

said third clutch comprises friction members, a drum unit, and a hydraulic servo;

said hydraulic servo is located on the side of said friction members axially opposite said second planetary gear unit; and;

said drum unit serves as a cylinder of said hydraulic servo and is linked to said input shaft.

20. An automatic transmission according to claim 16 wherein said fixable element is a carrier having pinions meshed with said input rotary element and said reduced speed rotary element.

21. An automatic transmission according to claim 1, wherein said reduced speed rotation output means is a second planetary gear unit comprising an input rotary element for receiving input of rotation of said input shaft, a reduced speed rotary element that rotates at a speed reduced from the speed of rotation of the input rotary element and is connected to said first rotary component at all times, a fixable rotary element, and a third brake for fixing said fixable rotary element against rotation;

wherein said reduced speed rotation is transmitted to said first rotary component by engagement of said third brake.

22. An automatic transmission according to claim 21, wherein said third brake is located on the side of said second planetary gear unit axially opposite said first planetary gear unit;

and wherein the hydraulic servo of said third brake comprises a hydraulic servo including a cylinder formed in a case housing said automatic transmission.

23. An automatic transmission according to claim 21 wherein said fixable element is a carrier having pinions meshed with said input rotary element and said reduced speed rotary element.

24. An automatic transmission according to claim 1 providing six forward speeds and one reverse speed, and wherein in fourth forward speed said first clutch and said second clutch are engaged.

25. An automatic transmission according to claim 24, wherein said first planetary gear unit is a multiple type planetary gear unit, comprising a first sun gear, a long pinion which meshes with said first sun gear, a short pinion which meshes with said long pinion, a carrier rotatably supporting said long pinion and said short pinion, a second sun gear meshing with said short pinion, and a ring gear meshing with said long pinion;

wherein said first rotary component is said first sun gear which is fixed by engagement of said first brake;

wherein said second rotary component is said second sun gear to which rotation of said input shaft is input by engagement of said first clutch;

wherein said third rotary component is said carrier which receives input of rotation of said input shaft by engagement of said second clutch, and which is fixed by engagement of said second brake; and and wherein said fourth rotary component is said ring gear linked to said output member.

26. An automatic transmission according to claim 25, wherein, in first speed forward, said first clutch and said second brake are engaged;

wherein, in second speed forward, said first clutch and said first brake are engaged;

wherein, in third speed forward, reduced speed rotation is input to said first rotary component from said reduced rotation output means, and said first clutch is engaged;

wherein, in fourth speed forward, said first clutch and said second clutch are engaged;

wherein, in fifth speed forward, reduced speed rotation is input to said first rotary component from said reduced rotation output means, and said second clutch is engaged;

wherein, in sixth speed forward, said second clutch and said first brake are engaged;

wherein, in first speed reverse, reduced speed rotation is input to said first rotary component from said reduced rotation output means, and said second brake is engaged; and wherein said automatic transmission provides six forward speeds and one reverse speed.

27. An automatic transmission according to claim 24, comprising a pair of said first planetary gear units each comprising a first sun gear, a second sun gear linked to said first sun gear, a first carrier meshing with said first sun gear, a second carrier meshing with said second sun gear, a first ring gear linked to said second carrier, and a second ring gear meshing with said second carrier;

wherein said first rotary component is said second ring gear and is fixed by engagement of said first brake;

wherein said second rotary component is said first sun gear which receives input of rotation of said input shaft by engagement of said first clutch;

wherein said third rotary component is said second carrier and said first ring gear which receive input of rotation of said input shaft by engagement of said second clutch, and which are fixed by the engagement of said second brake; and wherein said fourth rotary component is a first carrier linked to said output member.

28. An automatic transmission according to claim 27, wherein, in first speed forward, said first clutch and said second brake are engaged;

wherein, in second speed forward, said first clutch and said first brake are engaged;

wherein, in third speed forward, reduced speed rotation is input to said first rotary component from said reduced rotation output means, and said first clutch is engaged;

wherein, in fourth speed forward, said first clutch and said second clutch are engaged;

wherein, in fifth speed forward, reduced speed rotation is input to said first rotary component from said reduced rotation output means, and said second clutch is engaged;

wherein, in sixth speed forward, said second clutch and said first brake are engaged;

wherein, in first speed reverse, reduced speed rotation is input to said first rotary component from said reduced rotation output means, and said second brake is engaged; and wherein said automatic transmission provides six forward speeds and one reverse speed.

29. An automatic transmission according to claim 1 providing six forward speeds and one reverse speed, and wherein in fifth forward speed said first clutch and said second clutch are engaged.

30. An automatic transmission according to claim 29, wherein said first planetary gear unit is a multiple type planetary gear unit comprising a first sun gear, a long pinion which meshes with said first sun gear, a short pinion which meshes with said long pinion, a carrier rotatably supporting said long pinion and said short pinion, a second sun gear meshing with said short pinion, and a ring gear meshing with said long pinion;

wherein said first rotary component is said second sun gear and is capable of receiving input of the reduced speed rotation of said reduced speed rotation output means;

wherein said second rotary component is said carrier which receives input of rotation of said input shaft by engagement of said first clutch, and which is fixed by engagement of said first brake;

wherein said third rotary component is said first sun gear which receives input of rotation of said input shaft by engagement of said second clutch, and which is fixed by engagement of said second brake; and wherein said fourth rotary component is said ring gear linked to said output member.

31. An automatic transmission according to claim 30, wherein:

in first speed forward, reduced speed rotation is input to said first rotary component from said reduced speed rotation output means, and said first brake is engaged;

in second speed forward, reduced speed rotation is input to said first rotary component from said reduced rotation output means, and said second brake is engaged;

in third speed forward, reduced speed rotation is input to said first rotary component from said reduced speed rotation output means, and said second clutch is engaged;

in fourth speed forward, reduced speed rotation is input to said first rotary component from said reduced speed rotation output means, and said first clutch is engaged;

in fifth speed forward, said first clutch and said second clutch are engaged;

in sixth speed forward, said first clutch and said second brake are engaged; and and wherein, in first speed reverse, said second clutch and said first brake are engaged;

whereby six forward speeds and one reverse speed are provided.

32. An automatic transmission according to claim 1 wherein said first clutch is located on the side of said first planetary gear unit axially opposite said reduced speed rotation output means.

33. An automatic transmission according to claim 1, wherein said first clutch engages at a relatively low to medium speed.

34. An automatic transmission according to claim 1, wherein said second clutch engages in reverse.

35. An automatic transmission according to claim 1, wherein said first clutch comprises first friction plates which, at their radially inward ends, are splined to a member linked to said second rotary component, a first drum member integral with a hydraulic servo, second friction plates splined to an inner surface of said first drum member and intermeshed with said first friction plates, a first piston member for pressing said intermeshed first and second friction plates, and a first hydraulic servo having a first oil pressure chamber formed by sealing between an inner cylindrical surface of said first piston member and said first drum member;

and wherein said second clutch comprises third friction plates which, at their radially inward ends, are splined to a member linked to said third rotary component, a second drum member which is integral with an oil pressure servo and which is splined to fourth friction plates intermeshed with said third friction plates, said second drum member being radially inward of a member linked to said second rotary component, a second piston member for pressing said intermeshed friction plates, and a second hydraulic servo having a second oil pressure chamber formed by sealing between an inner cylindrical surface of said second piston member and said input shaft, and between an outer cylindrical surface of said second piston and said second drum member.

36. An automatic transmission according to claim 1, wherein said output member is disposed axially between said first planetary gear unit and said reduced speed rotation output means.

37. An automatic transmission according to claim 1, wherein said output member is disposed axially between said first planetary gear unit and said second clutch.

38. An automatic transmission according to claim 1, wherein said reduced speed rotation output means is a double pinion, speed reducing, second planetary gear unit;

and wherein said first and second planetary gear units and said output member are coaxial with said input shaft.

39. An automatic transmission according to claim 1, further comprising a differential unit for outputting rotation to drive wheels, and a counter shaft unit for engaging said differential unit, wherein said output member is a counter gear meshing with said counter shaft unit.

* * * * *